United States Patent [19]
Bardasz et al.

[11] Patent Number: 5,689,711
[45] Date of Patent: Nov. 18, 1997

[54] METHOD AND APPARATUS FOR REPRESENTING DATA DEPENDENCIES IN SOFTWARE MODELING SYSTEMS

[76] Inventors: Theodore Bardasz, 49 Parkerville Rd., Chelmsford, Mass. 01824; Stefano Malnati, 148 Main St., Unit B533, N. Andover, Mass. 01845

[21] Appl. No.: 426,594

[22] Filed: Apr. 21, 1995

[51] Int. Cl.$^6$ .............................. G06F 9/44; G06F 17/50
[52] U.S. Cl. .................... 395/701; 395/120; 395/333; 395/682; 395/961; 395/964
[58] Field of Search ................................ 395/701, 702, 395/682, 964, 333, 334, 335, 118, 120, 125, 356, 357; 364/578

[56] References Cited

U.S. PATENT DOCUMENTS

| | | | |
|---|---|---|---|
| 5,265,197 | 11/1993 | Kondo | 395/120 |
| 5,325,533 | 6/1994 | McInerney et al. | 395/700 |
| 5,327,529 | 7/1994 | Fults et al. | 395/155 |
| 5,438,659 | 8/1995 | Notess et al. | 395/155 |
| 5,479,601 | 12/1995 | Matheny et al. | 395/155 |
| 5,530,864 | 6/1996 | Matheny et al. | 395/700 |
| 5,581,672 | 12/1996 | Letcher, Jr. | 395/120 |
| 5,603,034 | 2/1997 | Swanson | 395/700 |

*Primary Examiner*—Alvin Oberley
*Assistant Examiner*—Kakali Chaki
*Attorney, Agent, or Firm*—Wolf, Greenfield & Sacks, P.C.

[57] ABSTRACT

A method and apparatus for converting a set of functions of any software system that does modeling into a corresponding set of parametric functions that, when called, generate not only a resulting model, but also a dependency graph representation of the model. The dependency graph can include directed functions and non-directed constraint relationships, and is used when a change is made to the model so that only affected portions of the model are reevaluated. The dependency graph can be visually presented to a user, and can be created or edited through a visual programming environment. The graph can be modified to change either input values to the model, or the graph elements that represent the functions used in creating the model. When changes to the dependency graph are made, it can be reevaluated to incorporate the changes into the model. When the visual programming environment is used to modify the graph, the environment calls the parametric set of functions. The set of parametric functions is generated by creating wrappers in a standard programming language around the functions of the software system. The dependency graph can also be used to generate a computer program in a standard language that, when executed on the software system, regenerates the model as well as the dependency representation. The computer program can also be edited and then executed on the software system to generate a modified version of the model.

30 Claims, 32 Drawing Sheets

METHOD AND APPARATUS FOR REPRESENTING DATA DEPENDENCIES IN SOFTWARE MODELING SYSTEMS

FIELD OF THE INVENTION

This invention relates to a method and apparatus for representing data dependencies in software modeling systems.

BACKGROUND OF THE INVENTION

Software systems exist in many different fields in which a user interacts with the system by entering a series of commands during an interactive session, and in response, the software system executes a number of functions that take actions defined by the user commands. Computer aided design (CAD) systems which generate a computer model of a design during an interactive design session are one example of such systems. CAD systems, such as the CADDS line available from Computervision Corp. of Bedford, Mass., provide tools for generating computer models of mechanical devices in two and/or three dimensions. Typically, a user interactively builds a model by entering, into a user interface, a series of system-defined commands to generate a product design. For example, a user may input a command such as insert box, along with desired dimensions (length, height and width) and a desired location for the box, to add a box with the specified characteristics to the design. Other commands can add elements such as cylinders, spheres, bores, etc., which can be integrated with the box to complete the product design. Thus, by inputting such system-defined commands, the user can build a computer model of a mechanical device.

The user interface in a CAD system conventionally includes a command processor that processes commands received from the user. The command processor generally can generate a command file that stores the received commands to generate a record of the interactive session between the user and the CAD system. Since the commands and command processor are generally proprietary to the particular CAD system, the command file is by nature a proprietary language. On receiving a command, the user interface calls an application programming interface (API), which is a software function that causes the system to perform some activity. For example, in a CAD system, an API causes a geometric modeler to generate and interconnect entities, such as edges, faces, and vertices to achieve the design action required by the proprietary command, and stores the entities in a database. The combination of the entities created by a series of commands received from the user during an interactive session defines the product design.

If the user desires to change the product design by changing a parameter of one of the previously created entities (e.g., the height of a box), the user can modify the history module to reflect the change, and then provide the history module as the source of commands to the system which re-executes all the commands in the history module. When the commands are re-executed, they are provided to the command processor, which again calls the appropriate APIs, which in turn typically discard the old design entities and create new entities to effect the new product design, as well as a new history module. This type of system is referred to as a "command based" system since the command is the basic building block.

Although the above-described command based systems allow a user to record an interactive session, to modify a record thereof, and to re-execute based on those modifications, they have several disadvantages. The history module created by these systems reflects the sequence in which the commands were received during the interactive design session, and does not represent the structural dependency of the resulting design. Thus, when any modification is made to the design, no matter how small, the entire history module must be re-executed to generate a new design, which can delay the design process.

Some CAD systems have been developed that include parametric capabilities so that when changes are made to a design parameter, the system modifies the design by updating only the portions thereof that are affected by the modified parameter. However, these parametric capabilities are conventionally incorporated into the proprietary commands used by the system. Therefore, if a third party vendor desires to provide add-on capabilities to the software system, the new capabilities must be integrated into the proprietary command set of the system if the parametric capabilities of the system are to be maintained.

Another disadvantage suffered by the above-described command based systems, whether or not they include parametric capabilities, is that modifications to the history module must be made using the proprietary commands. Thus, the user must learn a new "programming language" in order to modify the design reflected in the history module. In addition, history modules of this type are difficult for a designer to work with because they do not represent the structural dependency of the design, but rather, relate only to the sequential manner in which the commands were received during the design process.

SUMMARY OF THE INVENTION

In accordance with one illustrative embodiment of the invention, a method and apparatus is provided for converting a set of functions for any software system that does modeling into a corresponding set of functions having parametric capabilities. Thus, parametric capabilities can be provided to a software system whose set of functions have no inherent parametric capabilities.

In another illustrative embodiment, when the parametric functions created by the present invention are called during an interactive user session or by a program to create a design or model, the parametric functions generate not only the resulting model, but also a dependency graph representation of the model.

In a further illustrative embodiment, the dependency graph created by the present invention is created and evaluated in such a way that directed functions and non-directed constraint relationships can be intermingled in a single dependency graph.

In a still further illustrative embodiment, the dependency representation created by the present invention is used when a change is made to the model, so that only portions of the model affected by the change are reevaluated in creating the updated model.

In accordance with another illustrative embodiment of the invention, the dependency graph can be visually presented to a user to represent the dependencies of the model.

In accordance with another illustrative embodiment of the invention, functions executed on the software system can be grouped into hierarchical groups in the dependency graph. Thus, design goals of the user involving multiple functions can be represented with a single hierarchical entry in the dependency graph.

According to another illustrative embodiment of the invention, the dependency graph can be created or edited through a visual programming environment. When changes to the dependency graph are made, the graph can be reevaluated to incorporate the corresponding changes into the model.

In another illustrative embodiment, the dependency graph created by the present invention can be modified by the user to change either input values to the model, or the graph elements that represent the functions used in creating the model.

In a further illustrative embodiment, when the visual programming environment is used to modify the dependency graph, the environment calls the parametric set of functions created by the present invention. The parametric functions are compatible with visual programming techniques that allow a user to graphically generate and edit the dependency graph.

In a further illustrative embodiment, the set of parametric functions created in accordance with the present invention are generated by creating wrappers around the functions of the software system. The wrappers are written in a standard computer programming language so as to be compatible with non-proprietary tools, such as the visual programming environment discussed above.

According to a further illustrative embodiment of the invention, a method and apparatus is provided for generating a computer program from a representation of a model or design on a software system, the representation defining the model in terms of the dependency relationships amongst a plurality of model entities that form the model. The computer program can be written in a standard programming language. When the program is executed on the software system, it generates the model as well as the dependency representation. Thus, the computer program can convert a modeling session into a standard language program for efficient storage. The computer program can be generated from a dependency graph created in accordance with the present invention.

In another illustrative embodiment, the computer program can be edited, and then executed on the software system to generate a modified version of the design.

BRIEF DESCRIPTION OF THE DRAWINGS

Other features and advantages will become apparent from the following detailed description and from the drawings, in which.

DETAILED DESCRIPTION

I. Overview

In accordance with the present invention, a method and apparatus is provided for converting the APIs in a modeling system into associative APIs that, when called from a user interface or as part of a larger program during a modeling session, generate a graph representing the dependencies between the API functions called during the modeling session, the arguments to the APIs, and the results of the API functions. From the dependency graph, the present invention allows a user to: (1) change inputs to the graph and have only the affected functions be re-executed; (2) generate a non-proprietary computer program that represents the structural dependency of the graph, and that when executed, produces the same result as the modeling session that created the graph; (3) view the graph to visualize the dependencies; (4) edit the graph to alter the dependency structure of the model; and (5) edit the graph to change the API functions used to generate the model.

Figure 1:
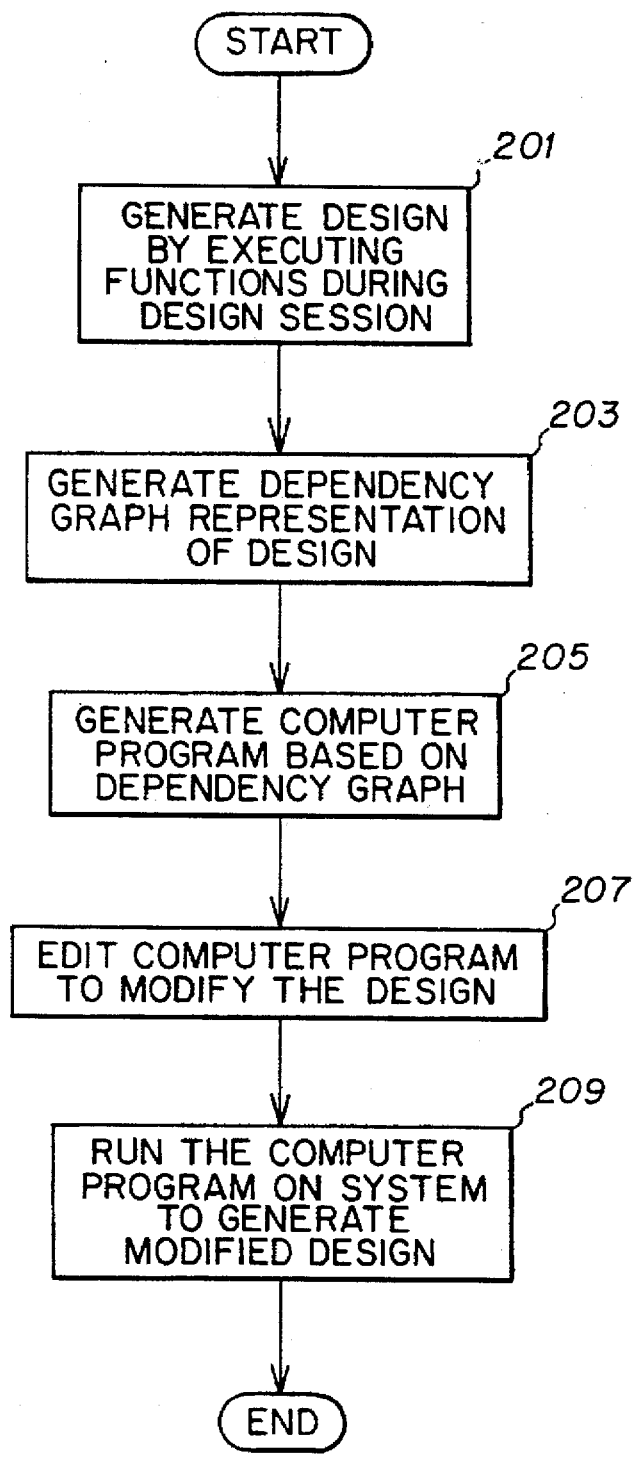
FIG. 1 is a high level flowchart representing the steps of a method in accordance with the present invention.

In accordance with one aspect of the present invention, a method and apparatus is provided for generating, based on an execution of software system functions that produces a design, a dependency graph representation of the design, and a non-proprietary computer program that is generated from the dependency graph and also represents the structural dependency of the design. The method is illustrated in the flowchart of FIG. 1. In step 201, the design is generated by the execution of a group of functions in the software system during a design session, and a dependency graph representation of the design is generated in step 203. If the design is modified during the design session, the present invention uses the dependency graph to determine which portions of the design will be affected by the modification, and re-executes only so much code as is necessary to change the affected portions of the design. As shown in step 205, after completion of the design session, the dependency graph can also be used to generate a computer program in a standard language that, when executed, will generate the dependency graph and the design that it represents. The user can, as shown in step 207, edit the computer program to represent a modified design, and run the computer program on the software system (step 209) to produce the modified design. Because the computer program is in a non-proprietary language, the designer need not learn a proprietary language to modify it. Furthermore, since the program is developed from the dependency graph, rather than from the sequence in which commands were received from the user during the design session, the computer program represents the structural dependency of the design. Thus, the organization of the program is easily understood by the user, allowing for easy modification of the program, even if the user does not have significant computer programming experience.

As stated above, software systems conventionally include application programing interfaces (APIs), which are high level functions that generally map in a one-to-one relationship with system-defined user commands. In accordance with the present invention, a tool is provided which, as part of an integration process for integrating the present invention into a software system, initially is run over each API in the software system to generate a new set of APIs. The user interface for the software system is then modified to call these new APIs in response to commands received from the user. The new APIs created by the tool of the present invention do essentially two things. First, the new APIs perform essentially all of the functions performed by the set of APIs provided by the software system. Second, the new APIs also create and maintain a dependency graph representation of the design generated by the user, which can be used to provide the parametric capabilities discussed above, to allow for graphical editing of the design through edits to the graph, and which can also be used to generate the standard language computer program that represents the structural dependency of the design. In this manner, the tool of the present invention forms an associativity subsystem that can be initially run over any software system that is composed of high level functions or APIs to convert the system, in a manner transparent to the user, into one that has the above-described associative capabilities provided by the present invention.

As should be appreciated from the foregoing, and as will become clearer in the description below, the present invention can provide parametric capability to any software system composed of APIs, even if that system does not include such a capability in its command set. This feature of the present invention is advantageous in allowing third parties to provide add-on capabilities to a software system. To provide additional capabilities to the software system, a third party need only provide commands and corresponding APIs that are compatible with those of the system. The additional commands need not be integrated into the command set of the software system to provide parametric capabilities, because when the tool of the present invention is run over the software system having the third party's commands and APIs installed, parametric capabilities are provided in the new APIs generated by the tool of the present invention, and in the manner in which these new APIs are used to generate, maintain and update the dependency graph representation of the design created during a design session.

In the description below, the illustrative example provided for the software system on which the present invention is operated is a CAD system which receives commands from a designer during an interactive design session to create a product design. However, it should be understood that the present invention is not limited to use with CAD systems, or with systems that receive inputs during an interactive session. The present invention can be used with any software system that is composed of functions, and that receives inputs from a user in any number of ways. For example, the present invention can be used with a software system for creating economic models based on a number of parameters, or many other types of software systems. Thus, although the terms "model" and "design" are used to refer to the software system output that is modeled by the dependency graph, these terms are not intended to be limited to CAD models, and are intended to encompass the output produced by any software system based on the execution of a number of functions.

Figure 2:
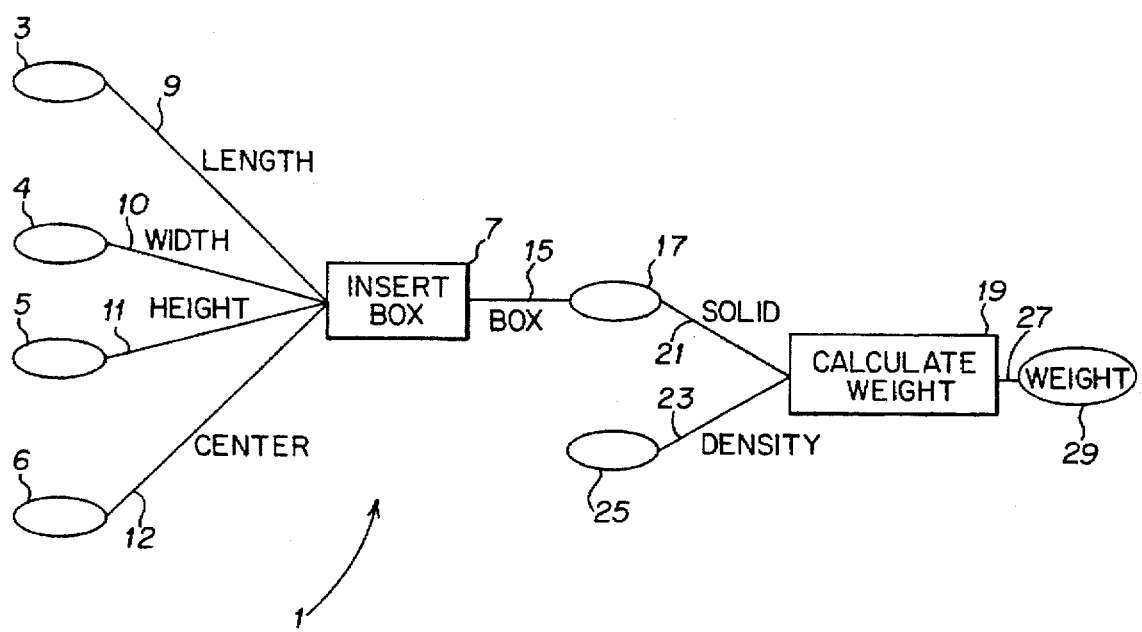
FIG. 2 is an illustrative dependency graph created in accordance with the present invention.

FIG. 2 is an example of a simple dependency graph 1 generated in accordance with the present invention operating on a CAD system. The graph 1 is generated during an interactive design session wherein a designer enters commands to insert a box into the design and to calculate the weight of the box. Along with the command to insert the box, the designer provides arguments which establish the length, width and height of the box, as well as the coordinates for the center of the box. These arguments are respectively represented in the graph 1 as data objects 3–6. Data objects are components in the graph that contain values. Each of the data objects 3–6 is connected to an operator 7 that indicates the function with which it is associated, i.e., insert box. Operators are components in the graph that take action on at least one data object and are functions or evaluable expressions that represent the design actions taken by the user. The data objects 3–6 are respectively coupled to the operator 7 via relations 9–12. Relations are components in the graph that identify what role each data object plays with respect to an associated operator. In the example shown in FIG. 2, the relations 9–12 respectively identify their associated data objects as establishing the length, width, height and center of the box. The result of operator 7 taking action on data objects 3–6 is represented in the graph by relation 15 and data object 17. Data object 17 represents the software entity created by operator 7, and relation 15 identifies the result of the operator as a box.

The command to calculate the weight of the box is represented in the graph by operator 19. A box is one of many structures that is more broadly classified as a solid. To calculate the weight of a solid, the operator 19 multiplies the volume of the solid, received via a first relation 21, by the density of the solid received via a second relation 23. In this example, the solid was already specified in the design, rather than being provided as an argument with the calculate weight command. This dependency relationship is represented in the graph by the relation 21 being connected to the data object 17 that represents the box. Since the density was not previously specified in the design, it is provided by the user as an argument with the command to calculate the weight of the box. This lack of dependency is represented in the graph by the relation 23 being connected to a data object 25 that represents the density argument and is not output from any operator in the graph. The result of operator 19 taking action on data objects 17 and 25 is represented in the graph by relation 27 and data object 29. Data object 29 represents the software entity created by operator 19, and relation 27 identifies the result of the operator as being the weight of the box.

As seen from the simple example shown in FIG. 2, the dependency graph created in accordance with the present invention illustrates the structural dependency of the design created during an interactive session. The graph illustrates that the weight 29 of the box is dependent upon the density data object 25, as well as data objects 3–5 representing the dimensions of the box. Similarly, the graph illustrates that the data object 17 representing the box is not dependent on the density data object 25. Therefore, if the designer chose to modify the density of the box during the interactive session, the only portion of the graph that would need to be re-evaluated to update the design would be operator 19; operator 7 would not need to be re-evaluated. Thus, when a design modification is made, the dependency graph enables the present invention to re-evaluate only operators that are dependent on a modified data object. Although the illustrated example is quite simple, it should be appreciated that the computational time savings provided by this feature of the present invention can be significant, especially for large designs.

Figure 3:
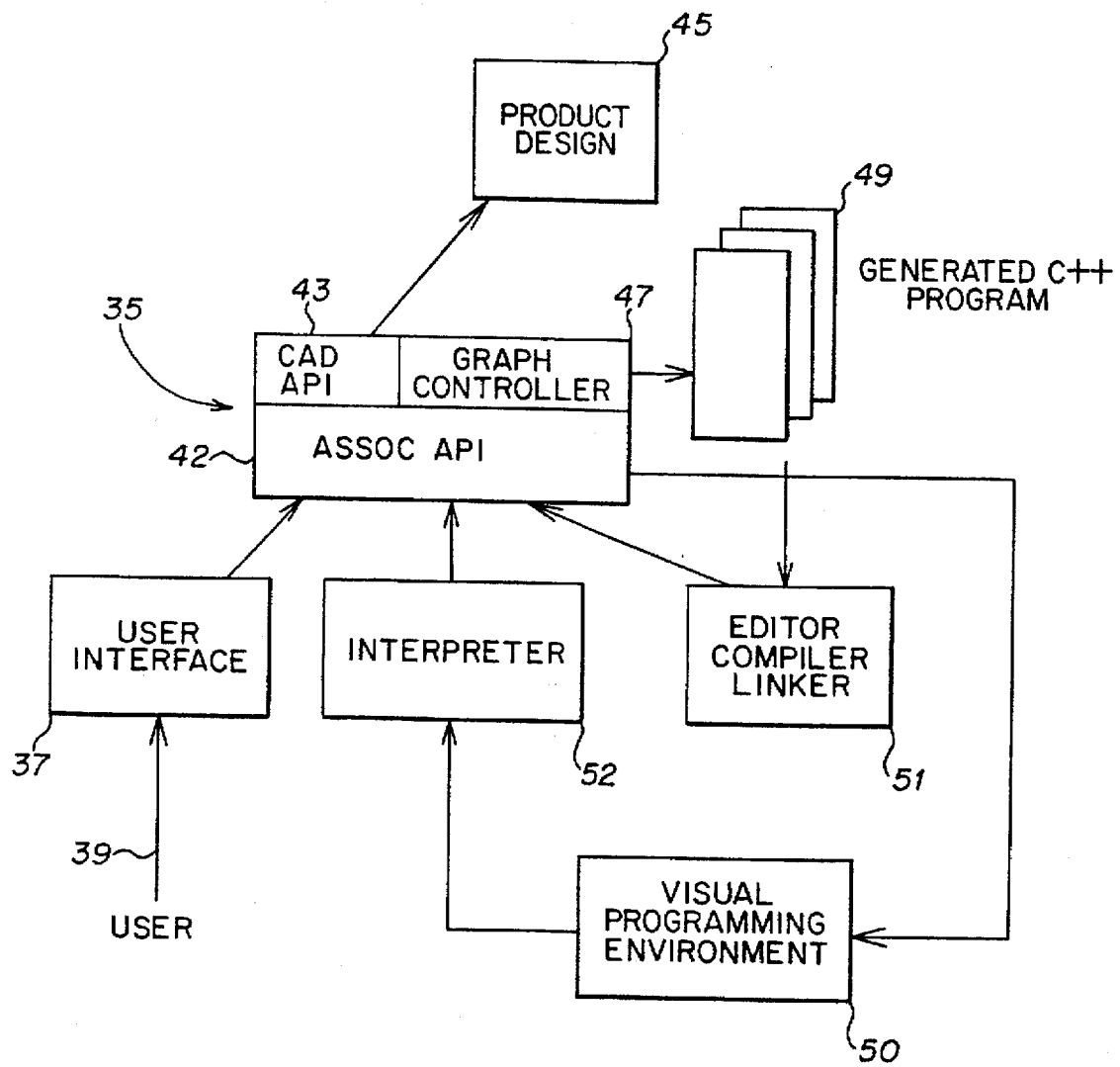
FIG. 3 is a graphical representation of a user's perspective of a CAD system that employs the present invention.

A graphical representation of the user's perspective of a CAD system on which the associativity subsystem of the present invention has been installed is shown in FIG. 3. The CAD system 35 includes a user interface 37 that receives inputs from the user as conventional CAD commands 39. Typically, a user will conduct an interactive design session with the CAD system by inputting a series of CAD commands 39. In response to the series of CAD commands, the user interface 37 calls corresponding associative APIs 42, which in turn call corresponding proprietary APIs 43 of the CAD system. The APIs 43 are executed to produce a product design 45. During the interactive design session, the associative APIs 43 and a graph controller 47 together generate a dependency graph, such as the one illustrated in FIG. 2, that represents the structural dependency of the product design 45. At the end of the design session, the CAD system can also generate, from the dependency graph, a computer program 49 in a non-proprietary language such as C++ that, when executed, will also represent the structural dependency of the product design 45. The user can then, using an editor/compiler/linker 51 of the CAD system, edit the computer program 49 to represent a modified product design, and compile and link the program to the CAD system to generate a modified product design 45. Alternatively, the user can use a visual programming environment 50 to graphically edit the dependency graph, which can then be used to generate a modified product design 45 and a modified computer program 49. The output of the visual programming environment is provided to an interpreter 52 that translates expressions received from the visual programming environment 50 into corresponding associative APIs that implement the desired design actions to modify the design.

II. Integration of Associativity Subsystem

Figure 4:
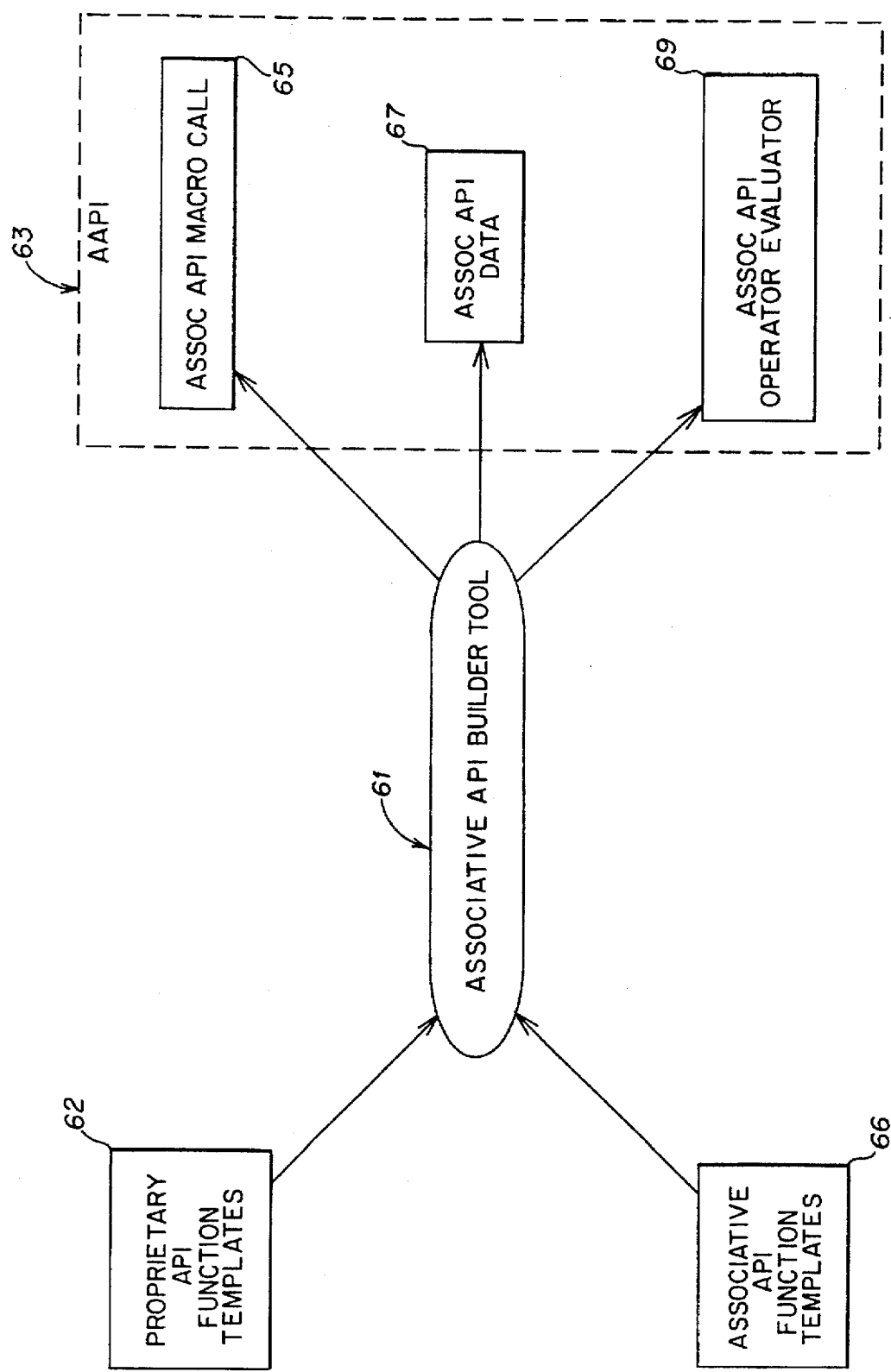
FIG. 4 is a graphical representation of the relationship between the associative API builder tool of the present invention, the associative APIs that it creates, and the proprietary APIs of a software system on which the associative subsystem of the present invention is installed.

As discussed above, to enable the present invention to be used with any of a variety of software systems in a manner that is transparent to the users of those systems, a software tool is provided that is executed once on each software system to provide it with the capabilities of the present invention. This software tool can be written in any standard computer language, and is preferably written in an object-oriented programming language such as C++. FIG. 4 illustrates the architecture of this tool, which is referred to as the associative API builder tool 61. The tool 61 is executed once in connection with each application programming interface (API) in a software system which is to incorporate the features of the present invention, and generates a corresponding associated application programming interface (AAPI) for each. In one embodiment of the invention, the builder tool 61 operates upon each API for the software system individually.

As discussed above, an API is essentially a high level software function in a system that typically corresponds to a command that can be received from a user. In the example of FIG. 2, the CAD system would have APIs that implement the functions of inserting the box and calculating the weight of a solid. Conceptually, the associative API generated by the builder tool 61 for each API performs two roles. First, it performs the same role that its corresponding API performs in connection with generating the product design for the software system. For example, an associative API generated for the API in the FIG. 2 example to insert a box will perform the function of inserting the box into the product design and displaying it on the CAD system. Second, each associative API also performs the role of representing in the dependency graph the action taken by its corresponding API, so that the portions of the design generated by the API understand how they are associated with other aspects of the product design.

Because each associative API performs two roles, the builder tool 61 can simply generate two functions for each API, i.e., one function to perform each role. However, in a preferred embodiment of the present invention, the builder tool 61 generates a macro call that resolves to a call to a generic function, referred to as the associative API processor, for generating the graph structure of each associative API, and one software function for each associative API that performs the role of implementing the design action in the product design. The arguments provided to the associative API processor are the name of the associative API calling it, and the arguments to that associative API. The builder tool 61 also produces a software entity (described below) for each associative API that describes the topology of the graph entities to be constructed for that associative API, and the function represented by the operator created in the graph to represent the design action taken by the associative API.

As shown graphically in FIG. 4, the builder tool 61 operates on function templates of the proprietary APIs 62 in the software system, and function templates for corresponding associative APIs 66 to generate an associative API 63 for each API. The function template for each API and associative API defines the name of the function, the data type of its arguments and result, and the names of its arguments and result. Each associative API created by the builder tool includes three components, i.e., an associative API macro call 65, an associative API data component 67, and an associative API operator evaluator 69. As discussed more fully below, when the builder tool 61 is executed on the APIs of a new software system to generate an associative API for each, the user interface of the system is also modified so that each user command calls its corresponding associative API, rather than calling its corresponding API directly. In this manner, wrappers are provided around each of the APIs in the software system so that the added capabilities of the present invention are provided in a manner that is transparent to the user.

Figure 5:
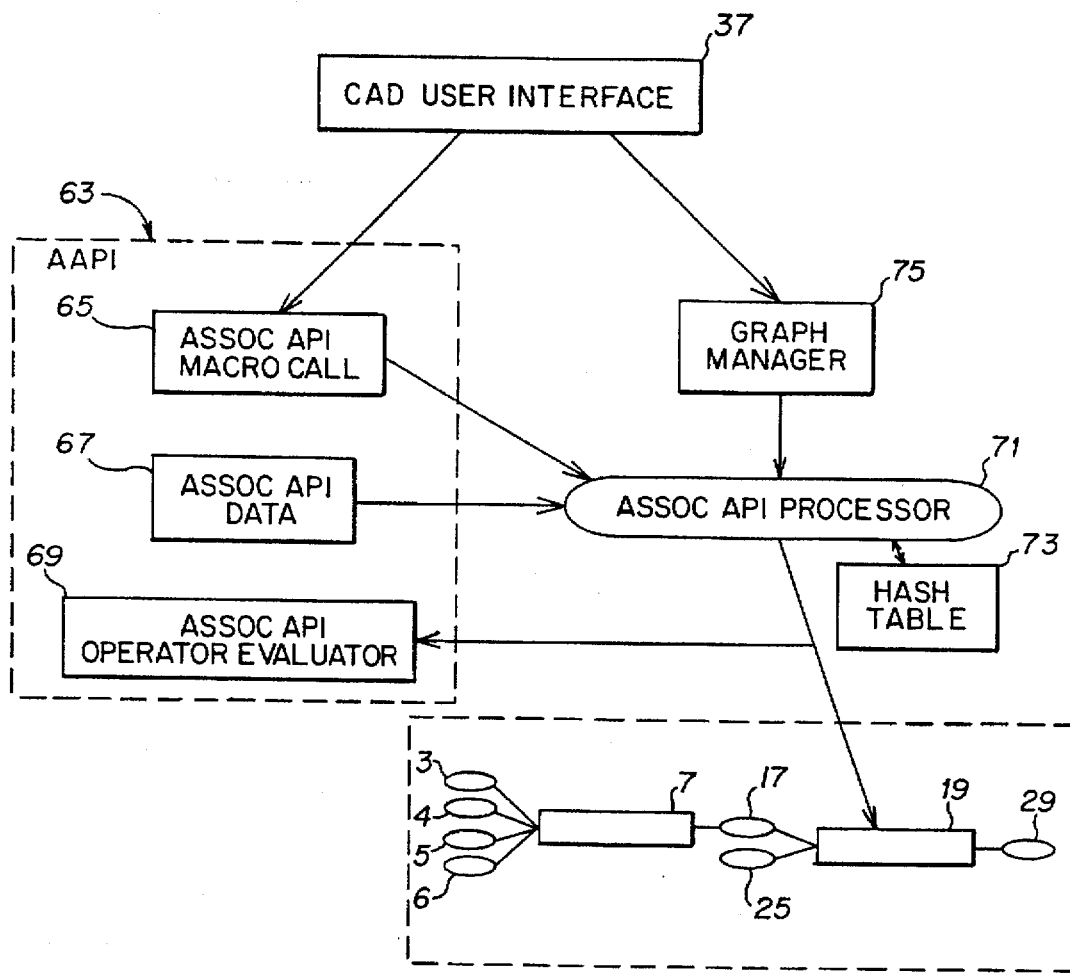
FIG. 5 is a graphical representation of the manner in which commands received at the user interface of a CAD system using the present invention call an associative API and the associative API processor to construct dependency graph entities to represent the command, and to evaluate those entities to perform the design action requested by the user.

When called by a user command during an interactive design session, each associative API in turn calls the associative API processor 71 (FIG. 5). The processor 71 first updates the dependency graph to include an operator that represents the design action taken by the command, and then ensures that the function that actually takes the design action on the product design is called. Because the role played by each of the components of the associative APIs 63 is closely tied with the role of the associative API processor 71, these aspects of the present invention are described together, making reference to FIG. 5. FIG. 5 graphically illustrates the relationship of the AAPI components 63 to the associative API processor 71 and the CAD user interface 37.

Each associative API that calls the processor 71 is represented in the dependency graph by an operator having a specified number of data objects and a corresponding number of relations that each defines the relationship of one of the data objects to the operator. The associative API processor creates a software entity to represent each operator, relation and data object in the dependency graph. In this context, the term software entity is intended to indicate entities created by a software program which may be an object in an object-oriented programming language such as C++, or for example a structure in a programming language such as C. The associative API processor 71 is generic in that it handles calls from every associative API in the same manner, without regard to the particular design action performed by the AAPI. For example, making reference to the illustrative dependency graph shown in FIG. 2, the associative API processor 71 treats the operators 7 and 19 that respectively represent insertion of the box and calculation of its weight in the same manner, simply connecting them up in the dependency graph to their respective data objects and relations.

As mentioned above, in addition to executing the builder tool 61 on each API in the software system to generate an associative API for each, the integration process of the present invention also modifies the user interface 37 of the system so that in response to each command received from the user, the interface 37 calls a corresponding associative API, rather than calling an API directly. Specifically, it is the macro call component 65 of each associative API 63 that is called by the user interface. The user interface passes the associative API any data arguments included in the received command. For the illustrative example shown in FIG. 2, when the user inputs the command to insert the box, the user interface calls an associative API corresponding to that command and passes it the data arguments received in the command relating to the length, width, height and center position of the box. When the macro call 65 of an associative API is called by the user interface, it in turn calls the associative API processor 71 (FIG. 5) and passes to the processor a string of data that contains an ordered list of the arguments received with the command that called the macro 65, as well as the name of the macro which is used to identify its function (e.g., insert box, calculate weight).

Because the associative API processor 71 is a generic dependency graph builder and is not specifically designed to handle any particular associative API, the string that includes the name of the calling macro and the list of ordered data is insufficient to specify the manner in which the dependency graph is to be updated based upon the calling macro. Thus, the processor 71 uses the macro name in the calling string to receive additional information about the calling AAPI 63 from its data component 67. The data component 67 of each associative API includes textual information that defines the number of input data objects for its corresponding API, their respective relations to the operator, and the relation of the result data object. Whenever the software system is started-up, and before initiation of a design session, the associative API processor 71 parses an ASCII data file that describes each associative API 63 (provided by its data component 65) to generate a hash table 73 that includes an entry for each AAPI, hashed by the AAPI name. When called by an AAPI during an interactive design session, the processor 71 uses the corresponding entry in the hash table 73 to create the operator, relations and data objects that represent the calling AAPI in the dependency graph. The hash table entry for each associative API is in the form of a software entity, and identifies the number of input data objects for the AAPI, the relation of each to the AAPI's operator, and the relation of the AAPI output data object.

III. Dependency Graph Creation

When the associative API processor 71 is called by a macro call 65 during a design session, the processor 71 uses the name of the calling macro to index into the hash table 73, which outputs the software entity that includes the information relating to the structural characteristics of the calling AAPI. For example, for a call from the AAPI that relates to the function for inserting a box as described in connection with FIG. 2, the corresponding software entity output from the hash table 73 would include information indicating that the first argument in the ordered list of data passed to the processor 71 along with the macro name is the length of the box, the second argument is the width, the third is the height, and the fourth is the center position of the box. The associative API processor 71 includes a function that queries the software entity output from the hash table 73 to determine the manner in which the dependency graph should be updated for the particular AAPI macro that called the processor. This function asks the software entity output from the hash table how many inputs are associated with the calling AAPI. Next, the associative API processor 71 asks the entity what name is associated with the first argument in the list of ordered data, and uses the name (e.g., length, width, height) to define the relation of the data object to the operator. The associative API processor 71 continues in this manner until the relations of all of the input and output data objects are defined. The processor 71 derives the name of the operator from the name of the calling macro, which is included in the string of information passed to the processor 71.

As stated above, the associative API processor creates software graph entities to represent each of the operators, relations and data objects in the dependency graph. The graph entity created for each operator (e.g., insert box and calculate weight in the FIG. 2 example) includes a list of pointers to the graph entities that represent its relations. Each pointer includes the address of a memory location that stores a graph entity representing one of the relations. The graph entity created for each relation includes the name of the relation, and a pointer that includes the address of the memory location that stores the graph entity that represents the data object connected to the relation in the graph. Finally, each graph entity that represents a data object in the dependency graph includes a pointer to a memory location wherein the argument value corresponding to the data object is stored.

It should be appreciated from the foregoing that the provision in the hash table of a software entity for each AAPI that it can be queried by the associative API processor 71 to determine the structural relationship of the operator, relations and data objects related to the AAPI enables the creation of the dependency graph to be accomplished by only a single additional function (i.e., the processor 71) added to the software system, rather than requiring that a separate graph manipulation function be generated for each API in the system.

IV. Overview of Dependency Graph Evaluation

In addition to updating the dependency graph in response to an associative API macro call, the associative API processor also triggers the evaluation of each newly created operator to take the design action on the product design specified by the calling associative API. The software entity that represents each operator in the dependency graph includes two pointers relating to the operator evaluator 69 (FIG. 5) of the AAPI whose macro call resulted in the creation of the operator. The first pointer points to a library wherein the operator evaluator 69 is stored, and the second pointer specifies the name of the function in the library that is the operator evaluator. Thus, after the associative API processor 71 updates the dependency graph in response to a call from an AAPI, the processor 71 calls the newly created operator to evaluate itself. This process is illustrated graphically in FIG. 5, wherein the associative API processor 71 is shown calling the calculate weight operator 19 of FIG. 2 to evaluate itself.

As discussed above, each AAPI created by the builder tool 61 (FIG. 4) is a wrapper around a proprietary API in the software system. The operator evaluator 69 for each AAPI is a function that calls the name of the proprietary API around which it is wrapped. When called, the operator evaluator 69 collects the arguments from the input data objects connected to the evaluated operator in the dependency graph, formats the arguments in the form expected by the proprietary API, and calls the API with the arguments in the correct order to perform the desired design function. Referring again to FIG. 2, the proprietary API in the CAD system for inserting a box may, for example, be named "CV_INSERT_BOX (1, w, h, center)", expecting that data arguments passed to it be ordered as length, width, height and center. If a user input the command to insert a box with arguments specifying the length as two, width as three, height as four and center coordinates as (zero, zero), the user interface would call the AAPI wrapped around the CV_INSERT_BOX API, leading to the creation of data objects 3–5 and 17, relations 9–12 and 15, and operator 7 in the dependency graph. When the AAPI processor 71 instructs the operator 7 to evaluate itself, the operator evaluator 69 (FIG. 5) of the associative API would collect and order the arguments stored in data objects 3–5 and call the proprietary API as "CV_INSERT_BOX (2, 3, 4, 0, 0)". This call is identical to one that would have been made directly by the user interface 37 in the software system if the software tools of the present invention had not been installed on the system to create a wrapper around the proprietary API.

When the processor 71 calls a graph operator to evaluate itself, it is a straightforward process for the corresponding operator evaluator 69 (FIG. 5) to collect and organize the arguments in the order required by the proprietary API that will be called to take the specified design action on the product design. The operator evaluator 69 for each AAPI includes not only the name of the corresponding proprietary API to be called, but also the names and order of the arguments to be provided to the API. For example, when evaluating the operator 7 shown in FIG. 2, the corresponding AAPI evaluator 69 would first request the operator 7 to provide it with the argument representing the length of the box. The graph entity representing the operator 7 would execute a function requesting each of its relations to identify itself. Once the length relation is identified, the graph entity representing the operator 7 would request the graph entity representing the length relation 9 to provide it with the argument defining the box length. The graph entity representing the length relation 9 would then request the graph entity representing the data object 3 to pass its argument, and once the argument is received, would in turn pass the argument to the graph entity representing the insert box operator 7, which would return it to the operator evaluator 69. The evaluator 69 would request and receive the remaining arguments in the same manner. Once all the arguments were collected, the operator evaluator would call the proprietary API "CV_INSERT_BOX", with the call itself specifying the order of the arguments, to take the appropriate action on the product design.

When a proprietary API is called, it performs a design action on the arguments passed to it, and in addition, passes the result back to the operator evaluator, which in turn passes the result to the graph entity representing the operator being evaluated. The graph entity representing the evaluated operator then passes the result to the graph entity representing the output relation of the operator, which in turn passes it to the graph entity representing its data object, which finally stores the result in a memory location pointed to by the data object. In this manner, the result of the evaluated operator, which may serve as an argument to other operators, is inserted into the dependency graph.

1. Expanded Command Format Flexibility

In one embodiment of the invention, one or more operator evaluators 69 (FIGS. 4 and 5) are provided with a capability that increases the software system's flexibility in terms of the manner in which certain design actions can be defined at the user level. For example, although the example described above illustrates a box as being defined by its length, width, height and the coordinate position of the center of the box, it should be understood that there are other ways in which a user may want to define a box, such as by defining only the positions of the box corners. This may be desired for certain design environments where the approach taken by the designer is more conducive to defining a box in this manner, rather than by specific length, width and height. Conventionally, if the CAD system does not include a proprietary API in which a box is defined by its corners, the user is not provided with a command to define a box in this manner. However, the operator evaluator function of the present invention provides a wrapper around the proprietary APIs that can provide increased flexibility in the format of the commands available to the user. For example, if a CAD system on which the tool of the present invention is run only provides for the creation of a box that is defined in terms of its length, width, height and center, the operator evaluator function of the present invention can enable the user to define a box in additional ways, such as by its corners.

In a preferred embodiment of the present invention, the dependency graph and the computer program generated therefrom represent the structural dependency of the product design in a manner that most closely correlates to the design actions taken by the user during the design session. Therefore, when the feature of the present invention that provides additional command formats is used, the dependency graph is preferably created and stored in the manner specified by the user. For example, if the capability is provided for the user to define a box by its corners and the user exploits this capability, the dependency graph operator that represents the design action of inserting the box will include data objects and relations that define the box by its corners. When the operator is called to evaluate itself and in turn calls its AAPI operator evaluator 69 (FIG. 5), the evaluator converts the representation of the operator in the dependency graph into the form required for calling the proprietary API of the software system. Using the example for inserting the box described above, the operator evaluator associated with the insert box operator would collect the arguments defining the corners of the box in the manner described above, and would process those arguments to generate length, width, height and center coordinate arguments to be passed to the proprietary insert box command, which operates only upon arguments arranged and ordered in that fashion. The increased flexibility provided to the user does not require the creation of new proprietary APIs, because the flexibility is implemented by the wrappers provided by the present invention around the proprietary APIs.

Although in the preferred embodiment of the invention the flexibility in the command format provided to the user is implemented in the AAPI operator evaluator 69 that corresponds to each command, it should be understood that this feature of the present invention can be implemented in other ways. For example, the conversion between the format input from the user and that required by the proprietary API can be performed in the AAPI data component, so that the dependency graph will be generated in the format expected by the proprietary API. When the format conversion is implemented in this manner, the AAPI operator evaluator need not perform any format conversion.

V. Updating Software Application Entities To Reflect Participation In Dependency Graph In addition to generating an AAPI wrapper around each proprietary API in the software system, the present invention also modifies the software application entities that are generated by the software system to represent the product design, so that each application entity knows if and where it is participating in the dependency graph. For example, if the software system on which the present invention is installed is a CAD system, the application entities generated thereby can include boxes, cylinders, and other structures that represent the product design. For example, in the illustrative example of FIG. 2, the result of evaluating the operator 7 to insert a box is an application entity that represents the box, and whose description inherently includes the arguments (length, width, height and center position) used to define the box.

As discussed above, the present invention is preferably implemented in an object-oriented programming language. Although other programming languages can be used to practice the present invention, object-oriented programming languages are advantageous in that they have capabilities which allow for a simple modification to the application entities created by the software system during a design session to enable each application entity to understand if and where it is participating in the dependency graph. Object-oriented programming languages allow application entities having some common characteristics to be defined in a common class. Referring to the illustrative dependency graph of FIG. 2, the calculate weight operator 19 calculates the weight of a solid by multiplying its volume by a density. The specific solid being operated upon in FIG. 2 is a box, which is one of a broader class of solids, which could include cylinders, spheres, etc. When defining various types of application entities in an object-oriented programming language, a hierarchical structure can be used. For example, functions and characteristics that are common to all the specific types of application entities that belong the class solids (e.g., a function to provide the weight of the solid by multiplying its volume by its density) may be defined once in the definition of the solid class. The definition of each of the more specific application entities (e.g., box, cylinder, sphere, etc.) within the class will include a reference to the solid class and will inherit therefrom. Thus, the functions and characteristics provided in the definition of the solid class form part of the definition of each of the application entities that inherit from it, and need not be duplicated in the definition of each of the more specific classes of application entities. For example, each application entity in the box class has the capability of determining its weight, without a specific function to make this determination for the box, because that function is defined in the definition of a solid, from which the box class inherits.

Using the inheritance capability available in an object-oriented programming language, the functions and capabilities necessary to enable each application entity to determine if and where it is participating in the dependency graph can be provided in a single class, referred to as an associative variable class, from which each application entity created by the software system to represent a portion of the product design is made to inherit. Each argument input to the design by the user is also defined as an application entity that inherits from the associative variable class. The associative variable class includes a field for identifying a pointer to a particular data object in the dependency graph (e.g., data objects 3-6, 17, 25 and 29 in FIG. 2). Thus, each application entity created by the software system to represent a portion of the product design, or to represent an argument input from the user, uses this pointer to point to a particular data object, if any, that represents it in the dependency graph. If the pointer field is nil in a particular application entity, it indicates that the application entity has not been assigned a corresponding data object in the dependency graph, and therefore, is not yet participating in the graph. If the pointer field has a value, the application entity is represented in the graph by the data object pointed to.

The associative variable class also provides two functions that are passed to each of the application entities that inherit from it. The first function sets the above-described pointer field to a particular value identifying the location of a corresponding data object when the application entity is added to the dependency graph. The second function retrieves the pointer value and returns it when the application entity is questioned as to where it is present in the dependency graph. As stated above, in addition to application entities generated by the software program, arguments input to the system by the user are also represented as application entities that depend from the associative variable class. Therefore, each of the application entities represented in the dependency graph as a data object depends from the associative variable class, so that each includes the data object pointer field and the functions to set and retrieve the pointer value.

The capabilities provided to each of the application entities by the associative variable class are used in the creation and management of the graph in the following manner, making reference to the example shown in FIG. 2. Initially, the user enters a command to insert a box. The entry of this command results in an AAPI 63 (FIG. 5) calling the associative API processor 71 in the manner described above. In calling the API processor 71, the AAPI macro call 65 passes the processor each of the arguments associated with the calling macro, i.e., the length, width, height and center position for the box. Each of these arguments is passed in the form of an application entity that depends from the associative variable class. Thus, in order to determine the affect of the macro call on the dependency graph, the associative API processor 71 queries each of the application entities that represents an argument to determine whether and where in the graph each argument is represented. Since none of the arguments was previously represented in the graph, each of the application entities representing one of the arguments includes a nil value in its data object pointer. Upon reading these nil pointers, the API processor 71 creates a new graph entity to represent a data object for each argument, and instructs each of the argument application entities to set its data object pointer to the memory location of its newly created graph entity. The API processor then creates graph entities representing the operator 7 for inserting the box and the relations 9–12 in the manner discussed above. In addition, the API processor 71 creates graph entities representing the relation 15 and the result data object 17. The processor 71 then instructs the operator 7 to evaluate itself, resulting in a call to its AAPI operator evaluator 69. In the manner described above, the operator evaluator calls the insert box proprietary API, which returns to the evaluator an application entity representing the box that it created. The operator evaluator 69 then updates the data object pointer in the application entity defining the box to point to the memory location for the data object 17, thereby providing the application entity that defines the box with the information relating to its participation in the dependency graph.

Continuing with the example relating to FIG. 2, the next command received from the user is to calculate the weight of the box. In response to this command, the corresponding AAPI macro call 65 passes to the associative API processor 71 the argument upon which the calculate weight function is to be performed, i.e., the application entity defining the box. The API processor 71 asks this application entity to specify the pointer value that identifies its corresponding data object in the dependency graph. Since such a data object was previously created, the address of data object 17 is returned to the processor 71. The processor 71 then updates the dependency graph by generating graph entities representing the calculate weight operator 19 and the relation 21. In the graph entity that represents the relation 21, a pointer is updated to include the address of the memory location that stores the graph entity that represents data object 17. In this manner, the dependency relationship of the calculate weight operator 19 on the insert box operator 7 is reflected in the dependency graph. The associative API processor 71 also creates new data objects 25 and 29, as well as their associated relations, to complete the dependency graph in the manner described above.

VI. Associative API Processor Routine For Creating And Evaluating Dependency Graph The above-described capabilities of each argument and application entity to understand if and where they are participating in the dependency graph is utilized by the associative API processor 71 during the creation of the dependency graph in the manner illustrated in FIG. 6, which illustrates the steps that the processor 71 performs when it is called by an AAPI macro. Initially, in step 401, the associative API processor 71 creates a graph entity to represent an operator in the dependency graph that corresponds to the design action of the calling macro. At step 403, the method then selects a first of the macro's arguments for processing. As discussed above, each argument is passed to the associative API processor 71 as an application entity that includes a pointer field indicating if and where the argument is represented in the dependency graph by a data object.

In step 405, the method reads the data object pointer of the selected argument to determine whether it is nil, and when it is, the method proceeds to step 407 wherein a graph entity is created to represent a new data object in the dependency graph, and the application entity representing the argument is updated so that its data object pointer points to the newly created data object. After the creation of the data object in step 407, or if it is determined at step 405 that a data object already exists for the argument, the method proceeds to step 409 wherein a relation is created between the data object and the operator created in step 401. In step 411, a determination is made as to whether the argument being processed is the last argument associated with the calling macro, and when it is not, the method returns to step 403 to select another argument for processing. In this manner, the method proceeds through steps 403–411 to create the input relations and data objects associated with the operator created in step 401 and to connect them to the operator.

When it is determined at step 411 that the last argument has been processed, the method proceeds to steps 413 and 415 wherein a result data object and relation are respectively created for the operator. The method then proceeds to step 417 wherein the associative API processor 71 requests the operator to evaluate itself. The evaluation, performed by the AAPI operator evaluator 69 calling its corresponding proprietary API with an ordered list of data, returns a result in the form of an application entity to the associative API processor 71. In step 418, the result is associated with the result data object created in step 413 but updating the data object pointer in the application entity that defines the result. Finally, in step 419, the processor 71 returns the application entity that defines the result to the macro whose call initiated the method.

VII. Evaluating The Dependency Graph

Figure 6:
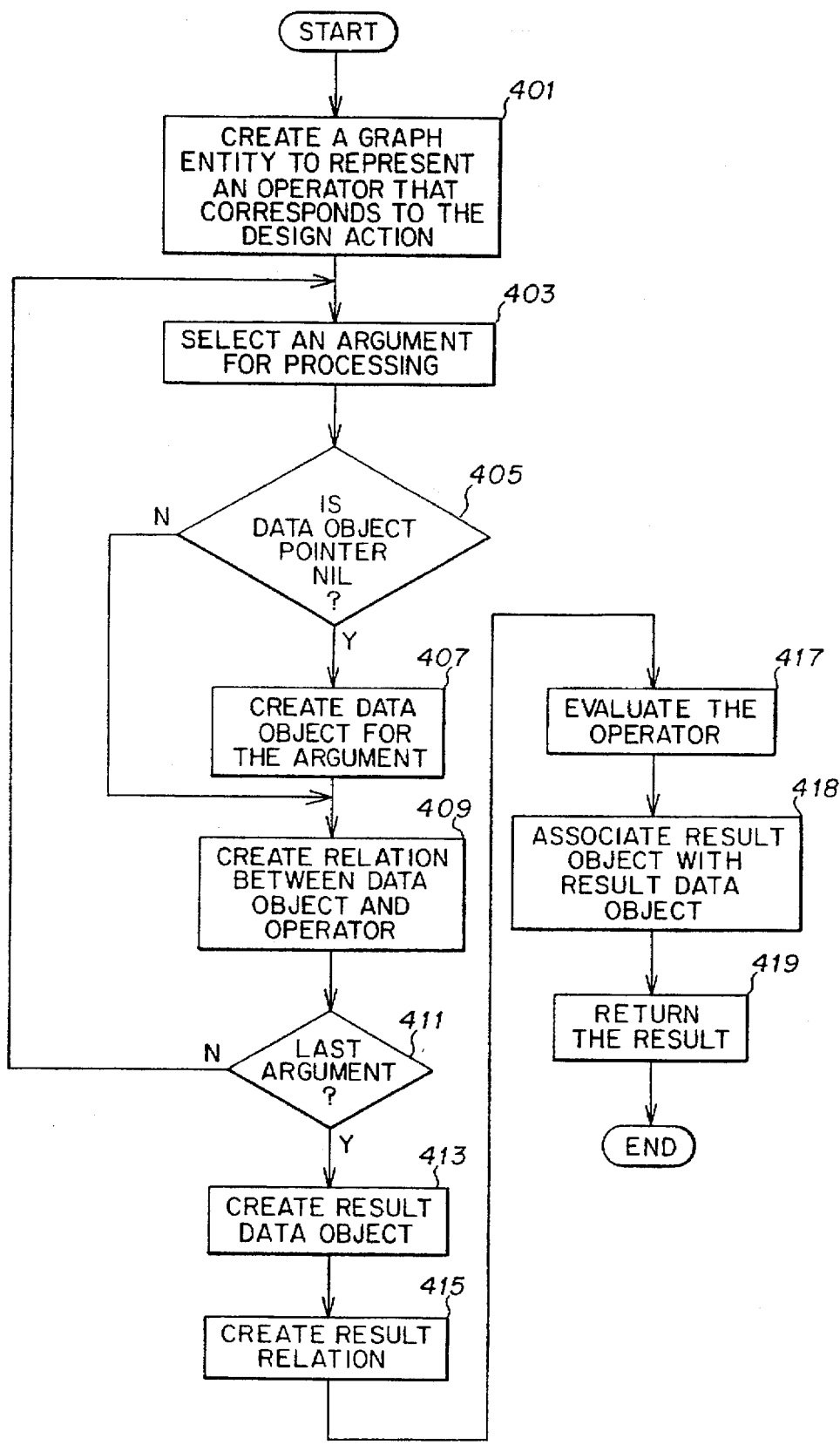
FIG. 6 is a flowchart representing the steps performed by the associative API processor of the present invention when it is called by an associative API.
Figure 7A:
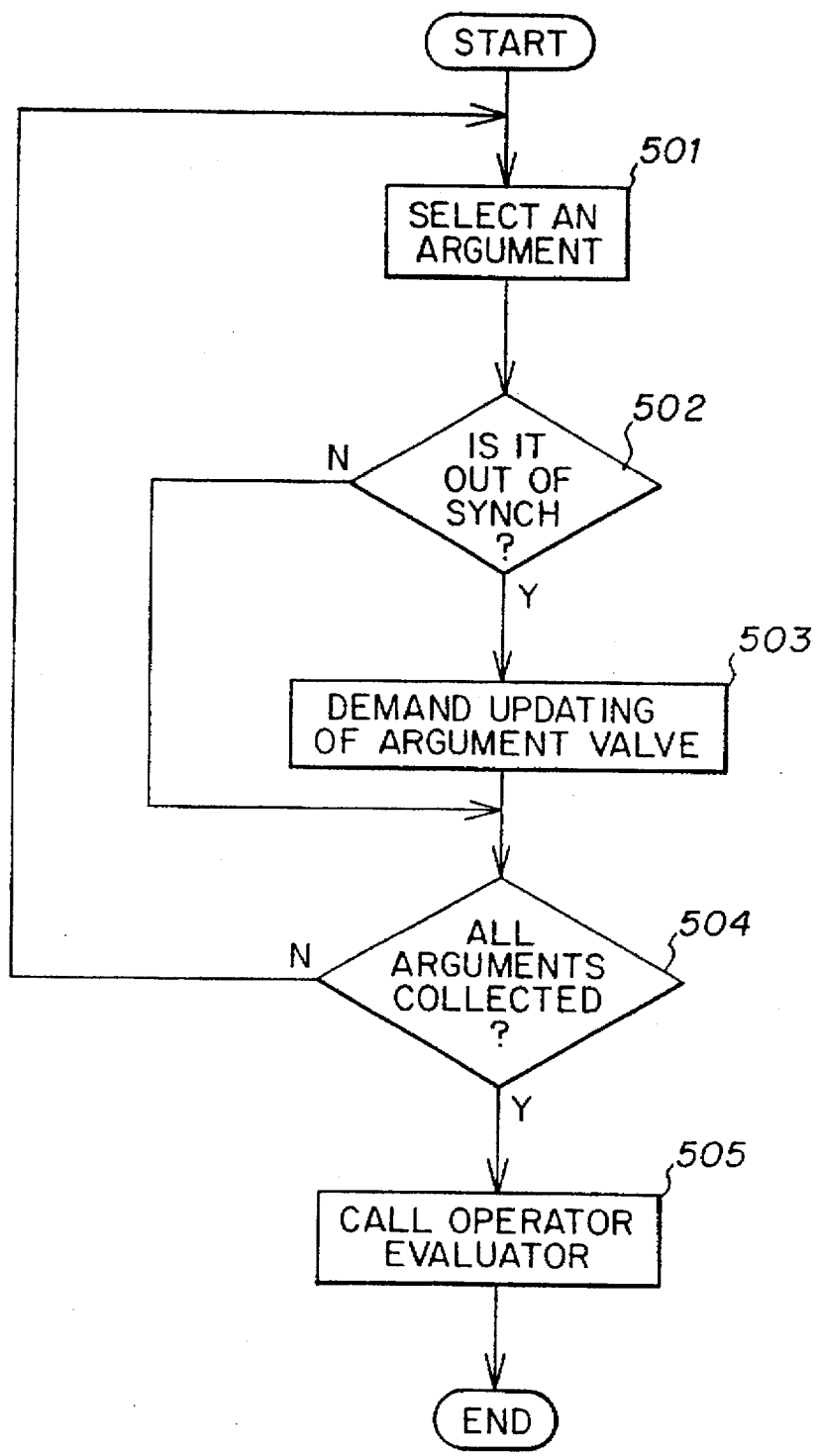
FIGS. 7a–7b are flowcharts representing the steps performed by the operator evaluator for an associative API of the present invention when it is called to evaluate an operator in the dependency graph.

In response to the processor 71 requesting evaluation of an operator in step 417 of the method of FIG. 6, argument collection and operator evaluator routines are called that are generic to all operators, and that ensure that all of the arguments required by the operator are up-to-date before calling the operator evaluator 69 of the evaluated operator. The steps of the argument collection routine are shown in FIG. 7a. Initially, a first argument associated with the evaluated operator is selected for processing in step 501, and a determination is made at step 502 as to whether this argument is "out of synch". The phrase out of synch is used to indicate that the data object that represents the argument is dependent upon at least one other graph entity that has been changed, but that has not yet been re-evaluated. Thus, if the argument is out of synch, the method proceeds to step 503 wherein updating of the argument is requested. After updating is requested at step 503, or if it is determined at step 502 that the argument is not out of synch, the method proceeds to step 504, wherein a determination is made as to whether all of the arguments for the operator being evaluated have been collected. When it is determined that they have not, the method returns to step 501 where a new argument is selected for collection. In this manner, the method proceeds through steps 501–504 until all of the arguments for the operator have been collected, and those that were out of synch have been updated. The method then proceeds to step 505 wherein the operator evaluator 69 that corresponds to the evaluated operator is called.

Figure 7B:
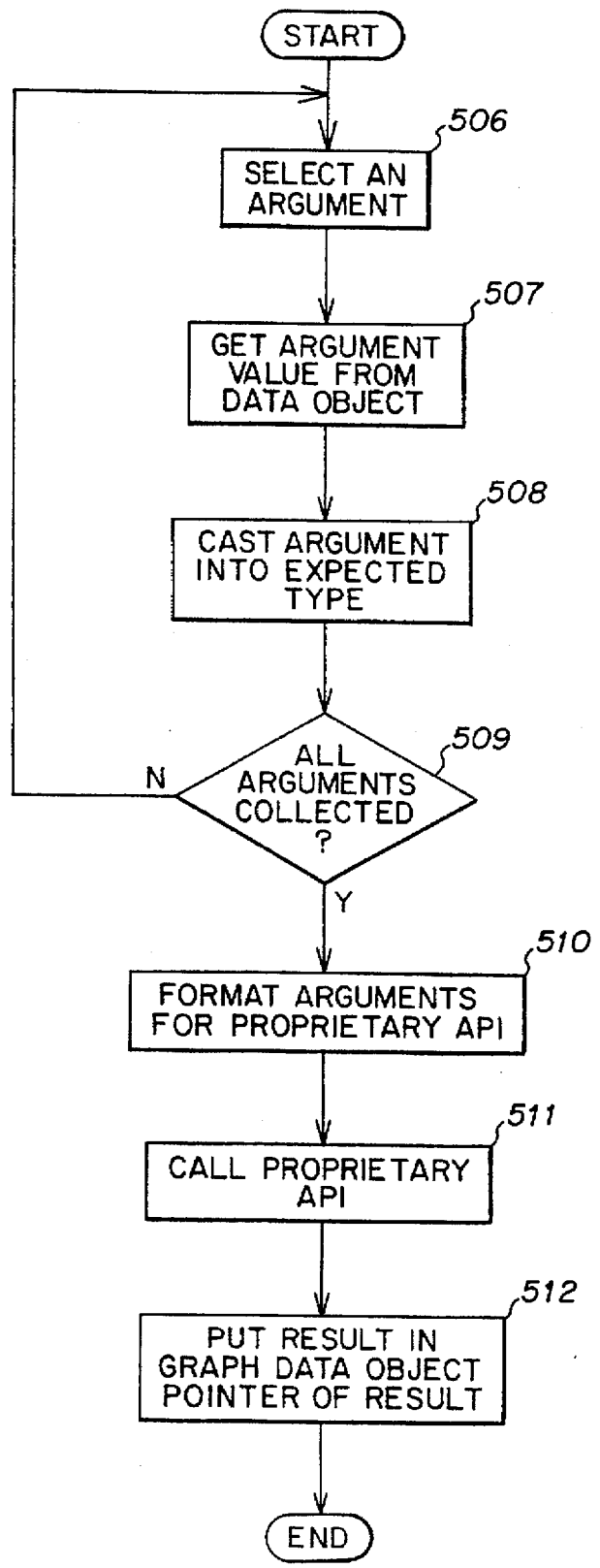

The steps of the operator evaluator routine are shown in FIG. 7b. Initially, a first argument associated with the evaluated operator is selected in step 506, and then in step 507 the value associated with the selected argument is retrieved from the data object pointer that represents the argument in the dependency graph. The method then proceeds to step 507, wherein the argument value is cast into a data type that is expected by the proprietary API that will be called by the operator evaluator. Each data object in the dependency graph is generic, and does not contain information as to the format of the argument that it points to. For example, the argument could be an integer, an application entity that defines a box, an application entity that defines a cylinder, etc. Therefore, before the operator evaluator calls the API, it casts the argument into the data type expected by the API.

At step 509, a determination is made as to whether all of the arguments to be passed to the API have been processed, and when they have not, the method returns to step 506 wherein another argument is selected for processed. In this manner, the method proceeds through steps 506–509 to process all of the arguments associated with the operator. When all of the arguments have been processed, the method proceeds to step 510, wherein the arguments are formatted in the manner expected by the proprietary API to be called. As discussed above, in one embodiment of the invention, the operator evaluator for an AAPI can provide additional options to the user in the manner in which commands can be formatted. If the user command and its corresponding operator in the dependency graph are formatted differently from the API, the method reformats the arguments in step 510 to that expected by the API. After the arguments are formatted, the method proceeds to step 511 wherein the proprietary API that corresponds to the operator is called, and is passed the arguments ordered in the manner that it requires. The proprietary API returns to the operator evaluator an application entity that represents the result of the design action taken by the API. At step 512, the operator evaluator updates the data object pointer in the graph entity created for the operator result in step 413 of FIG. 6.

VIII. Representing Non-Directed Operations

The foregoing discussion has related solely to directed operations, which are represented in the dependency graph of the present invention with directed operators. A directed operator has a flow in one direction, from one or more inputs to an output. However, the present invention can also be employed in a software system that supports non-directed operations. For example, a command may be executed that represents the relationship A=B*C. If this were a directed operation, the user would only be able to edit the values of B and C and the directed operator would produce the appropriate value for A. However, if the command was a non-directed operation, the user would have the option of alternatively specifying a value for A, and having the system determine values of B and C so that their product equaled the value of A. A non-directed operation can propagate a change from any of its parameters, and there is no strict concept of inputs and outputs.

The present invention provides the capability to represent both directed and non-directed operations in a single dependency graph, with directed operations being represented by directed operators, and non-directed operations being represented by non-directed operators. Subject to some limitations discussed below, the present invention enables directed and non-directed operators to be implemented homogeneously throughout a dependency graph, such that the results of directed operators can be provided as inputs to non-directed operators, and vice versa.

It should be understood that in order to solve a group of interconnected non-directed operators, some solving engine must be provided. Non-directed operations are also commonly referred to as constraints, with a group of interdependent non-directed operations forming a constraint set. The present invention is directed to a method for representing non-directed operators in a dependency graph, with or without directed operators, but is not directed to any particular engine for solving constraint sets formed by groups of non-directed operators. The present invention represents the structural dependency of non-directed operators, groups them together constraint sets in a manner described below, and then provides the constraint sets to a constraint solving engine that solves them.

Examples of non-directed operations (i.e., constraints) include algebraic constraints such as the example discussed above, geometric constraints between two objects, such as establishing two lines to be parallel, perpendicular, etc., and spacial constraints for two objects requiring that the objects maintain some sort of spacial relationship. For example, the present invention may represent the structural dependency of a group of simultaneous equations and can provide them together as a constraint set to a solving engine. However, the present invention is not directed to any particular engine for solving the simultaneous equations.

As should be appreciated from the foregoing, when the embodiment of the present invention that supports non-directed operators is used, the software system on which the associativity subsystem of the present invention is installed will be provided with a constraint solving engine. The present invention is not limited in the types of constraints that can be represented. However, any particular software system on which the associativity subsystem of the present invention is installed may have a constraint solving engine that is limited in the types of constraints it can solve. When this occurs, the present invention checks the design generated by the user to determine whether each constraint set formed in the design is valid, i.e., is of a type that the constraint solving engine can form. If an unsupported constraint set is formed, the present invention detects this as an error condition in the manner described below.

Since directed operators can only be evaluated in one direction, there are limits on the manner in which directed and non-directed operators can be connected in a single dependency graph. An input to a non-directed operator is considered to have a fixed value if it is the result of a directed operator. Each non-directed operator must have at least one input that is not fixed. For example, for the non-directed operation discussed above wherein A=B*C, both inputs B and C cannot be fixed, because if they were, the operator would not be non-directed in that the required relationship cannot be maintained if the value of A were altered, because both B and C are fixed. Thus, the inputs B and C could not both be provided from directed operators, because both would be fixed, leading to an over-constrained case or error condition. However, so long as one of inputs B and C is unconstrained, for example being provided from another non-directed operator, no error condition occurs because as the value of A is altered, the unconstrained input B or C can be altered in the corresponding manner.

Another limitation placed on the use of directed and non-directed operators in a single dependency graph is that a cycle should not be formed in a graph to include any directed operators. As should be understood by those skilled in the art, a cycle in a graph occurs when the tracing of any valid flow path through the graph from a start points leads back to the start point. Although cycles can validly exist that include only non-directed operators, any cycle that includes a directed operator results in an over-constrained error condition.

When a non-directed operation is performed in a design, a checking routine of the present invention analyzes the dependency graph to determine whether a corresponding non-directed operator can be added without violating one of the above-described limitations. In particular, the routine ensures that the non-directed operator is not over-constrained and has at least one input whose value is not fixed. Additionally, the routine ensures that the adding of the non-directed operator does not result in the formation of a cycle in the graph that includes a directed operator. This is accomplished by the routine beginning at the added non-directed operator and walking through each valid path of the dependency graph to determine whether any of those paths arrives back at the non-directed operator being added. If either of the two prohibited conditions occurs, an error signal is generated such that the non-directed operator cannot be added to the dependency graph in the manner attempted by the user. If no error occurs, the non-directed operator is added to the graph.

As discussed above, the present invention is not directed to any particular engine for solving a set of constraints. Rather, the present invention is directed to the graphical representation of designs that may include sets of non-directed constraints. In the manner discussed below, the present invention determines the boundaries of each non-directed constraint set in a design, and provides those constraint sets to the solving engine for simultaneous resolution. Each cycle that includes only non-directed operators forms a constraint set, with the boundaries of the constraint sets being determined by the location of directed operators in the graph, or the boundaries of the graph itself.

1. Symbolic Evaluation Pass

As discussed above in connection with FIGS. 7a–7b, when the associative API processor 71 requests that an operator in the dependency graph be evaluated, an evaluate method is called that is generic to all operators. The evaluate method is called by a graph manager 75 (FIG. 5), which is a software entity described in further detail below and performs tasks involved in managing the dependency graphs created in accordance with the present invention. The basic steps performed by the evaluation method were described above in connection with FIGS. 7a–7b. A specific implementation for this method will now be described for the embodiment of the present invention that supports the use of non-directed operators. In accordance with this embodiment of the invention, a two-pass method is executed with respect to the dependency graph. During a first pass, referred to as the symbolic pass, the graph is interrogated to form a list of operators to be evaluated, as well as the order in which the list should be evaluated. The operators included in the list are either single directed operators, or constraint sets of non-directed operators that should be evaluated simultaneously by the constraint solving engine. The second step is the evaluation of each of the operators in the order specified by the list formed during the symbolic pass, and is referred to as the evaluation pass.

Figure 8:
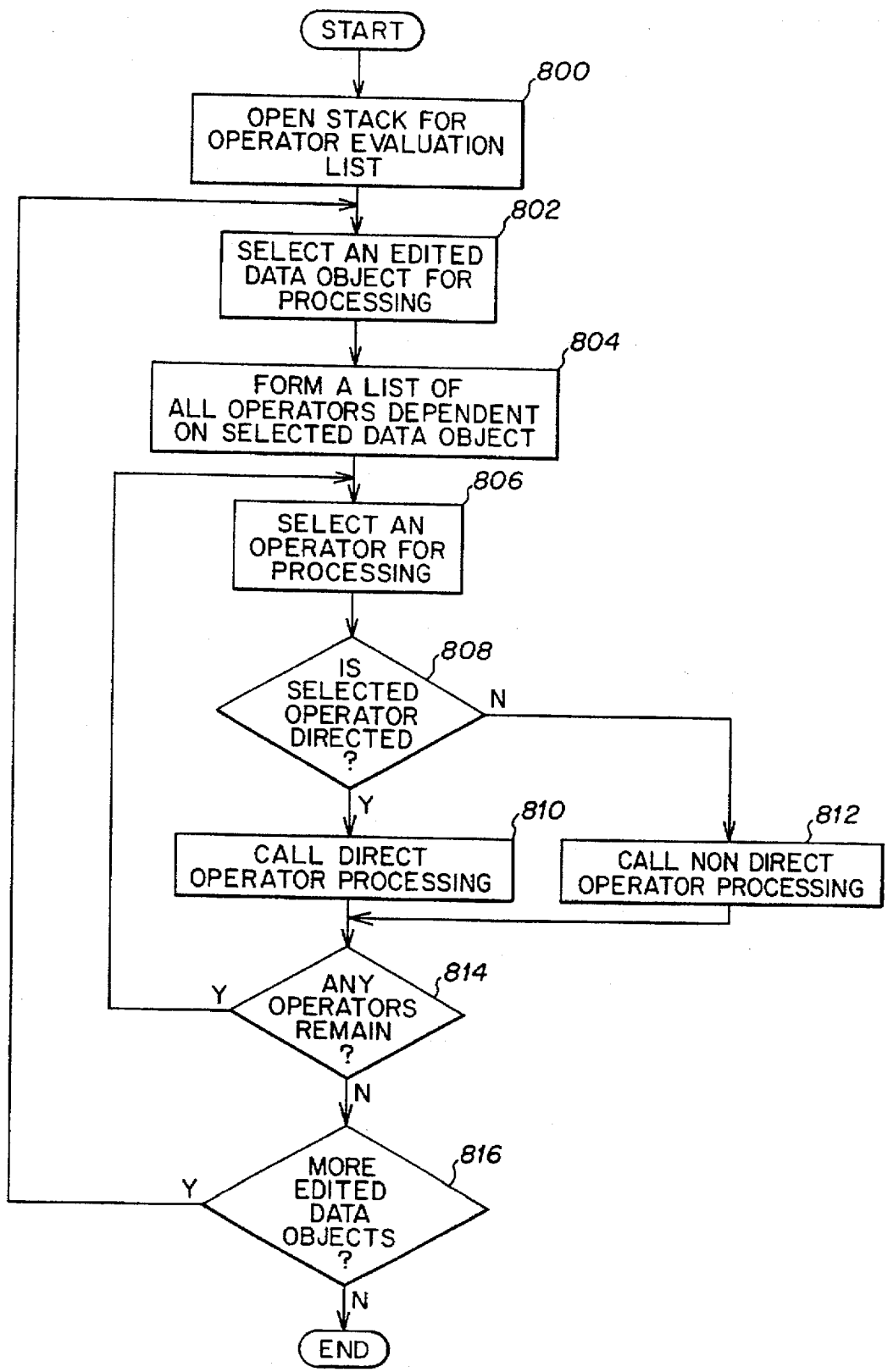
FIG. 8 is a flowchart of one implementation of the evaluation symbolic pass of the evaluation method of FIGS. 7a–7b.

The symbolic pass is represented by the flowchart of FIG. 8, and is called whenever the associative API processor 71 requests that an operator in the dependency graph evaluate itself. Initially, in step 800 a stack is opened up for the operator evaluation list which is created during the symbolic pass to define the order in which the operators and sets of constraints are to be evaluated. The stack created for this purpose is a first-in first-out stack onto which operators and constraint sets are pushed and popped in the manner described below. After the stack list is opened, the method proceeds to step 802 wherein an edited (i.e., out of synch) data object for the operator being evaluated is selected for processing. Typically, the associative API processor 71 will not demand the evaluation of an operator unless one of its data objects has been edited, requiring re-evaluation. However, when the visual editing capabilities of the present invention described below are employed, the operator itself may be changed without changing one of its data object inputs. If this occurs, the present invention establishes each of the data objects as being out of synch, so that each will be processed during the symbolic pass.

In step 804, the dependency graph is interrogated to form a list of all operators that are directly dependent on the data object selected for processing in step 802. A directed operator is directly dependent upon a data object when the data object is provided as an input to the operator, whereas a non-directed operator is directly dependent on a data object when it is directly connected to the data object in any fashion. No attempt is made in step 804 to propagate through the dependency graph and locate other operators that are indirectly dependent on the data object in that they may be affected by a change to it, because those operators will be identified through the recursive nature of the symbolic pass in the manner described below.

In step 806, one of the operators identified in the list formed during step 804 is selected for processing, and in step 808, a determination is made as to whether this operator is directed. When the selected operator is directed, the method proceeds to step 810, wherein a routine for processing directed operators (FIG. 9) is called. Conversely, when the selected operator is non-directed, the method proceeds to step 812, wherein a routine for processing non-directed operators (FIGS. 10a–10b) is called. The operator processing routines push the processed operators onto the operator evaluation stack in the proper order for evaluation, and are discussed in detail below.

When the appropriate processing routine called in either step 810 or 812 to handle the processing of the most recently selected operator returns to the symbolic pass, the method proceeds to step 814, wherein a determination is made as to whether any operators in the list formed in step 804 remain to be processed, and when any remain, the method returns to step 806 wherein another operator is selected for processing. In this manner, the method proceeds through steps 806–814 to process all of the operators in the list created in step 804 that are directly dependent upon the first edited data object selected for processing in step 802.

When it is determined at step 814 that no operators remain for processing, the method proceeds to step 816, wherein a determination is made as to whether any edited data objects for the operator whose evaluation called the method remain for processing, and when at least one remains for processing, the method returns to step 802, wherein another edited data object is selected for processing. In this manner, the method proceeds through steps 802–816 until all of the edited data objects for the operator being evaluated have been processed. When it is determined at step 816 that all of those data objects have been processed, the method terminates.

Figure 9:
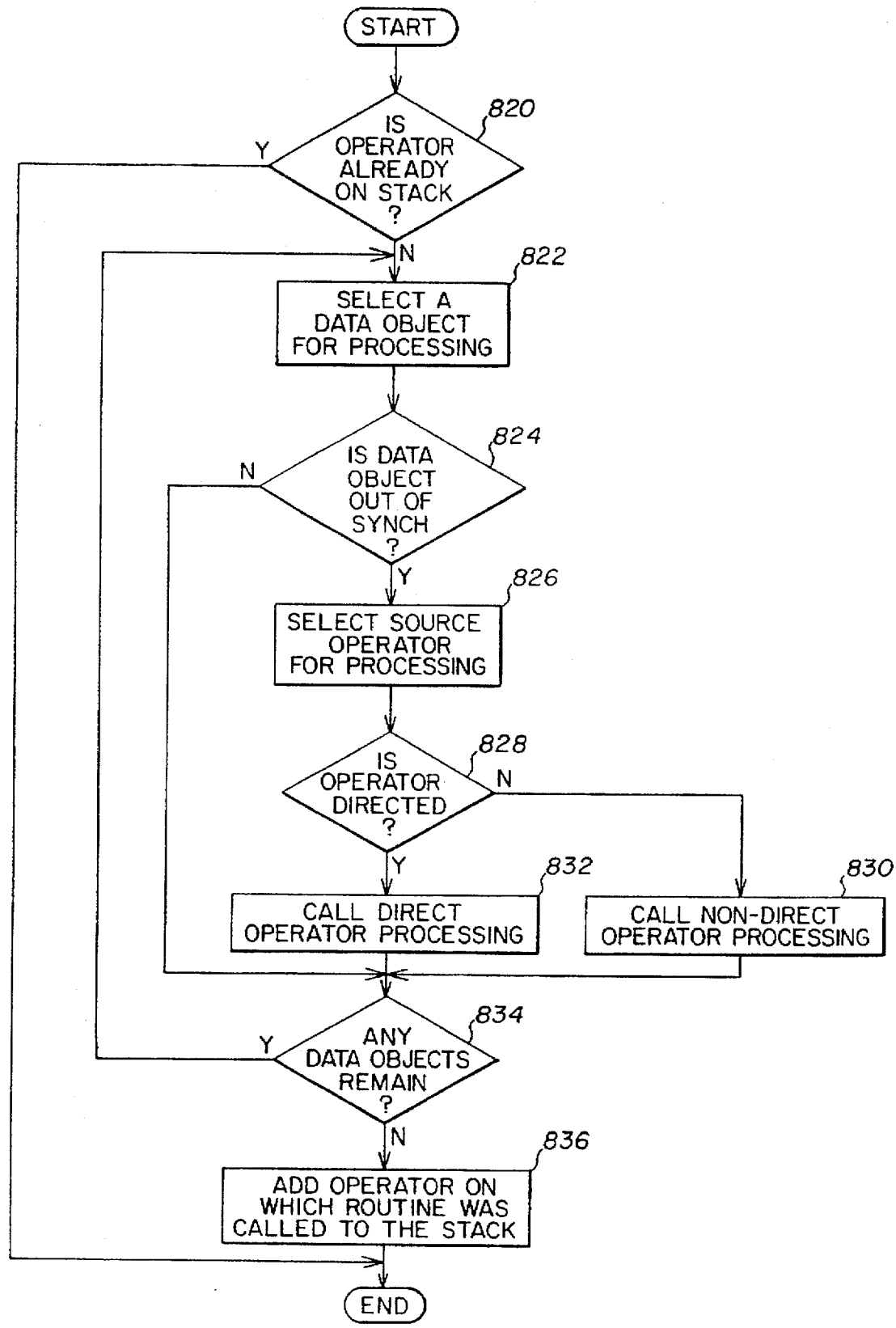
FIG. 9 is a flowchart of the directed operator processing routine of the present invention.
Figure 10A:
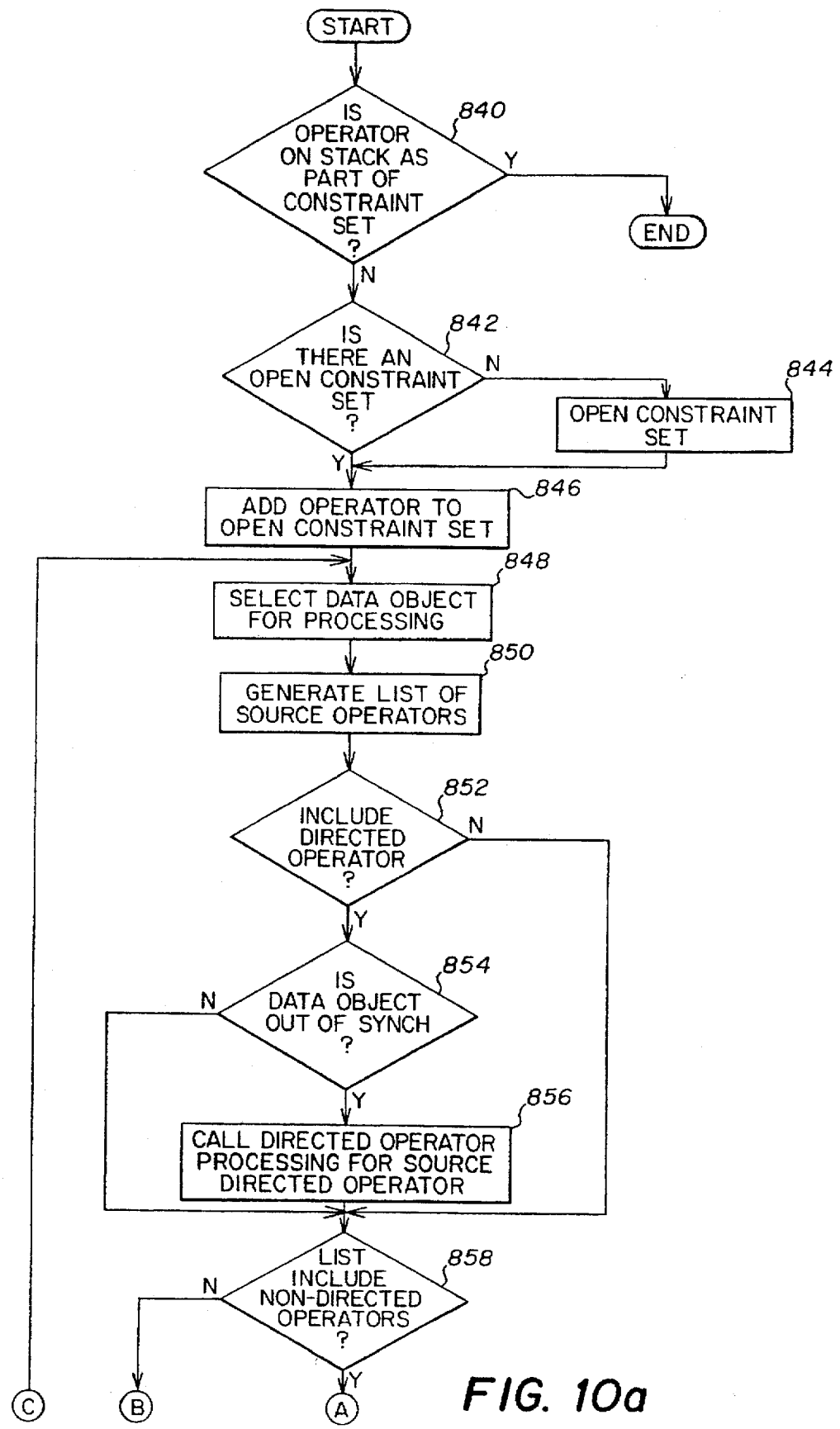
FIGS. 10a–10b are flowcharts illustrating the non-directed operator processing routine of the present invention.
Figure 10B:
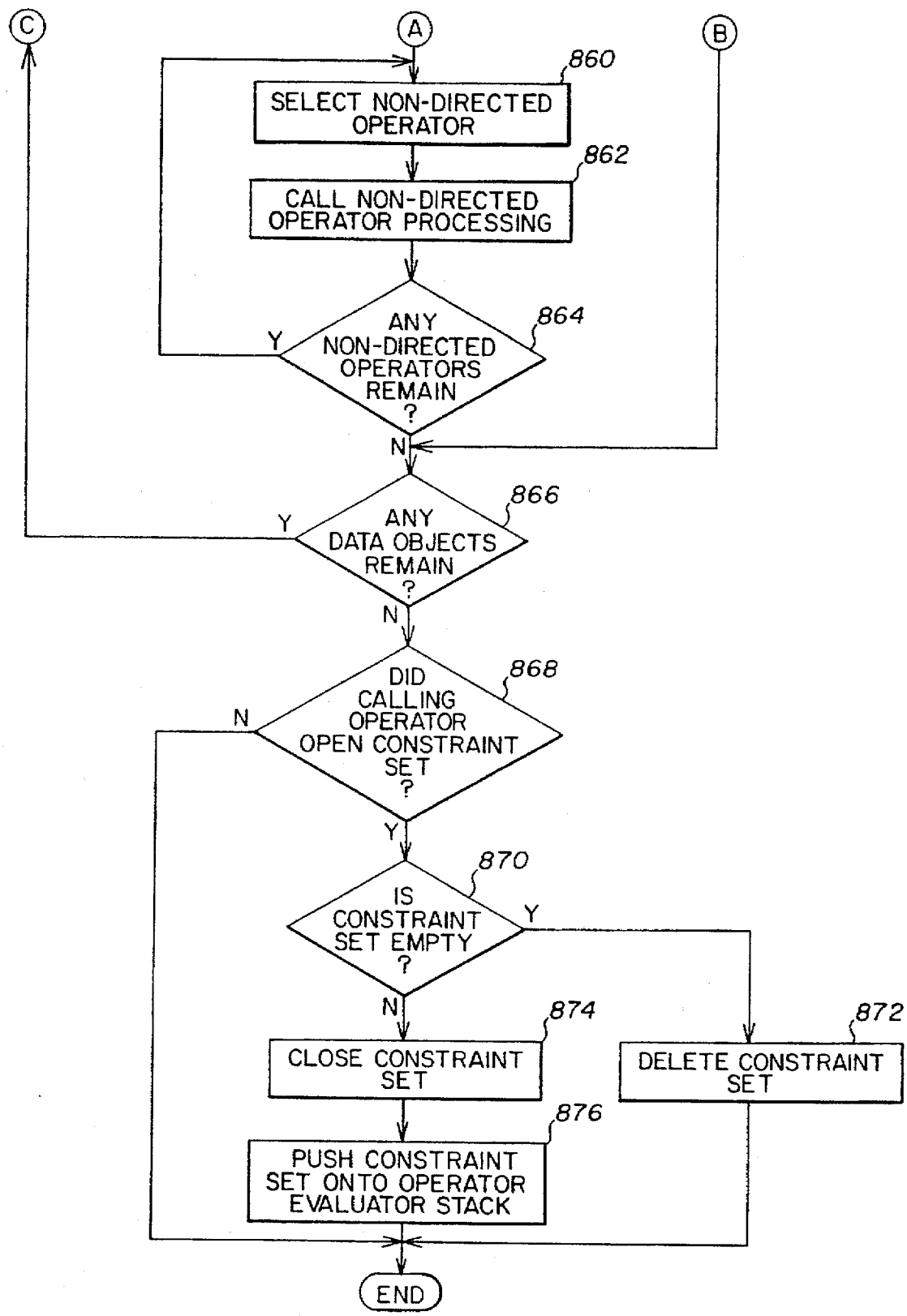

The direct operator processing routine called in step 810 of FIG. 8 is represented by the flowchart of FIG. 9. Initially, in step 820 the routine determines whether the operator being processed has already been pushed onto the operator evaluator stack, and when it has, the routine simply terminates. When it is determined that the operator has not already been pushed onto the stack, the method proceeds to step 822, wherein one of the data objects input to the directed operator is selected for processing. In step 824, a determination is made as to whether the selected data object is out of synch, and when it is, the method proceeds to step 826 wherein the operator that sources that data object is selected for processing. The method then proceeds to step 828, wherein a determination is made as to whether the operator selected for processing in step 826 is a directed or non-directed operator.

When the source operator is a non-directed operator, the method proceeds to step 830 wherein the non-directed operator processing routine is called to process that operator in the manner discussed below. Conversely, when the source operator is directed, the directed operator processing routine is re-called to process that operator in step 832. In this manner, the directed and non-directed operator processing routines are executed in a recursive manner to step through the dependency graph and process all of the operators that require reevaluation to generate the data objects operated upon by the operator whose evaluation initiated the call to the symbolic evaluation pass (FIG. 8). It should be understood that the evaluation or re-evaluation of the dependency graph should be performed by evaluating the operators or sets of constraints on the left-hand side of the graph first, and the proceeding through the graph in a left-to-right manner. By executing the operators in this manner, it will be ensured that no operator is evaluated until all operators that affect its data objects have been updated.

When it is determined at step 824 that the selected data object of the operator being processed is not out of synch, or after the appropriate routine has been called to process the source operator for that data object in either of steps 830 or 832 when the data object is out of synch, the method proceeds to step 834, wherein a determination is made as to whether any data objects for the selected operator remain to be processed. When it is determined at step 834 that at least one data object remains to be processed, the routine returns to step 822, wherein another data object is selected for processing. In this manner, the method proceeds through steps 822–834 to process all of the data objects for the operator whose evaluation caused the symbolic evaluation pass (FIG. 8), and thus the directed operator processing routine, to be called.

Finally, when it is determined at step 834 that no data objects remain to be processed for the operator whose evaluation called the processing routine, the operator is pushed onto the operator evaluation stack in step 836.

The recursive nature of the directed and non-directed operator processing routines ensures that the operators in the dependency graph will be evaluated in the correct order to achieve the above-described desired results. As seen from the foregoing description of FIG. 9, an operator is not pushed onto the evaluation stack in step 836 until it is determined at step 834 that all of its data objects have been processed. Furthermore, during the processing of the data objects, for each that is out of synch, the directed or non-directed operator processing routine is called to process the operator that sources the data object. When the processing routine of FIG. 9 is called to operate upon to those source operators, a determination is similarly made to ensure that each of its data objects are up to date, and when any is not, the routine is called again to process that source operator. Because of this recursive nature of the routine, each operator that must be evaluated to provide an updated data object to another operator is pushed onto the stack in step 836 during its corresponding execution of the routine before the operator that responds to its data object, and therefore, will be evaluated before any operator that is dependent upon its result. The operator whose evaluation initially called the symbolic pass routine (FIG. 8) is the first to be processed, and therefore, is at the highest level of the recursive process of the routine. Therefore, this operator is pushed onto the operator evaluator stack only after each of the operators that produce a result that it depends upon have been pushed onto the stack during previous iterations of the recursive process.

The non-directed operator processing routine is represented by the flowchart of FIG. 10. As with the directed operator routine of FIG. 9, the routine of FIG. 10 is initially called when the associative API processor 71 demands the evaluation of an operator in the dependency graph. In step 840, a determination is made as to whether the operator has already been pushed onto the operator evaluator stack as part of a previously defined constraint set, and when it has, the routine terminates. If the operator is not already on the stack, the method proceeds to step 842, wherein a determination is made as to whether a constraint set is currently open, and if one is not, the method proceeds to step 844 wherein a constraint set is opened.

As discussed above, the present invention may be installed on a software system that includes a constraint evaluator engine for evaluating constraint sets that can include multiple non-directed operators. In order to evaluate such a constraint set correctly, the engine should receive the the set of tightly coupled non-directed operators as a group. Therefore, when evaluating a dependency graph that includes both directed and non-directed operators, the dependency graph is organized by the symbolic pass of FIG. 8 so that the constraint sets can be provided to the engine as a group.

As discussed above, directed operators are simply pushed onto the operator evaluator stack in their proper order for evaluation due to the recursive nature of the directed operator processing routine. However, a constraint set is not pushed onto the operator evaluator stack until the entire set has been processed. Only after each of its non-directed operators has been processed is the constraint set pushed onto the operator evaluator stack. Each constraint set is pushed onto the stack in the proper evaluation order relative to other constraints sets and directed operators in the dependency graph, which may occur well after the set was opened.

After a constraint set is opened in step 844, or when it is determined that one was already opened in step 842, the method proceeds to step 846 wherein the non-directed operator being processed is added to the open constraint set. Thereafter, in step 848, one of the data objects associated with the non-directed operator is selected for processing. The method then proceeds to step 850, wherein a list is formed of the operators that directly source the data object selected in step 848. Non-directed operators directly source the data object if they are directly connected to it, whereas directed operators directly source the data object if it is their result data object.

In step 852, a determination is made as to whether the list of direct source operators generated in step 850 includes a directed operator. No more than one directed operator may source any single data object. When it is determined that the list of direct source operators includes a directed operator, the method proceeds to step 854, wherein a determination is made as to whether the selected data object is out of synch. When the data object is out of synch, the method proceeds to step 856, wherein the directed operator processing routine of FIG. 9 is called to process the directed operator that sources the selected data object.

As discussed above in connection with FIG. 9, the calling of the directed operator processing routine will result in the processing of not only the directed operator that it is initially called to process, but also all other operators, directed or non-directed, that generate data objects on which it directly or indirectly depends. Thus, by calling the directed operator processing routine prior to completing the processing of the constraint set, the non-directed operator processing routine of FIG. 10 ensures that any directed operators that feed the constraint set will be placed upon the operator evaluator stack before the constraint set. Since the output of a directed operator will be fixed with respect to the constraint set, the method of FIG. 10 ensures that any fixed values to the constraint set are evaluated before the constraint set is passed to the constraint solving engine for resolution.

When either the directed operator processing routine returns to step 856, it is determined at step 854 that the selected data object is not out of synch, or it is determined at step 852 that the list of source operators generated at step 850 does not include a directed operator, the method proceeds to step 858. In step 858, a determination is made as to whether the list of source operators generated in step 850 includes a non-directed operator, and when it does, the method proceeds to step 860, wherein a non-directed operator is selected for processing, and then to step 862 wherein the non-directed operator processing routine is called for the selected operator.

As should be appreciated from the foregoing, like the routine of FIG. 9 for processing directed operators, the non-directed operator processing routine of FIG. 10 operates in a recursive manner, However, there is a significant difference between the recursive nature of these routines. As discussed above, the recursive nature of the directed operator routine of FIG. 9 is the technique by which the directed operators are pushed onto the operator evaluator stack in the order in which they are to be executed. By contrast, and as should be seen from the above-described steps of the non-directed operator processing routine, when non-directed operators are processed, they are not individually pushed onto the operator evaluator stack, but rather, are simply added to an open constraint set. The order in which the non-directed operators are placed into the constraint set is not significant, since the constraint resolving engine will operate upon all of the non-directed operators in the set simultaneously. Therefore, the recursire nature of the routine shown in FIG. 10 is employed solely to ensure that all of the non-directed operators in a constraint set are added to the set, and is not employed to ensure any order in which they are added to the set because that order is irrelevant.

After the non-directed operator processing routine returns from processing the non-directed operator selected in step 860, the method proceeds to step 864. In step 864, a determination is made as to whether any non-directed operators remain for processing, and when at least one remains to be processed, the method returns to step 860 wherein another non-directed operator is selected for processing. In this manner, the routine steps through each of the non-directed operators in the list of source operators generated in step 850, until it is determined in step 864 that all of the non-directed operators have been processed.

When it is determined in step 864 that no non-directed operators remain to be processed, or when it is determined at step 858 that the list of source operators does not include any non-directed operators, the method proceeds to step 866. In step 866, a determination is made as to whether any data objects remain to be processed for the non-directed operator for which the routine was called, and when at least one data object remains to be processed, the method returns to step 848 wherein another data object is selected for processing. In this manner, the method proceeds through steps 848–866 until all of the data objects for the operator for which the routine was called have been processed.

When it is determined at step 866 that no data objects remain to be processed, the method proceeds to step 868 wherein a determination is made as to whether the non-directed operator for which the routine was called opened a constraint set. This step is included in the routine due to the recursire nature of its execution. When the routine is executed for an operator that did not open the currently open constraint set, other non-directed operators may remain to be processed that should be added to the constraint set, and therefore, the constraint set should not yet be closed and added to the operator evaluator stack. Therefore, when it is determined at step 868 that the calling operator did not open the constraint set, the method simply terminates, which will return to step 858 of the next highest level in the recursire execution of the routine.

When it is determined at step 868 that the calling operator opened the currently open constraint set, the method proceeds to step 870 wherein a determination is made as to whether the constraint set is empty, and when it is, the method proceeds to step 872 where the constraint set is deleted prior to termination of the method. When the constraint set is not empty, the method proceeds to step 874 where the constraint set is closed, and then in step 876 the closed constraint set is pushed onto the operator evaluator stack as its most recent entry prior to termination of the method.

2. Evaluation Pass

Figure 11:
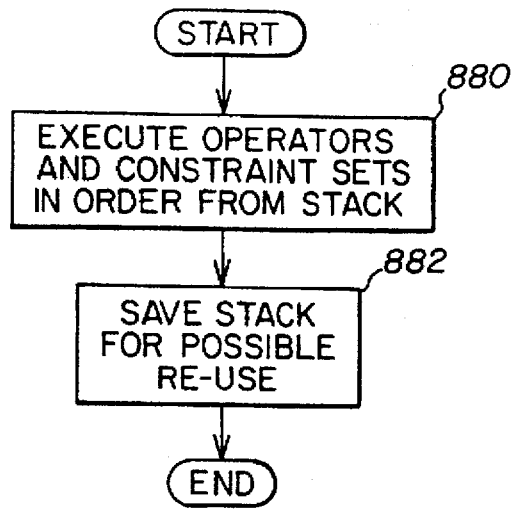
FIG. 11 is a flowchart illustrating the evaluation pass of the evaluation method of FIGS. 7a–7b.

As should be appreciated from the foregoing, the recursive execution of the directed and non-directed operator processing routines of FIGS. 9 and 10 during the symbolic pass places directed operators and constraint sets of non-directed operators onto the operator evaluator stack in the order in which they should be evaluated. Therefore, the routine that executes the actual evaluation pass to update the graph is straightforward, and is represented by the flowchart of FIG. 11.

Initially, in step 880 the method executes the operators and constraint sets in the order specified by the stack. The evaluation routine implemented for each operator and constraint set was discussed above in connection with FIGS. 7a and 7b and involves the collection and formatting of arguments, and then calling the appropriate proprietary APIs to update the design. The method then proceeds to step 882, wherein the stack is saved for potential re-use in connection with one embodiment of the invention. Depending upon the nature of the changes made by the user, it may be possible to re-evaluate the graph two or more times without requiring separate symbolic passes for each re-evaluation. In particular, if a user re-edits any leaf node data objects that are input to the graph, the symbolic pass need not be re-executed because the results on the operator evaluator stack will be identical. Additionally, if the only change to the design is the editing of data objects that are inputs to directed operators that are already on the operator evaluator stack, the symbolic pass again need not be executed.

IX. Integration Process

As should be appreciated from the foregoing, the present invention can be used in conjunction with any software system composed of functions, following the installation of the software of the present invention, and the execution of an integration process on the software system. The associated API processor function and the associative variable class are generic with respect to the specifics of the software systems on which the present invention can be installed, and therefore, are provided in the installed software. The installed software executes an integration process shown in FIG. 12. The details of each step of the process were described above. Initially, in step 301 the class definition of each application entity generated by the software system to represent a portion of the product design, as well as those that represent the arguments input to the design, are modified to inherit from the associative variable class so that they have the above-described capabilities used in determining if and where they are participating in the dependency graph. Next, an AAPI is generated for each proprietary API in the software system in step 302.

Thereafter, the user interface is modified at step 303 so that in response to commands received from the user, the user interface calls the AAPIs generated in step 302, rather than directly calling the APIs of the software system. Finally, in step 304 an initialization function is executed which generates the graph manager, and which causes the graph manager to create the software entities that form the entries of the hash table.

Figure 12:
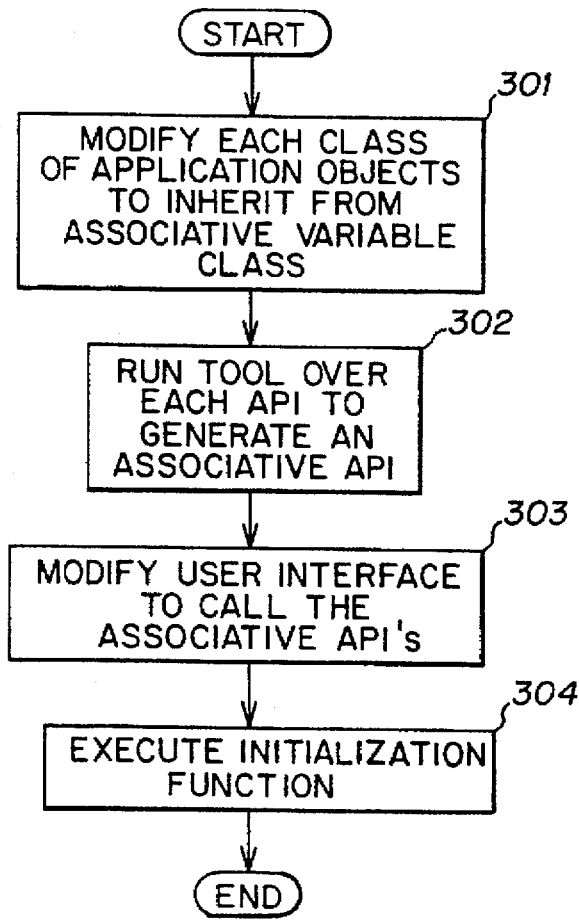
FIG. 12 is a flowchart representing the steps of an integration process of the present invention that integrates the present invention into a software system.

Once the integration process of FIG. 12 is executed on a software system, the system is provided with the capabilities of the present invention in a manner that is transparent to the user, and does not require special user training. In addition, it should be appreciated that the operation of the integration process on a software system provides parametric capability to the system, even if no such capability was provided in the proprietary commands and corresponding APIs in the system. As discussed above, this characteristic of the present invention facilitates third parties providing add-on capabilities to the software system, because additional commands provided by the third party need not be integrated into the command set of the software system to provide parametric capabilities.

X. Parametric Capabilities

As discussed above, one of the advantages of the present invention is that when modifications are made to the product design, the modifications are incorporated into the design using the dependency graph so that only those operators with results that are affected by the modification are re-evaluated. This aspect of the present invention is controlled by the graph manager 75 (FIG. 5). The graph manager is a software entity that receives inputs from the user interface 37 to determine when modifications have been made to the product design. Most CAD systems include a parametric interactor which, after an application entity (e.g., a box, cylinder, etc.) has been added to the design, allows the user to make modifications to the parameters relating thereto, e.g., changing the length, width and/or height of a previously created box.

In conjunction with the present invention, a change to a parameter in the design results not only in a change to the product design 45 (FIG. 3) output from the system, but also modifies at least one argument associated with a data object in the dependency graph. Thus, when the software system provides a parametric interactor that allows a user command to change a parameter of the design, the present invention associates the command received from the user with the data object that represents the changed parameter in the dependency graph. Specifically, when the user enters a command to change a parameter, the new argument is passed from the user interface 37 to the graph manager 75, which updates the memory location pointed to by the corresponding data object in the dependency graph to reflect the changed argument.

Thereafter, the graph manager 75 executes the two pass process for propagating the change into the product design 45 discussed above in connection with FIGS. 8–11.

In one embodiment of the invention, changes to existing design parameters are not immediately incorporated into the product design. Rather, updates to the design are not implemented unless and until the user requests recalculation. This feature is advantageous when, for example, a user wishes to change several parameters before updating the design, because the system conserves resources by not recalculating after each parameter change. When the user requests recalculation, the graph manager 75 instructs the associative API processor 71 to cause the operators in the dependency graph that depend upon a changed parameter to re-evaluate themselves in the manner described above. In one embodiment of the invention, two modes of recalculation are provided. A first mode is known as regeneration forward and involves the recalculation of all operators that are dependent upon a change parameter. The second mode is known as regeneration on demand and is demand driven. In this second mode, the user can specify only a subset of the design to be updated. For example, the user may request to see the results of a parameter change on only a portion of the design. Making reference to the illustrative example of FIG. 2, the user could for example make a change to the length parameter associated with data object 3, and request to see the impact that this parameter change would have with respect only to the generated box. If the user made such a demand, the graph manager 75 would instruct the associated API processor 71 to cause only the operator 7 to re-evaluate itself. Thus, although the operator 19 is also dependent upon the parameter associated with data object 3, the graph manager would not instruct the associative API processor 71 to cause operator 19 to re-evaluate itself because this was not demanded by the user.

XI. Hierarchical Operators

In one embodiment of the invention, a capability is provided to represent operations performed by the user in a hierarchical manner in the dependency graph. Hierarchical operators are created that each represents one or more lower level operators arranged in some logical manner to represent a design goal of the user. As discussed in more detail below, the hierarchical capability can be employed by the user to group together in a hierarchical manner multiple commands of the software system on which the associativity subsystem of the present invention is installed, and can also be used by the software system to group a command and one or more subcommands in a single hierarchical group.

The hierarchical capability of the present invention allows a set of low level design operations to be organized and represented as a single higher level goal oriented activity of the user in the dependency graph. For example, a user designing a rotor for an automobile on a CAD system may create a first hierarchical operator by grouping together all of the low level operators used to define the lug connections for the rotor, and a second hierarchical operator by grouping together the low level operators used to add cooling channels into the rotor. By grouping together a number of low level operators and representing them with a single hierarchical operator, the dependency graph generated for the design can be simplified to represent the goal oriented activity of the user more meaningfully. Additionally, once they are formed, the hierarchical operators can be copied for use in other places in the design so that the low level design operations that created the hierarchical group need not be duplicated.

When the associativity subsystem of the present invention is integrated into a software system, the resulting associative system can also implement the hierarchical capability to group together a command with a corresponding series of subcommands that are typically executed by the user along with the command to define certain characteristics of the command. For example, many CAD systems employ features, which are a form of higher level geometric modeling that correlates to the design goals of the user, but require the execution of subcommands with the feature to define the specifics of the design goal. Employing the hierarchical capability of the present invention, a CAD system on which the associativity subsystem of the present invention is installed can represent high level features in the dependency graph using a hierarchical operator, rather than requiring that each feature be represented by separate operators for the main command and all of its supporting subcommands that may be required to define the potentially complex geometric modeling function performed by the feature.

Figure 15:
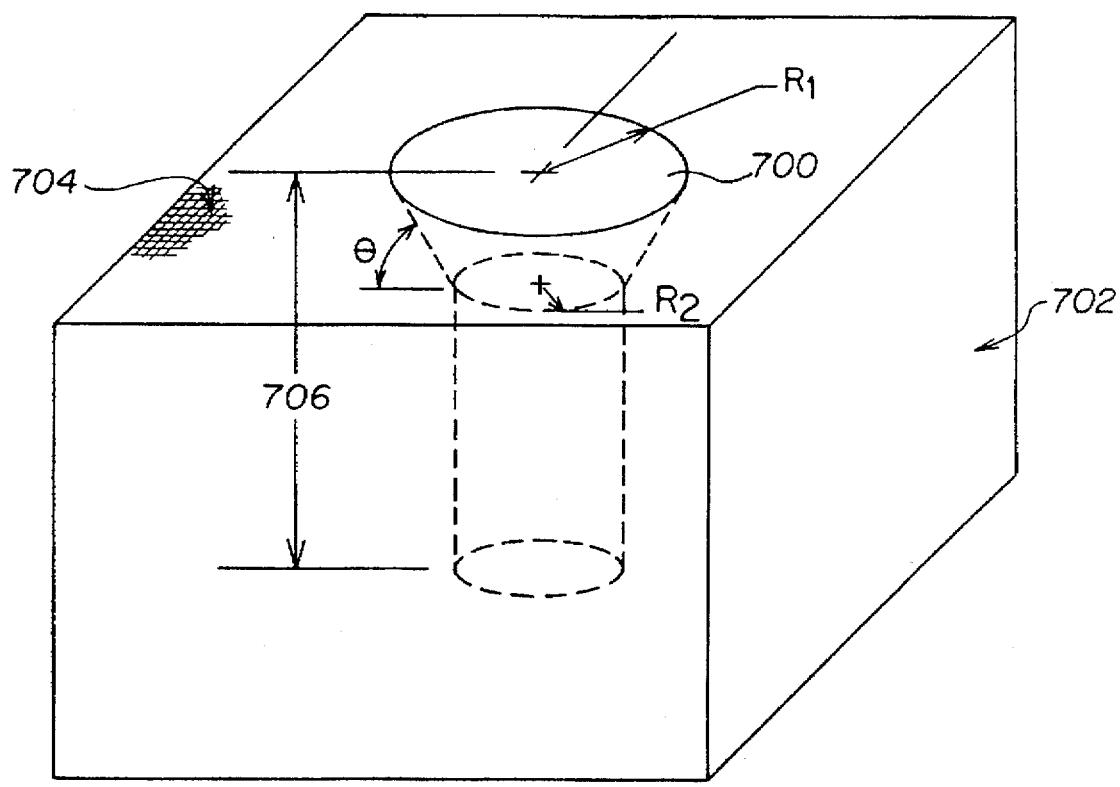
FIG. 15 illustrates a box having a countersunk hole provided therein.

An example of a common CAD feature is a hole, of which there are many different types. FIG. 15 shows an example of a countersunk hole 700 provided in a box 702. To insert the countersunk hole in the box 702, the user specifies a number of defining parameters, including a face datum 704 into which the hole is to be provided, the position of the hole center on the face datum, the depth 706 of the hole, the radius $R_2$ of the hole, the radius $R_1$ of the countersink, and the angle $\theta$ of the countersink. These parameters are specified by executing a group of subcommands along with the feature command for creating the countersunk hole.

Figure 16:
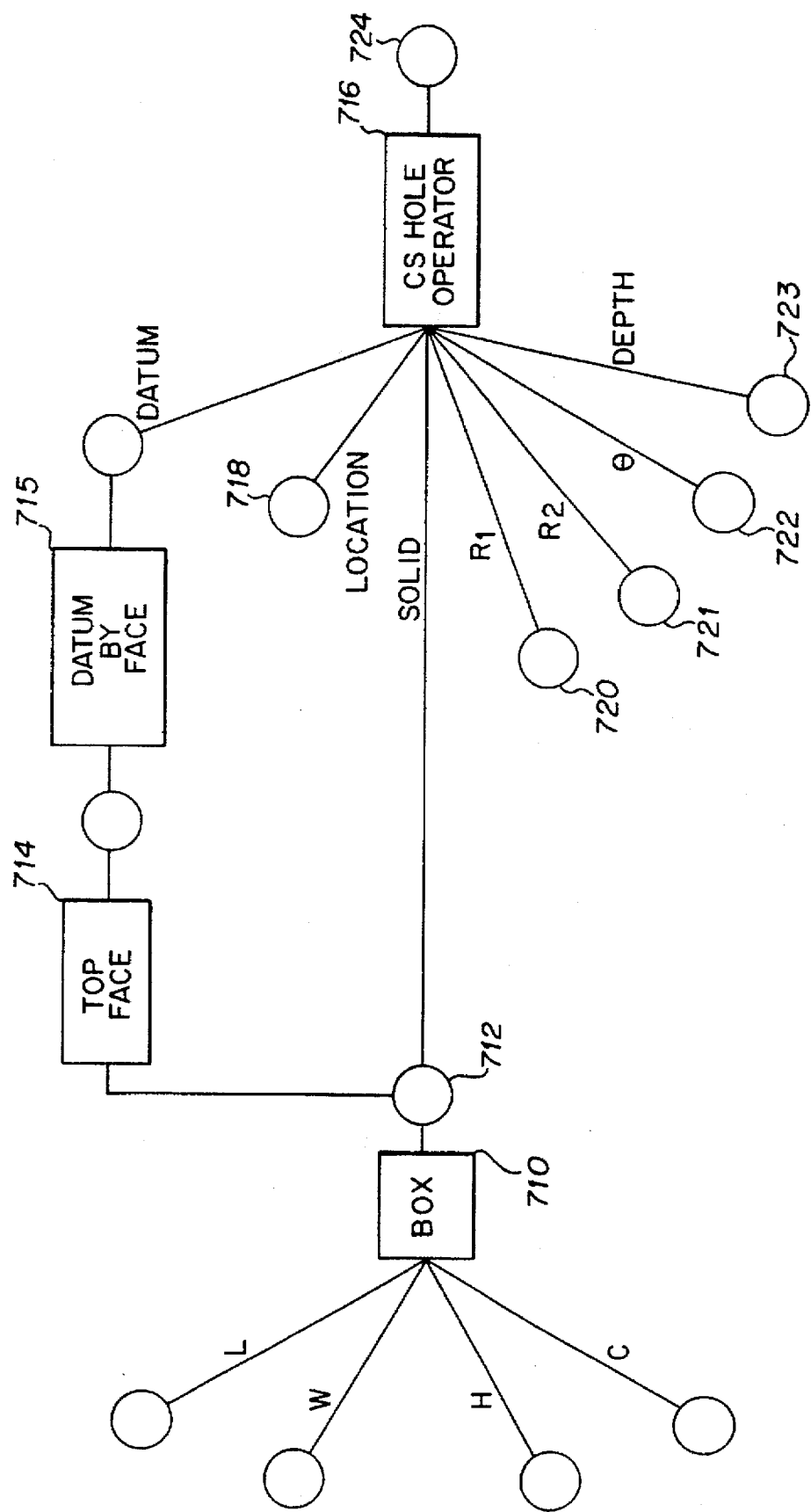
FIG. 16 is an illustrative dependency graph of the present invention without the use of a hierarchical operator.

If the hierarchical capability of the present invention were not employed, the design action of a user defining a box with a countersunk hole would be represented by a dependency graph such as the one shown in FIG. 16. The output of operator 716 is a data object 724 that represents the resulting application entity defining the box with a countersunk hole. As shown, box itself is represented by a data object 712 that is the result of a box operator 710 having a plurality of relations and data objects as inputs. The insertion of the countersunk hole in the box is represented by three operators 714–716 that correspond to the feature command and two supporting subcommands. The operator 714 is connected to the data object 712 representing the box, and represents a subcommand executed by the user to select the top face of the box as the portion thereof into which the countersunk hole is to be provided. The result of operator 714 is the top face of the box. Operator 715 receives this result and represents a subcommand executed by the user to select the datum for the top face to receive the countersunk hole. The result of operator 715 is input to the countersunk hole operator 716, which represents the feature command. In addition to the datum input, the countersunk hole operator also is connected to data object 718 that represents the location of the hole, data object 712 representing the solid (i.e., the box into which the hole is to be provided), and data objects 720–723 that respectively represent the radiuses $R_1$, $R_2$, the angle $\theta$, and the depth for the countersunk hole.

Figure 17:
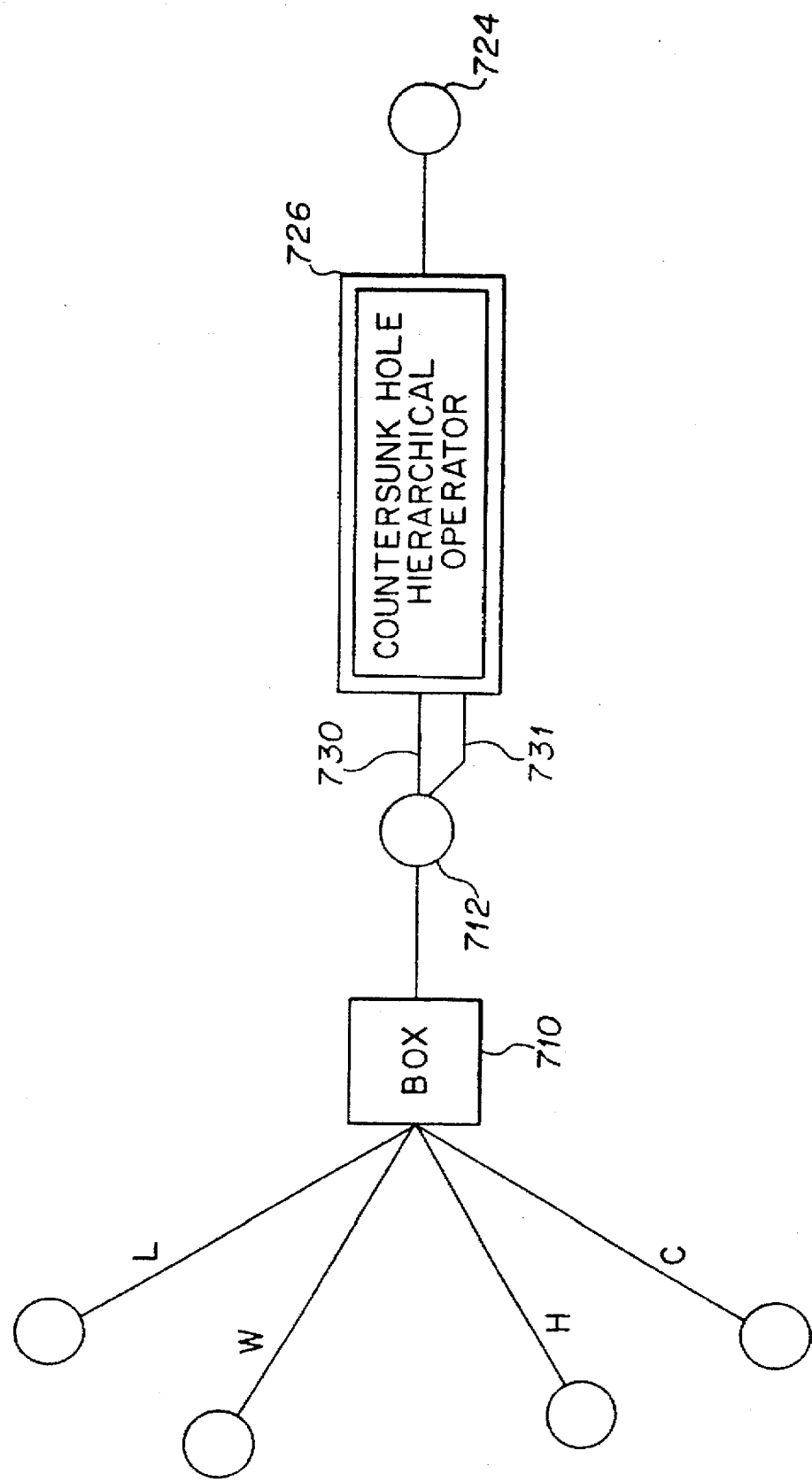
FIG. 17 is a representation of the dependency graph of FIG. 16 using a hierarchical operator.

When the hierarchical capability of the present invention is employed, the dependency graph that represents the above-described design action can be generated in a manner shown in FIG. 17. The operators 714–716 of FIG. 16 are represented by a single hierarchical operator 726, which represents the creation of a countersunk hole in the box. The hierarchical operator 726 is shown as having two inputs that import data object 712 that represents the box into the hierarchy for connection to internal operators 714 and 716, and a single result data object 724. Each of the data objects that is input to the operators 714–716 but is internal to the hierarchical operator is not shown to simplify the graph. The data object 712 that represents the box is connected through two relations 730 and 731 to represent that this data object is provided to two separate operators (i.e., 714 and 716) internal to the hierarchical operator 726. The result of the hierarchical operator is connected to the same result data object 724 output from operator 716, which represents the application entity defining the box having the countersunk hole.

As should be appreciated from a comparison of the dependency graphs of FIGS. 16 and 17, the hierarchical operator capability of the present invention allows for the representation of the user's design intent at a higher level, without cluttering the dependency graph with a number of operators that are merely tangential to the user's intent.

A software system on which the associativity subsystem of the present invention can be integrated may include a number of hierarchical features that each may be desirable to represent in the dependency graph with a single hierarchical operator. For those features, the software system can employ the hierarchical operator capability of the present invention in a manner discussed below to represent those features in a hierarchical manner. This capability is particularly useful in connection with commands that require the execution of a feature API to implement the user's design goal, and also several additional APIs relating to subcommands that define the data on which the API operates. The hierarchical operator capability of the present invention allows the group of multiple APIs to be represented as a single operator which more accurately represents the design intent of the user.

As discussed below, in one embodiment of the invention, the dependency graph can be edited in a graphical mode. When this capability is employed, the user is provided with flexibility as to the level of detail in the dependency graph representation of the design. For example, for the dependency graph of FIG. 17 in which the hierarchical operator 726 is used, the user may desire to view the graph in more detail, and may select a different viewing mode wherein the hierarchical operator 726 is opened up to reveal the more detailed representation of the hierarchical operator shown in FIG. 16. When this occurs, some demarcation of the hierarchy may be provided in the more detailed representation, such as by drawing a dotted line around graph elements that are included within a single hierarchical block that has been opened up.

When a hierarchical operator is created for the dependency graph, the present invention provides a scheme for defining its inputs and outputs. In this manner, clear boundaries are defined for each operator in the dependency graph so that relations do not cross hierarchical boundaries. In addition, because the user is provided with the capability to open up a hierarchical operator to view its more detailed representation, each level of the hierarchy below its top level should also be able to obtain its inputs and outputs from other graph data objects without having a relation that crosses a hierarchical boundary. This is achieved by ensuring that an input or output is provided from each hierarchical operator for every one of its internal data objects that is input from, or output to, an operator in the dependency graph that is outside the boundary of the hierarchical operator. By carefully managing the visibility of data objects across hierarchical boundaries, the re-use of hierarchical operators in other places in the design is facilitated, and support is provided for the code generation feature of the present invention discussed below.

The manner in which visibility of data objects shared by more than one operator across a hierarchical boundary is maintained is analogous to the manner in which variables are scoped across functions in a standard programming language such as C. Two criteria are established for ensuring the management of data objects across hierarchical boundaries. First, if a hierarchical operator seeks to reference (either as an input or output) a data object that is referenced by another operator is outside of its hierarchical boundary, the data object included in the argument list for the hierarchical operator. Second, the relationship between the hierarchical operator and the other operator that references the data object is provided in a parent function that contains both operators. The parent function can be a higher level hierarchical operator that contains both, or can be the root of the dependency graph itself.

To facilitate management of data objects across hierarchical boundaries, two additional software entities are created for hierarchical operators. The first is an input/output (IO) port created for each input and output that crosses the hierarchical boundary. The second is a list of the IO ports for the hierarchical operator, referred to as an IO_OP.

As discussed above in connection with the comparison of the dependency graphs shown in FIGS. 16 and 17, in one embodiment of the present invention, the only data objects ported (i.e., brought out externally as an input or output) from a hierarchical operator are those that are referenced as inputs or outputs from an operator that is outside the boundary of the hierarchical operator. Thus, because data objects 718 and 720–723 (FIG. 16) are only internal to the hierarchical operator 726, they are not ported from the hierarchical operator to be represented in the dependency graph of FIG. 17 to clarify and reduce the complexity of that graph. In an alternate embodiment of the invention, all of the data objects input to each hierarchical operator, even those not sourced from another operator, can be ported from the hierarchical operator and represented in the dependency graph.

As discussed above, each hierarchical operator has an IO_OP list that identifies its IO ports. This list is dynamic, and additional ports are added as needed when operators are added to the design that reference a data object previously internalized within the hierarchical operator. The dynamic nature of the IO_OP list makes it unnecessary to port all inputs and outputs out of the hierarchical operator, which as discussed below, would be disadvantageous with respect to the size and clarity of the resulting dependency graph.

As should be appreciated from the foregoing, the specific entries, in the IO_OP for a hierarchical operator are dependent upon the context of the design in which the hierarchical operator is employed. If a hierarchical operator were created to generate a countersunk hole as described above in connection with the example of FIGS. 15–17, that hierarchical operator can be copied by the user and used in a different portion of the design. Each instance of the hierarchical operator in the design can be different in terms of the inputs and outputs scoped out to other operators in the dependency graph, requiring a different IO_OP for each instance of the hierarchical operator. For example, if the countersunk hole hierarchical operator 726 was replicated in the design, the data object 723 (FIG. 16) that defines the depth of the hole could be provided as the result of an operator outside the boundary of the countersunk hole hierarchical operator. For that instance of the hierarchical operator, the data object 723 would be exported from the hierarchical operator by creating an IO port for it, and including the IO port in the IO_OP for that instance of the hierarchical operator.

Figure 18:
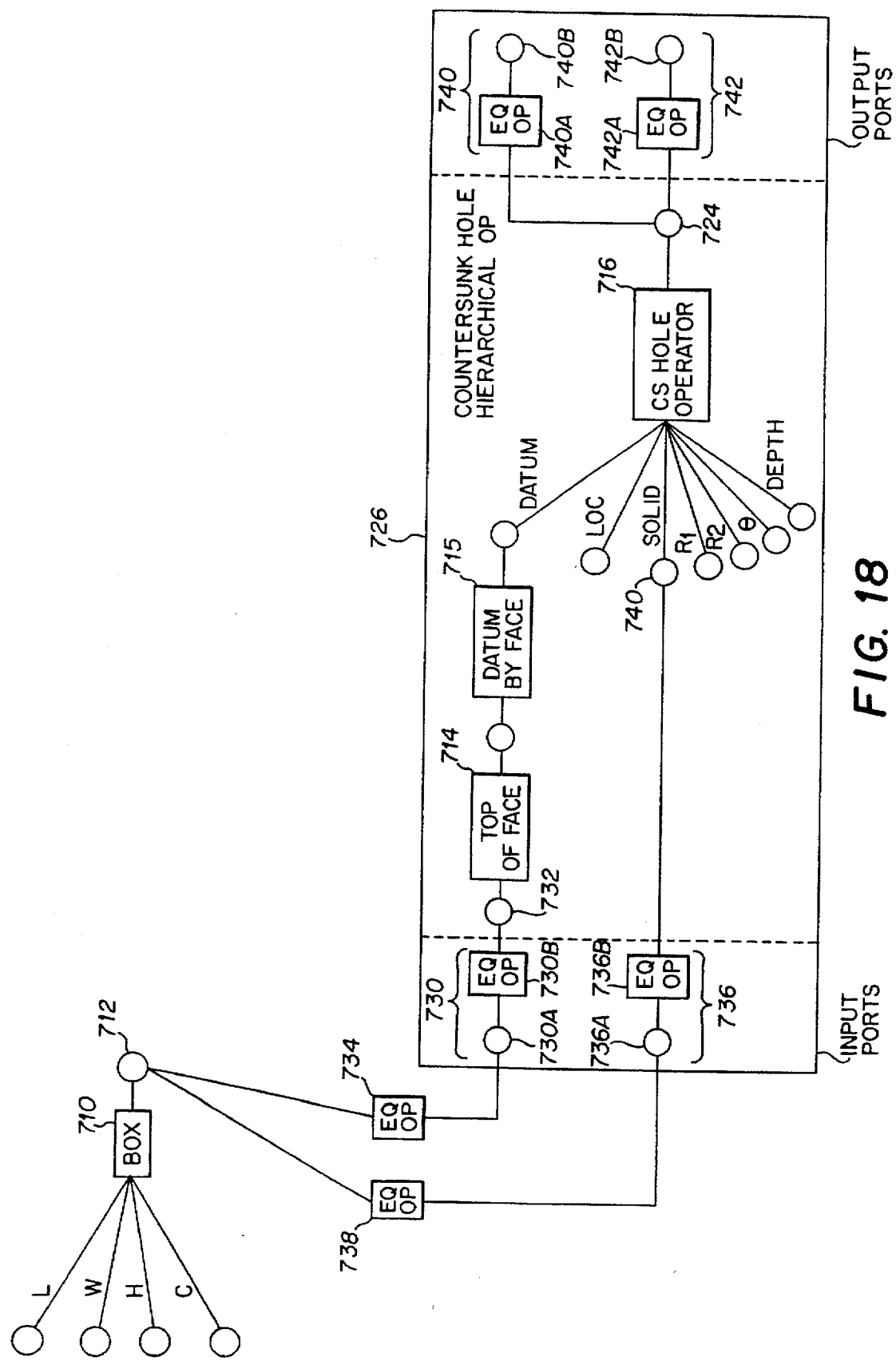
FIG. 18 is a conceptual illustration of the implementation of the hierarchical operator in the dependency graphs of FIGS. 16–17.

An example of the IO ports created for a hierarchical operator is described making reference to FIG. 18, which shows conceptually how the IO ports are created for the hierarchical operator of FIG. 17. It should be understood that although FIG. 18 is shown in the form of a dependency graph, the IO ports and supporting operators are not actually represented in the dependency graph because they do not aid in representing the design goal of the user.

As is discussed in more detail below, the IO ports and IO_OP for each hierarchical operator are created by the graph manager 75 (FIG. 5). Each time an internal data object for a hierarchical operator is referenced (i.e., input to or output from) outside of the hierarchy, an IO port is added to the IO_OP to represent the porting of the data object outside the hierarchy. This is shown conceptually in FIG. 18, wherein four IO ports are formed for the hierarchical operator 726 to port its internal data objects that are referenced outside the hierarchy. Each IO port includes a data object and an equality operator. An equality operator is a graph entity like other operators, and represents that two data objects are to be simply equated so that the data object coupled to the output of an equality operator is set equal to the value in the data object coupled to the input of the equality operator.

The IO ports for hierarchical operator 726 include two input ports 730 and 736. Input port 730 includes a data object 730A and an equality operator 730B. The equality operator is further connected to an internal data object 732 that is created to represent the data input to the top of face operator 714. Similarly, IO port 736 includes a data object 736A and an equality operator 736B that is connected to a data object 740 created to represent the data input to the solid relation of the countersunk hole operator 716.

The input ports perform the function of importing data to the data objects internal to the hierarchical operator that are accessed across the hierarchical boundary. The data objects 730A and 736A provide ports which can be connected at the parent level to the operators that source the data objects from outside the hierarchy. As described above, the parent level can be the root of the design as in the example of FIG. 18, or can alternatively be another hierarchical operator that includes the one from which the input is being ported, as well as the operator that sources its data object.

In FIG. 18, two separate IO ports are formed to respectively import the data object 712 to the top face operator 714 and the solid relation of the countersunk hole operator 716 internal to the hierarchical operator 726. In one embodiment of the invention, separate IO ports are formed for two data objects such as these within a hierarchical operator that are referenced to a single data object across the hierarchical boundary. Providing separate IO ports facilitates the capability of allowing the user to copy a previously created hierarchical operator for use in a different portion of the design. Particularly, two internal data objects in a hierarchical operator may be coupled to a single data object across the hierarchical boundary in one instance of the hierarchical operator in the graph, while in another instance those internal data objects may be coupled to separate data objects outside the hierarchical boundary. If separate IO ports were not created to separately port these internal data objects, the hierarchical operator could not be replicated and used in the design anywhere where the internal data inputs were to be coupled to separate data objects outside of the hierarchy.

At the parent level, equality operators 734 and 738 are provided to respectively couple the data object 712 to the input ports 730 and 736 of the hierarchical operator 726. Equality operators 734 and 738 respectively equate the value in the result data object 712 of the box operator 710 to the input data objects 730A and 736A of IO ports 730 and 736.

Thus, the result of the box operator is passed through the equality operator 734 to the IO port 730, which in turn passes the result through equality operator 730B to the data object 732 so that it can be operated upon by the top of face operator 714. Similarly, this result is also passed through the equality operator 738 to the IO port 736, which in turn passes the result through equality operator 736B to the data object 740 so that it can be operated upon by the countersunk hole operator 716.

As should be appreciated from the foregoing, by creating separate IO ports 730 and 736 for data objects 732 and 740 within the countersunk hole hierarchical operator, the hierarchical operator can be copied and replicated in another portion of the design, without requiring that those two internal data objects be connected to the same data object outside of the hierarchy.

The hierarchical operator 726 also includes two output ports 7&0 and 742 that export data from the hierarchical operator 726. These IO ports respectively include data objects 740B and 742B, and equality operators 740A and 742A that equate those data objects to the result of the countersunk hole operator 716 represented by data object 724. Two IO ports are used to export the result from the countersunk hole operator 716 because that operator defines the result for the hierarchical operator 726. The first IO port 740 is dedicated to exporting the result of operator 716 from the hierarchy, and will export this result even if the hierarchical operator is modified such that the result of operator 716 no longer represents the result of the hierarchical operator. Conversely, IO port 742 is dedicated to exporting the result of the hierarchical operator, so that if changes are made internally to the hierarchical operator resulting in another internal operator producing the result of the hierarchical operator, IO port 742 will be modified to export the new result of the hierarchical operator, and will not export the result of operator 716.

A simple example illustrates the benefit in providing a separate result IO port for a hierarchical operator. The example shown in FIGS. 17–18 illustrates a very simple dependency graph, and it should be understood that a significantly more complicated graph can be developed. For example, the result of the countersunk hole hierarchical operator 726 may be an input to another operator, such as the operator 19 shown in FIG. 2 which would calculate the weight of the box having the countersunk hole. As stated above, hierarchical operators can be modified by the user. For example, the user may initially define the countersunk hole hierarchical operator 726 in the manner shown in FIG. 19, and seek to calculate the weight of the box having a countersunk hole that is output from operator 716 (FIG. 18) and represented by data object 724. However, the user may later modify the countersunk hole hierarchical operator, for example by creating a second countersunk hole in the box. This change could be made by using the result of operator 716, represented by data object 724, as an input to a new series of operators similar to operators 714–716 to create a box having two countersunk holes. If the countersunk hole hierarchical operator 726 were modified in this manner, the result of the hierarchical operator to be exported to the calculate weight operator would no longer be the result of operator 716, but rather, would be the result of the subsequent operator that provides the second countersunk hole. Thus, the result IO port 742 could be modified to export the result of that second countersunk hole operator as the result of the hierarchical operator. However, other portions of the design may require that the result of the first countersunk hole operator 716 also be exported. Therefore, by creating a separate result IO port, it is ensured that the result of the hierarchical operator is always exported, even as changes within the hierarchical operator are made, while simultaneously ensuring that the results of intermediate operators within the hierarchical operator that are used by other portions of the design outside of the hierarchical boundary are also exported.

In the illustrative example shown in FIG. 18, the operators provided in the input and outputs ports are all equality operators. However, it should be understood that different types of operators can be employed, particularly in the output ports. This provides additional flexibility in the manner in which the result of a hierarchical operator can be provided to operators in the dependency graph that lie outside the hierarchy.

Referring to the example of FIG. 16, the output of the countersunk hole hierarchical operator is an application entity defining a box having a countersunk hole. Some operators in the dependency graph outside of the hierarchy may wish to receive only a portion of the information relating to the box having the countersunk hole. For example, another operator may require only one face of the box. In that case, the operator 742A for the result port of the hierarchical operator can be modified so that it does not merely pass the box having the countersunk hole out of the hierarchy, but rather, determines the desired face for the box and sources that to the operator outside of the hierarchy.

To provide the above-described capability, the output ports of the hierarchical operators include an operator and a data object in the illustrative embodiment of the invention disclosed in FIG. 18. However, it should be understood that an output port can alternatively be formed merely from a data object representing the result to be exported (e.g., the data object 724 in FIG. 18), and need not include an operator and an additional data object. However, such an implementation would not provide the above-described beneficial capabilities.

The operators in the input ports for hierarchical operators are typically equality operators. Therefore, each inputs port can alternatively be implemented as simply a data object (e.g., data object 732 in FIG. 18) that receives the data input to be imported into the hierarchical operator. However, in the embodiment of the invention illustrated in FIG. 18, the input ports are also implemented with an additional data object and an operator so that the input and output ports are defined in a consistent manner.

As stated above, when a hierarchical operator is copied and replicated within a design, each instance of the hierarchical operator may have a different set of input and output ports, depending upon its environment in the dependency graph. The different sets of IO ports can port different internal data objects to and from the different instances of the hierarchical operator. In addition, two instances of a hierarchical operator that export the same data object may include different operators in their respective output ports. For example, one instance of the countersunk hole hierarchical operator shown in FIG. 18 may include an equality operator in its result output port 742, such that the application entity representing the box having the countersunk hole would be output, whereas another instance could include an operator as discussed above that outputs only a single face of the box.

The determination of which data objects within a hierarchical operator are to be imported and exported through the creation of IO ports and an updating of the IO_OP list of ports is made by the graph manager 75 (FIG. 5). This determination is based upon which data objects are connected to portions of the graph outside of the hierarchical boundary. For data objects scoped outside of a hierarchical operator, their relationships to other graph elements are defined by a parent function that includes the hierarchical operator. As stated above, hierarchical operators can be nested through a number of levels. Therefore, the outputs of a hierarchical operator may be connected to other graph elements within a larger hierarchical operator. When this is the case, the larger hierarchical operator serves as the parent function that defines the relationship of the data objects scoped out of the lower level hierarchical operator to other graph elements within the larger hierarchical operator. If the outputs scoped from the hierarchical operator are at the highest level of the design, such that they do not form a portion of another hierarchical operator, then the root of the design serves as the parent function that defines the manner in which the data objects scoped from the hierarchical operator are connected to other graph elements.

As stated above, the IO_OP and the IO ports for each hierarchical operator are created and managed by the graph manager 75 (FIG. 5). The IO_OP is implemented as a graph entity, and includes a pointer to its corresponding hierarchical operator in the dependency graph. The hierarchical operator in the graph similarly includes a pointer to its corresponding IO_OP. The IO_OP includes the list of IO ports representing the data objects that are imported to and exported from the hierarchical operator. Thus, the IO OP serves as a collection of relations for the hierarchical operator. The IO ports themselves define those relations.

1. Hierarchical AAPIs

The associativity subsystem of the present invention provides several AAPIs to support the use of hierarchical operators. As discussed above, the hierarchical operators can be employed in one of two ways. First, a user can create his own hierarchical operators in any manner desired. In order to do so, the user simply employs the supporting AAPIs described below to create hierarchical operators. Second, the software system on which the associativity subsystem of the present invention is installed can also call the supporting AAPIs to implement hierarchical operators around commands that include one or more subcommands as described below.

Three basic AAPIs are provided to support hierarchical operators. A first opens a hierarchical operator. When at least one hierarchical operator has been opened, all dependency graph elements added to the design are included within the most recently opened hierarchical operator until that hierarchy is committed to the design. Once a hierarchy is committed, it is closed and new dependency graph elements are not added to that hierarchy, unless the hierarchy is re-opened. The second AAPI that supports hierarchical operators is the commit hierarchy command, which commits the most recently opened hierarchy to the design in the manner describe above. Finally, an abort hierarchy AAPI is also provided to abort the creation of the most recently opened hierarchical operator. When the abort command is received, the most recently opened hierarchy will not be created, and each of the graph elements added subsequent to the opening of the most recently opened hierarchy will be added to the design simply as a group of graph elements without being grouped in a hierarchical fashion.

As stated above, the present invention enables hierarchical operators to be nested. Thus, following the opening of a hierarchical operator, one or more additional hierarchical operators can be opened before closing the previously-opened hierarchical operator. Thus, each time a commit hierarchy command is received, the most recently opened hierarchy is closed. By tracking the commit hierarchy commands to the open hierarchy commands, a number of nested hierarchical operators can be created. The graph manager maintains a first-in last-out stack of currently open hierarchical operators. Thus, when a commit hierarchy or abort hierarchy command is received, the most recently opened hierarchical operator added to the stack is respectively committed to the design as a complete hierarchical operator, or is removed from the design so that the graph elements added subsequent to the opening of that hierarchy are simply added to the design as if the most recently opened hierarchical operator were never opened. If another hierarchical operator is currently open on the stack when an abort command is received, the graph elements will simply be added to the graph as part of that hierarchical operator when it is subsequently committed to the graph.

Whenever a design session is begun, a top level hierarchical operator is automatically created and pushed onto the graph manager stack. This top level hierarchical operator represents the root for the entire design that will be created during a design session. As stated above, this design root serves as the parent function that defines the relationships between the next highest level of hierarchical operators and any non-hierarchical operators at the design level.

The abort command provides the user with the flexibility to change his mind with respect to a goal oriented activity. Similarly, this command can also be employed by the software system on which the associativity subsystem of the present invention is installed. When the software system seeks to implement the hierarchical operator capability of the present invention, the AAPIs that correspond to proprietary APIs that are generally used in a hierarchical fashion will call the open hierarchical operator command anytime one of those proprietary commands is entered by the user. However, the user may terminate a hierarchical command prior to completion. When this occurs, the software system can employ the abort command to abort the creation of the hierarchical operator opened for the proprietary command.

2. Committing An Operator

In addition to hierarchies committed to the design, each operator created in response to a user command is also committed to the design if it executes correctly. The graph manager performs the following three basic steps when committing an operator to the design: (1) processing the operator; (2) processing the output of the operator; and (3) processing the inputs of the operator. These steps are represented by the flowcharts of FIGS. 19a–19d.

Figure 19A:
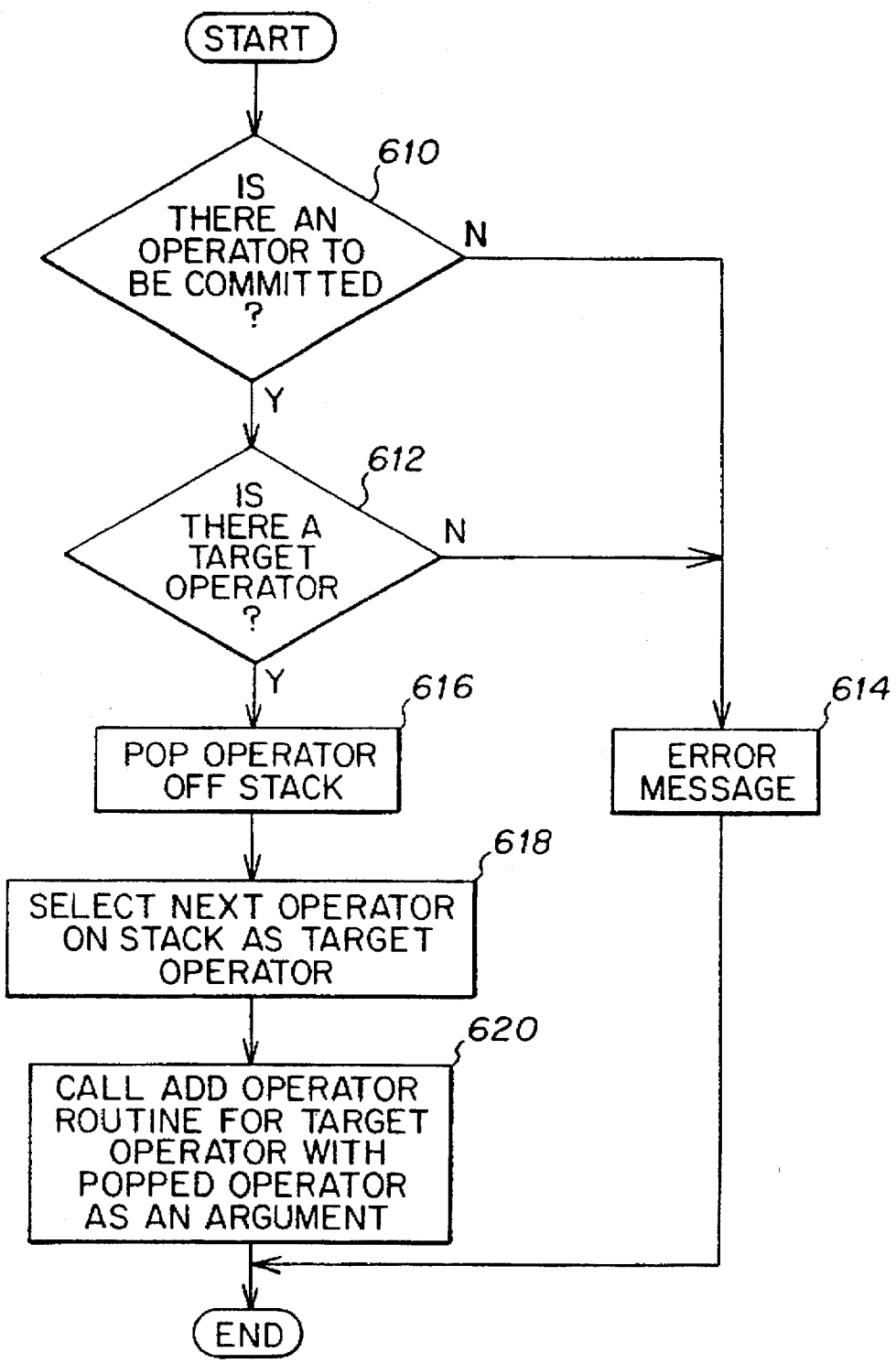
FIGS. 19a–19d are flowcharts of a method operated upon each operator committed to the dependency graph of the present invention.

When an operator is committed to the design, the graph manager initially executes a commit operator routine represented by the flowchart of FIG. 19a. In step 610, the method determines whether there is an operator to be committed to the design, and when there is, the method proceeds to step 612 wherein a determination is made as to whether there is a target operator for the operator to be committed to. These two steps are error checkers. As stated above, whenever a design session is begun, a hierarchical operator that represents the root of the design is automatically opened and pushed onto the graph manager stack. Thus, if the commit operator routine is called and there is no operator to be committed, or if there is no target operator to which the operator can be committed, an error condition occurs and the method proceeds to step 614 wherein it provides an error message to the user and then terminates.

When no error condition is encountered, the method proceeds to step 616 wherein the operator to be committed to the design is popped (i.e., read) from the graph manager stack. In step 618, the next operator on the stack is identified as the target operator to which the operator popped from the stack in step 616 is to be committed. Finally, in step 620, the routine calls the add operator routine represented in FIG. 19b to operate upon the target operator, with the operator popped from the stack in step 616 being provided as an argument to the routine.

Figure 19B:
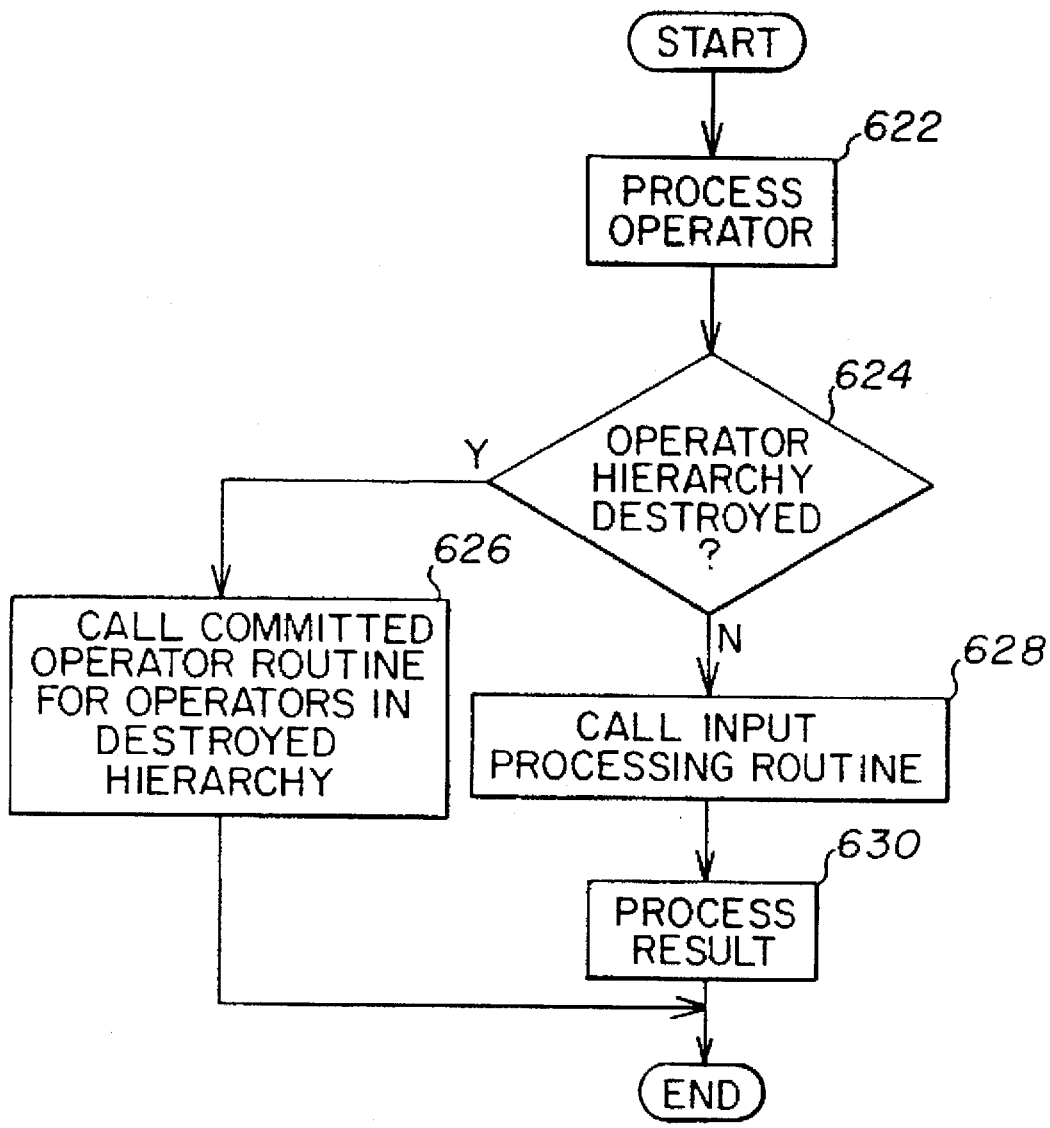

In the illustrative embodiment shown in FIGS. 19a and 19b, the committing of an operator to the design is controlled in part by the target hierarchical operator to which it is committed. As stated above, each operator added to the design will either be added as part of the root of the design itself, or as part of a lower level hierarchical operator in the design. Thus, when an operator is added to the design, the add operator routine receives the operator to be committed as an argument, and is called in connection with the hierarchical operator to which that operator is to be committed.

In step 622, the add operator routine processes the operator passed to it as an argument to ensure that no excess hierarchy is created in the dependency graph. As discussed above, any software system on which the associativity subsystem of the present invention is installed may take advantage of the hierarchical capability of the present invention. Thus, for commands in the software system that will typically be used in a hierarchical fashion, the software system may have the corresponding AAPI for the command open up a new hierarchy whenever the command is received. For example, the countersunk hole command described above in connection with FIGS. 15–18 is typically executed with subcommands to identify the face of the solid on which the countersunk hole is to be applied. Thus, when the countersunk hole command is executed, a hierarchy may be opened in anticipation of receiving a number of subcommands generally used in connection with that command. However, if the user does not execute the expected subcommands, an unnecessary hierarchy could potentially be created. For example, if the user simply executed the countersunk hole command without subcommands to define the face of the solid, the hierarchy created for the countersunk hole command would be created solely around the countersunk hole operator 716. This hierarchy is unnecessary because it includes a single operator.

The operator processing function performed during step 622 of the add operator routine identifies and removes such unnecessary hierarchies. When a hierarchy is removed, each of the operators that had been previously identified as belonging to the removed hierarchy are pushed onto the graph manager stack in step 622, so that they will be committed to the graph during step 616 of the commit operator routine discussed below when that routine is called during step 626 of the add operator routine.

In one embodiment of the present invention, a default option for the processing function of step 622 is to remove any hierarchy created around a single operator. Thus, in the example described above, the hierarchy created solely around the operator 716 would be removed. However, the software system on which the associativity subsystem of the present invention is installed is provided with the capability of overriding this default, and may choose to create a hierarchy around even a single operator. In addition, the default can be modified to establish any minimum number of operators that must be included to form a valid hierarchical operator. In this manner, the software system is provided with the flexibility of controlling the manner in which hierarchies are created.

After the operator is processed, the add operator routine proceeds to step 624, wherein a determination is made as to whether an operator hierarchy was destroyed during 622.

When a hierarchy was destroyed, the method proceeds to step 626, wherein the commit operator routine of FIG. 19a is called for each operator that was in the hierarchy destroyed in step 624. Since those operators were pushed onto the graph manager stack during step 622, they can be popped off the stack when processed by the commit operator routine in step 616 (FIG. 19a) in the manner described above. In this manner, whenever a hierarchical operator is destroyed, the execution of step 626 ensures that each of the lower level operators within the destroyed hierarchy are committed to the design.

Figure 19C:
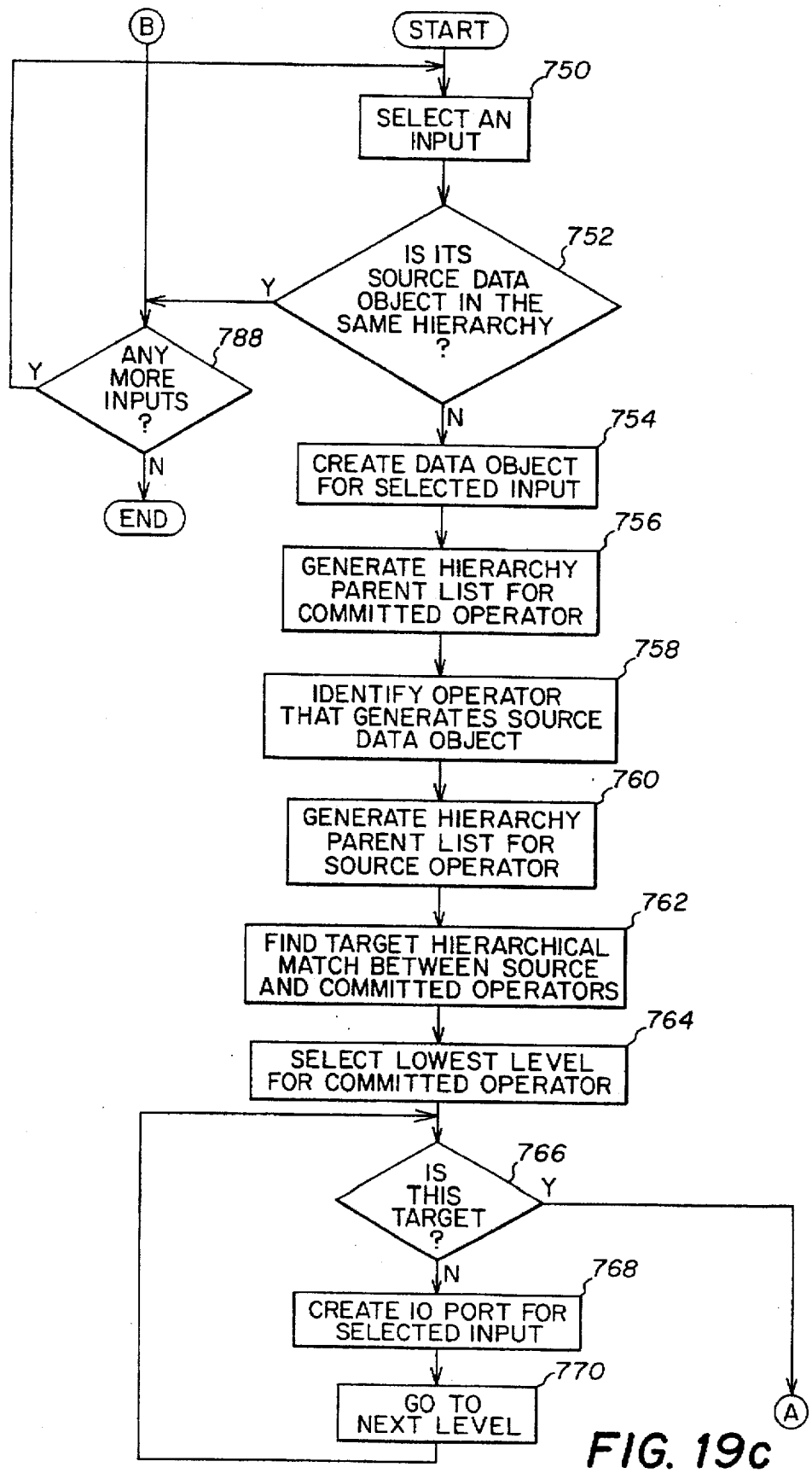
Figure 19D:
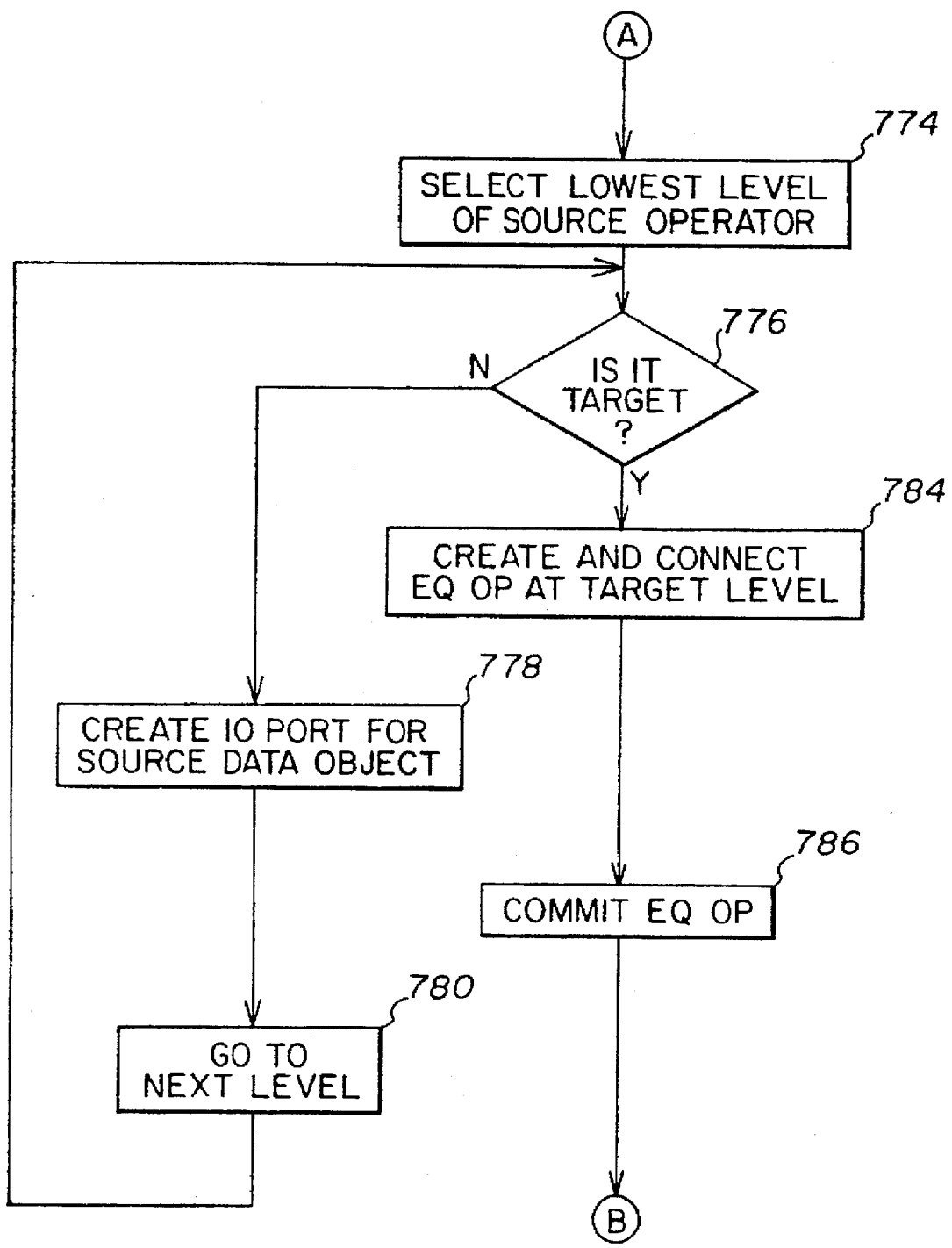

When it is determined at step 624 that no hierarchical operator was destroyed in step 622, the add operator routine proceeds to step 628, wherein it calls the input processing routine of FIG. 19c. The purpose of the input processing routine is to process hierarchical operators by scoping their inputs through levels of hierarchy in the dependency graph. As discussed above, this is accomplished by creating an IO port for each input that crosses the hierarchical boundary, and creating an equality operator outside the hierarchy that connects the IO port to the data object in the parent level of the graph that provides its input. Thus, the input processing routine for an operator committed to the dependency graph creates any input ports needed for the hierarchical operator that includes the newly committed operator.

The input processing routine initially selects a first input of the committed operator for processing in step 750. In step 752, a determination is made as to whether the source data object for the selected input is in the same hierarchy, i.e., whether the source of the data object is in the target hierarchy to which the operator is being committed. When the source data object is in the same hierarchy, the selected input need not be scoped out of the hierarchy, and therefore, the input need not be further processed. Therefore, the method proceeds directly to step 788, wherein a determination is made as to whether any additional inputs remain to be processed. When additional inputs remain, the method returns to step 758 to select another input for processing. When it is determined that no inputs remain to be processed for the committed operator, the method terminates.

When it is determined at step 752 that the input selected for processing in step 750 and its source data object are not in the same hierarchy, the method proceeds to step 754, wherein a new data object is created for the selected input within the target hierarchical operator to which the operator is being committed. An example of such a data object is data object 732 in FIG. 18. By creating the new data object, it is ensured that the relation that connects the source data object to the selected input of the operator being committed does not cross the hierarchical boundary of the target operator.

In step 756, a hierarchy parent list is generated for the committed operator. The hierarchy parent list is analogous to an ancestral tree for the committed operator, and identifies each of the hierarchies to which the committed operator belongs, as well as their hierarchical relationship. The hierarchical parent list is used by the routine in a manner described below to determine at which hierarchical level an equality operator (e.g., operators 734 and 738 in FIG. 18) should be provided to connect the selected input to its source data object.

The method next proceeds to step 758 wherein the operator that generates the source data object is identified, and in step 760 the hierarchy parent list for that operator is generated. At step 762, the parent list for the committed operator is compared against the parent list for the source operator to identify the lowest ancestral hierarchy common to both. This hierarchical level is designated as the target parent level for creation of an equality operator between the source data object and the selected input. Other hierarchical levels that include the two will not require a scoping out of the selected input, because the connection between the selected input and its source data object will be internal to a hierarchical operator at the target level. However, the routine scopes the selected input out of any hierarchical operator at the target level and below to ensure that the relation between the selected input and its source data object does not cross a hierarchical boundary.

At step 764, the method selects for processing the lowest hierarchical level for the committed operator, i.e., the hierarchical operator to which the committed operator is being committed. In step 766, a determination is made as to whether the currently processed hierarchical level is the target level. When the currently processed level is not the target, the method proceeds to step 768, wherein an IO port is created to export the selected input from the hierarchical operator at the currently processed level. Next, the method proceeds to step 770 wherein it goes to the next hierarchical level for processing, and then returns to step 766. In this manner, the method proceeds through steps 766–770 to create an IO port for the selected input of the committed operator at every hierarchical level below the target level, until it is determined at step 766 that the target level has been reached.

When it is determined at step 766 that the currently processed level is the target level, the method does not proceed to step 768 to create an IO port at this level, because as discussed above, the target level includes both the selected input and the source data object, and therefore, does not require scoping out of the input. Rather, when the target level is detected in step 766, the method proceeds to step 774 (FIG. 19d), wherein processing of the source operator begins.

The method performs several steps analogous to those described above to scope out the result data object, when provided from a hierarchical operator, from its hierarchy for connection to the selected input of the committed operator. Specifically, in step 774, the method selects the lowest hierarchical level of the source operator for processing, and then proceeds to step 776 wherein a determination is made as to whether the currently processed hierarchical level is the target level. When the source operator is not hierarchical, the its lowest level will be the target level. When it determined at step 776 that the currently processed hierarchical level is not the target level, the method proceeds to step 778, wherein an IO port is created to export the result data object from the hierarchical operator at the currently processed level. Next, the method proceeds to step 780 wherein it goes to the next hierarchical level for processing, and then returns to step 776. In this manner, the method proceeds through steps 776–780 to create an IO port for the source data object at the target level and each level below, until it is determined at step 776 that the target level has been reached.

When it is determined at step 776 that the currently processed level is the target level, the method does not proceed to step 778 to create an IO port at this level, because as discussed above, the target level includes both the selected input and the source data object, and therefore, does not require scoping out of the source data object.

When the target level is detected in step 776, the method proceeds to step 784, wherein an equality operator (e.g., EQOPs 734 and 738 in FIG. 18) is created at the target level. One end of the equality operator is connected to the IO port created for the selected input of the committed operator at the hierarchical level immediately below the target, and the other end is connected to the data object representing the source at the target level. When the source operator is hierarchical, this connection is made to the IO port created for the source data object at the level immediately below the target.

After the equality operator is created in step 784, the method proceeds to step 786, wherein the equality operator is committed to the design of the target level. The method then proceeds to step 788 (FIG. 19c), wherein a determination is made as to whether any inputs of the committed operator remain to be processed. When it is determined that additional inputs remain, the method returns to step 750, wherein a next input is selected for processing. In this manner, the method proceeds to scope out each of the inputs of the committed operator until it is determined at step 788 that all of the inputs have been processed, at which point the method terminates.

After the input processing routine returns, the add operator routine proceeds to step 630 (FIG. 19b) to process the result of the operator being committed. The processing of the result is performed to ensure that if the operator is a hierarchical operator, its result IO port accurately reflects the output of the operator. For example, as discussed above in connection with the dependency graph of FIG. 18, the hierarchical operator 726 produces a result that is an application entity representing a box having a countersunk hole. However, modifications within the countersunk hole hierarchical operator can change the result of the hierarchical operator, for example, by adding additional countersunk holes. Each hierarchical operator maintains a result operator pointer that points to its internal operator that, when executed, yields the result of the entire hierarchical operator. This operator is simply the equality operator in the result IO port (e.g., operator 742A in FIG. 18) that points to the data object that is the result of the hierarchical operator. When a new operator is added to the hierarchy and its result becomes the result of the hierarchical operator, the processing of the hierarchical operator result ensures that the input relation of the result operator is adjusted to point to the result of the newly added operator.

Different hierarchical operators may behave differently with respect to the manner in which their outputs are processed to define the result of the hierarchical operator. For example, for many hierarchical operators, the last (i.e., the one on the right-hand edge of the dependency graph) operator may define the result of the hierarchy. However, for some hierarchical operators, this will not hold true. For example, for a hierarchical operator that produces a workpiece, such as the box output from the countersunk hole hierarchical operator 726 of FIG. 17, the result of the hierarchical operator will always be the workpiece. Thus, even if other operators are added to the hierarchical operator and operate upon the workpiece (e.g., calculate weight of box), the workpiece will be result of the hierarchical operator. In one embodiment of the invention, a default condition is instituted which causes the result operator of a hierarchical operator to point to the data object that is the result of the operator most recently committed to the hierarchy. However, this default can be overridden by the user or the software system in the creation of any particular hierarchical operator.

As described above, the capability provided to the software system to group commands in a hierarchical fashion may be used in connection with commands that are grouped together with a series of subcommands. For example, the countersunk hole command described above is typically executed with a plurality of subcommands to define for example the face of the solid being operated upon. The user interface typically does not execute the higher level-command until its associated subcommands are received from the user. Thus, the commit operator routine of the present invention will not be called to commit an operator corresponding to a high level command (e.g., the countersunk hole operator 716) until all of its subcommands have been received. Therefore, when a high level command is initially received from the user, a new hierarchy may be opened, and the hierarchy is not committed until each of the subcommands has been executed. In this manner, the command can be grouped with its subcommands in a hierarchical operator.

As should be appreciated from the foregoing, the above-described ability of the software system to define a group of subcommands associated with a high level command in a hierarchical block cannot be employed to group together more than one high level command, since an operator will be committed to the design for each high level command, thereby closing any hierarchy that may have been opened specifically for that command. However, as described above, this capability is provided to the user so that he can specify hierarchical groups in any manner desired, including hierarchies that include multiple high level commands.

XII. Interactive Dependency Manipulation

As discussed above, in one embodiment of the present invention, a capability is provided to allow a user to interact with the dependency representation of a design in order to create a design or make modifications to an existing design. It should be appreciated that in some instances, it will be faster and easier for a user to interact with this graphical representation of the design.

As shown in FIG. 3, when the associativity subsystem of the present invention is installed on a software system, the system is provided with an interpreter 52. The interpreter 52 includes a text window that can be displayed on a display screen of the software system, and which enables the interpreter to receive textual AAPI expressions from the user. The interpreter 52 translates the textual AAPI expressions and calls corresponding AAPIs 42 on the system to take design actions specified by the textual AAPI expressions. Thus, the text window of the interpreter can be used to create or edit a dependency graph in accordance with the present invention using textual AAPI expressions.

As stated above in connection with the discussion of FIG. 3, when the embodiment of the present invention is employed that allows the dependency graph to be edited graphically, the system is also provided with a visual programming environment 50 that is used in graphically editing the dependency graph. The capability of the present invention to support graphical editing of the dependency graph is not limited to any particular visual programming environment, and the present invention can be used with any type of visual programming environment, of which several are commercially available.

As shown in FIG. 3, the visual programming environment 50 is coupled to the interpreter 52 that is in turn coupled to the associative APIs 42 of the system. The visual programming environment translates actions taken by the user in a visual environment into expressions that are compatible with the interpreter. Thus, the interpreter acts a parser that translates between the language of the visual programming environment 50 and the associative APIs 42 of the software system. The interpreter 52 establishes lexicons that define valid words to be parsed, as well as the supported grammatical rules for presenting the lexicons. The AAPIs 42 of the system with which the interpreter operates include an AAPI wrapped around each proprietary API in the software system, as well as the three above-described AAPIs that are used to support hierarchical operators. When the user takes some action in the visual programming environment, the interpreter 52 parses the expressions received from the visual programming environment 50, and calls the corresponding AAPIs with properly formatted arguments to execute the user's design action in the dependency graph. The interpreter is integrated into the interactive visual programming environment so that the expressions parsed by the interpreter can be received as a result of the user typing in commands on a system keyboard, or through any other input mechanism.

Figure 20:
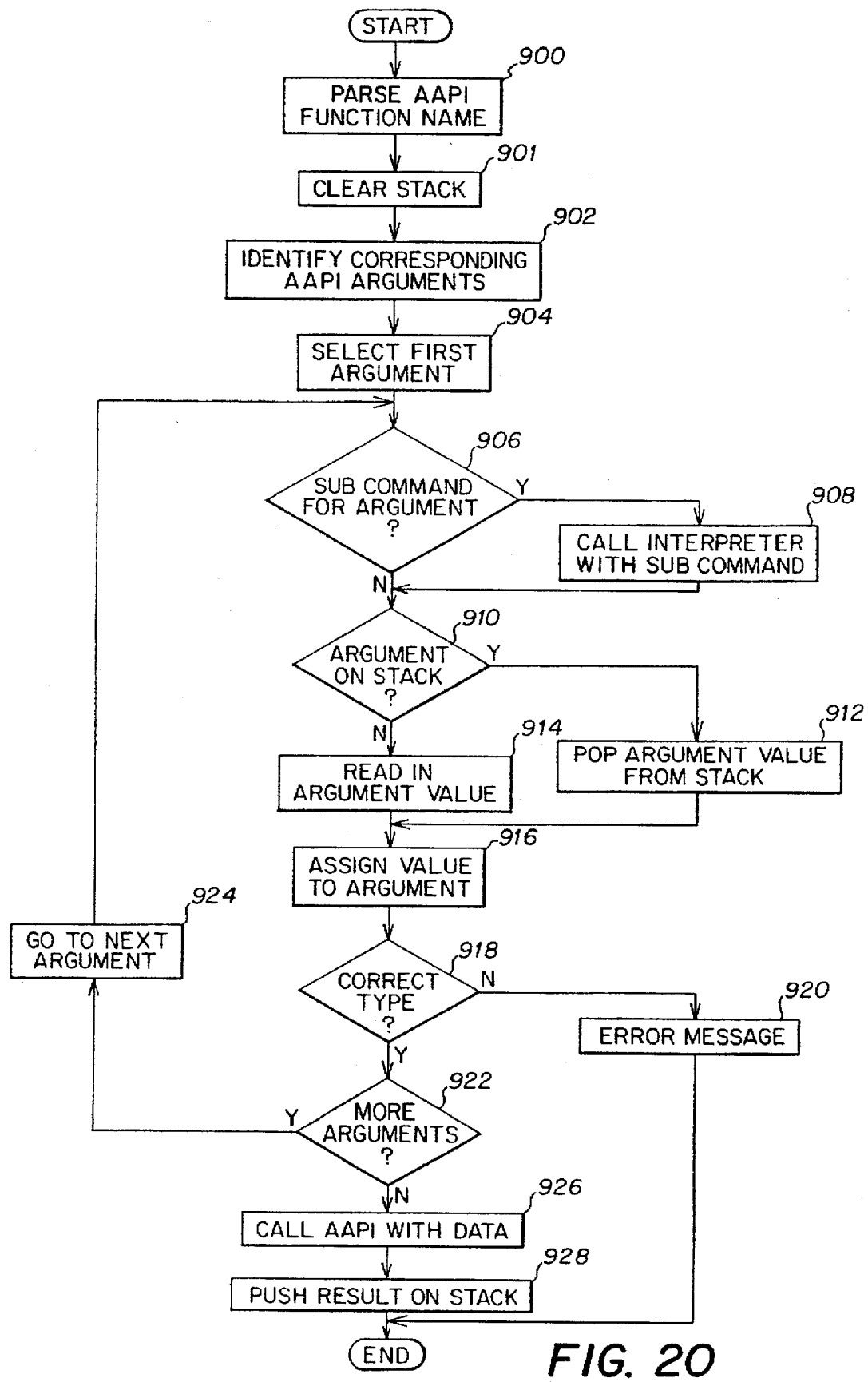
FIG. 20 is a flowchart illustrating the interpreter routine of the present invention.

A software routine executed by the interpreter whenever an expression is received from its text window or the visual programming environment 50 is illustrated in the flowchart of FIG. 20. In step 900, the interpreter parses the received expression to determine the name of the AAPI referenced in the expression. The method then proceeds to step 901, wherein the interpreter stack is cleared. The interpreter stack is used in a manner discussed below to store a result value during recursive execution of the interpreter routine for feature commands that receive arguments through the execution of subcommands. Thus, the result value stored on the interpreter stack represents the result of an AAPI executed in connection with a subcommand, and is used to provide an argument in calling an AAPI for the feature command for which the recursive routine was initially called. The stack is only used within a single recursive cycle of executions for the interpreter routine. However, when a recursive cycle is completed, the routine may return without clearing the stack. Therefore, the stack is cleared in step 901 at the beginning of the routine so that if the routine is called consecutively for two commands that do not employ a subcommand and therefore doe not recursively execute the interpreter routine, no argument will be detected on the stack in step 910 discussed below.

After the stack is cleared, the method proceeds to step 902 wherein the arguments for the AAPI parsed in step 900 are identified. The arguments are identified by accessing the hash table 73 discussed above in connection with FIG. 5, which includes an entry for each AAPI that identifies its arguments and the order in which those arguments are to be presented when the AAPI is called for execution.

In step 904, the method selects the argument identified in step 902 as being the first in the ordered list of arguments to be presented when calling the AAPI, and the method proceeds to step 906, wherein a determination is made as to whether a subcommand is to be executed to provide the data value for the selected argument. This determination is made by parsing the list of arguments. If the argument includes the name of an AAPI, then the argument will be provided by a subcommand. When it is determined at step 906 that a subcommand is to be executed, the method proceeds to step 908, wherein the interpreter routine is re-called using the name of the AAPI that will produce the value for the argument.

As is discussed below in connection with steps 926–928, when the interpreter routine is called to process an AAPI, the last two steps of the routine execute the AAPI to perform the design action specified in the expression received from the interpreter text window or the visual programming environment, and then push the result of this execution on the interpreter stack. The interpreter stack is a first-in last-out stack that stores the results of AAPIs executed during recursive calls of the interpreter routine in response to expressions received from the text window and the visual programming environment. Thus, when the interpreter routine returns from a call in step 908 that caused it to process a subcommand identified in step 906, the result of the AAPI executed to implement the subcommand is stored on the interpreter stack.

When the interpreter routine returns from processing a subcommand in step 908, or when it is determined at step 906 that no subcommand need be executed for the selected argument, the method proceeds to step 910, wherein a determination is made as to whether an argument is stored on the interpreter stack. As stated above, the stack is cleared in step 901 when the interpreter routine begins. Therefore, when an argument is stored on the interpreter stack, it indicates that the argument was provided by an iteration of the routine called to process a subcommand, and therefore, the method proceeds to step 912, wherein the argument value is popped from the interpreter stack. Conversely, when it is determined at step 910 that there is no argument on the stack, the method proceeds to step 914, wherein the value for the selected argument is read from the expression provided from the interpreter text window or the visual programming environment 50.

After the value for the argument is popped from the stack in step 912 or read from the text window or visual programming environment in step 914, the method proceeds to step 916, wherein the value is assigned to the argument selected for processing. The method then proceeds to step 918, wherein a determination is made as to whether the argument value is of the type expected for the AAPI identified in step 900. When the argument value is not of the type expected, the method proceeds to step 920 wherein an error message is provided to the user, and the method terminates. In this manner, the user is provided with an opportunity to redefine the argument value into an acceptable type.

When it is determined at step 918 that the value assigned to the selected argument is of the correct type, the method proceeds to step 922, wherein a determination is made as to whether any more arguments remain to be processed for the AAPI. When it is determined that additional arguments remain, the method proceeds to step 924, wherein the next argument in the list of ordered arguments for the AAPI is selected for processing, and the method returns to step 906. In this manner, the method proceeds to process each of the arguments for the AAPI until a determination is made at step 922 that all of the arguments have been processed.

Once all of the arguments have been processed, the method proceeds to step 926, wherein the AAPI parsed in step 900 is called, with the argument values collected by the routine in their correct ordered positions. In this manner, the interpreter routine ensures that the design action required by the expression received from the interpreter text window or visual programming environment 50 is taken in the design. Finally, in step 928, the result returned from the AAPI is pushed onto the interpreter stack, so that when the interpreter routine is called for a subcommand for the AAPI in step 908, the result can be read from the stack in step 912 in the manner described above.

When a user is creating or editing a design, the present invention provides a capability for the user to identify a portion of the design, and request that the AAPIs that generate that portion of the design be displayed using the interpreter text window or visual programming environment 50. For example, a user modifying a design represented by the dependency graph of FIG. 2 could simply point to the display screen representation of the application entity that represents the box, and the portion of the dependency graph of FIG. 2 that includes the operator 7 corresponding to the AAPI that generates the box could be displayed using the visual programming environment. Alternatively, the interpreter text window can be used to textually display the AAPIs that generate the selected portion of the design, such that the display screen could be provided with a textual representation of the command "CV_INSERT_BOX(l,w, h,center)", along with its accompanying data arguments.

Once the textual AAPI or dependency graph representation selected by the user is displayed, the representation of the portion of the design can be modified using the interpreter text window or the visual programming environment 50. Graphically editing the dependency graph can involve either redefining a data input to an operator, or replacing an operator. Similarly, editing an AAPI textually can involve redefining one of its arguments, or replacing the AAPI with another.

Figure 21:
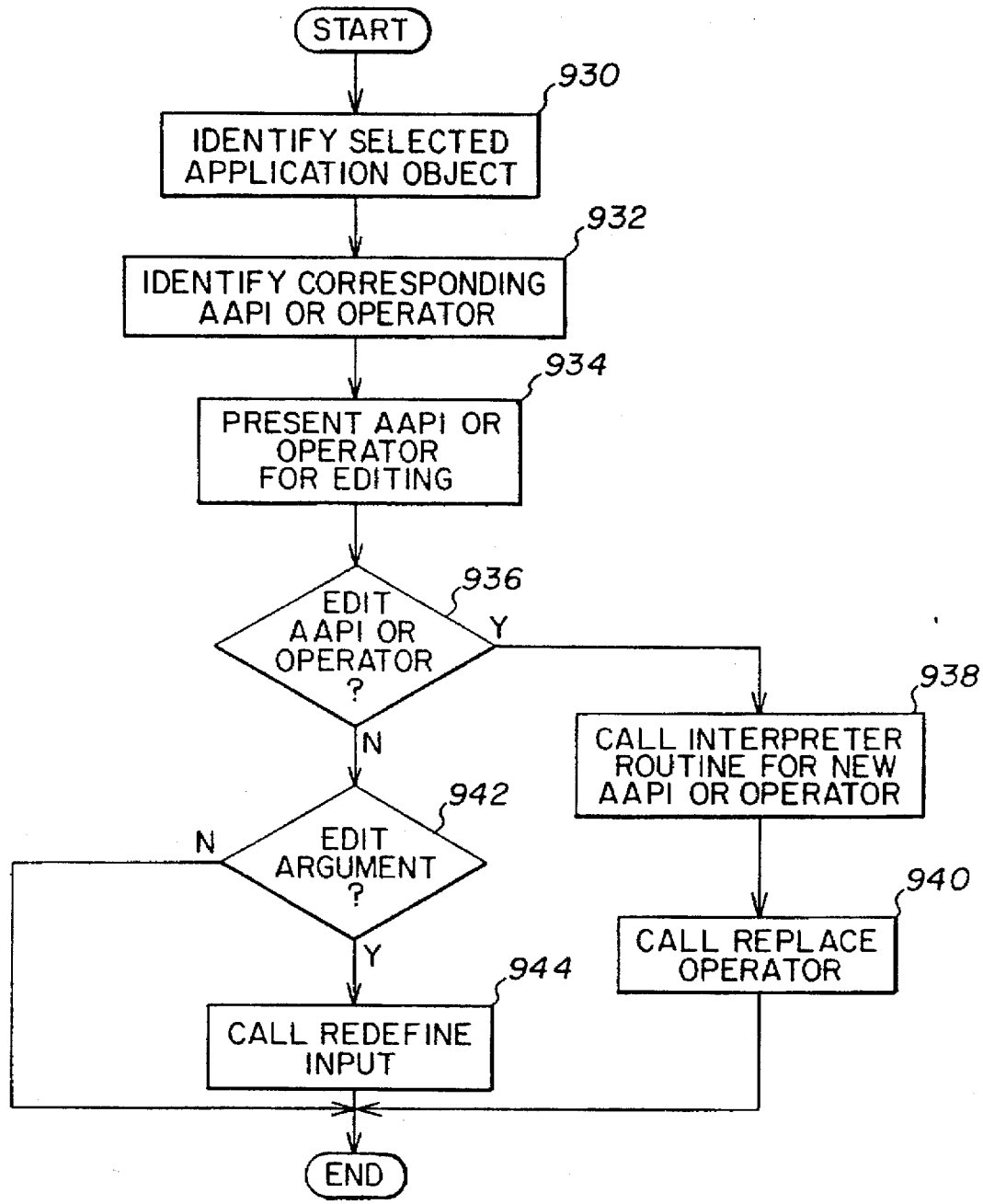
FIG. 21 is a flowchart illustrating a method for processing edits a design and dependency graph of the present invention using a visual programming environment.

When the user selects an application entity representing a portion of the design to be edited, an editing routine executed by the graph manager 75 (FIG. 5) is called to handle the editing operation. The editing routine is represented in the flowchart of FIG. 21. Initially, in step 930, the routine identifies the application entity selected for editing by the user. Thereafter, in step 932, the routine finds the AAPI that corresponds to the selected application object when textual editing is being performed, and finds the corresponding operator in the dependency graph when graphical editing is being performed.

In step 934, the AAPI or operator identified in step 932 is presented to the user for editing. When an edit operation is received through the interpreter from its text window or the visual programming environment, the routine proceeds to step 936 wherein a determination is made during textual editing as to whether an AAPI is being edited, and during graphical editing as to whether an operator is being edited. When it is determined that either an AAPI or a graph operator is being edited, the routine proceeds to step 938, wherein the interpreter routine of FIG. 20 is called to operate on the new AAPI or operator. As discussed above, the interpreter routine collects all of the argument values for the new AAPI and calls the AAPI with its ordered list of arguments to perform the design action specified by the user's edit. When the interpreter routine returns, the method proceeds to step 940, wherein the replace operator routine described below in connection with FIG. 23 is called, and then terminates. When it is determined at step 936 that the user has not edited either an AAPI or a graph operator, the method proceeds to step 942, wherein a determination is made as to whether the user has edited an argument. If no argument was edited, the method simply terminates. However, when it is determined at step 942 that the user has edited an argument, the routine calls the redefine input routine (FIG. 22) discussed below in step 944, and then terminates.

Figure 22:
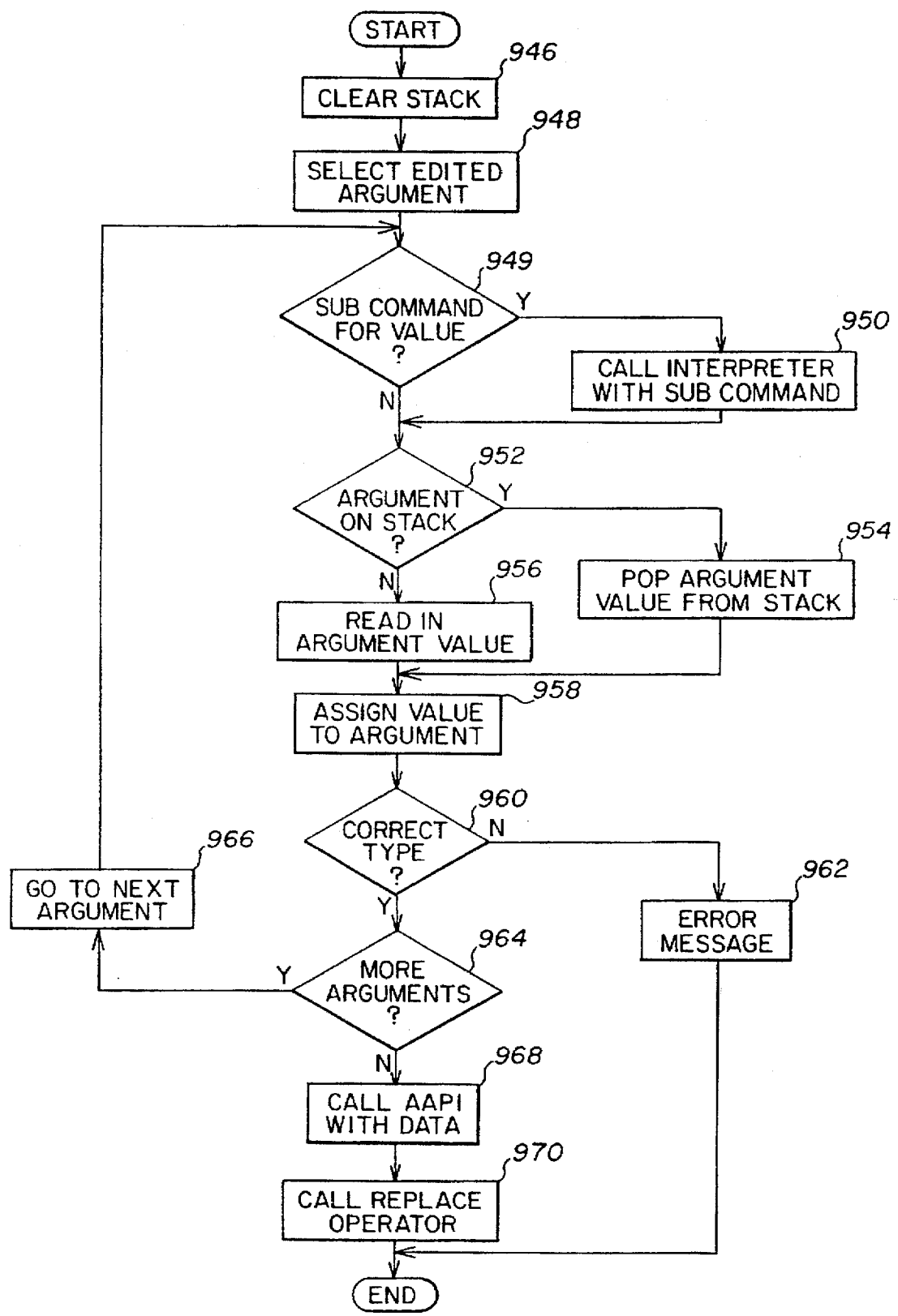
FIG. 22 is a flowchart illustrating the steps of a redefine input routine of the present invention.
Figure 23:
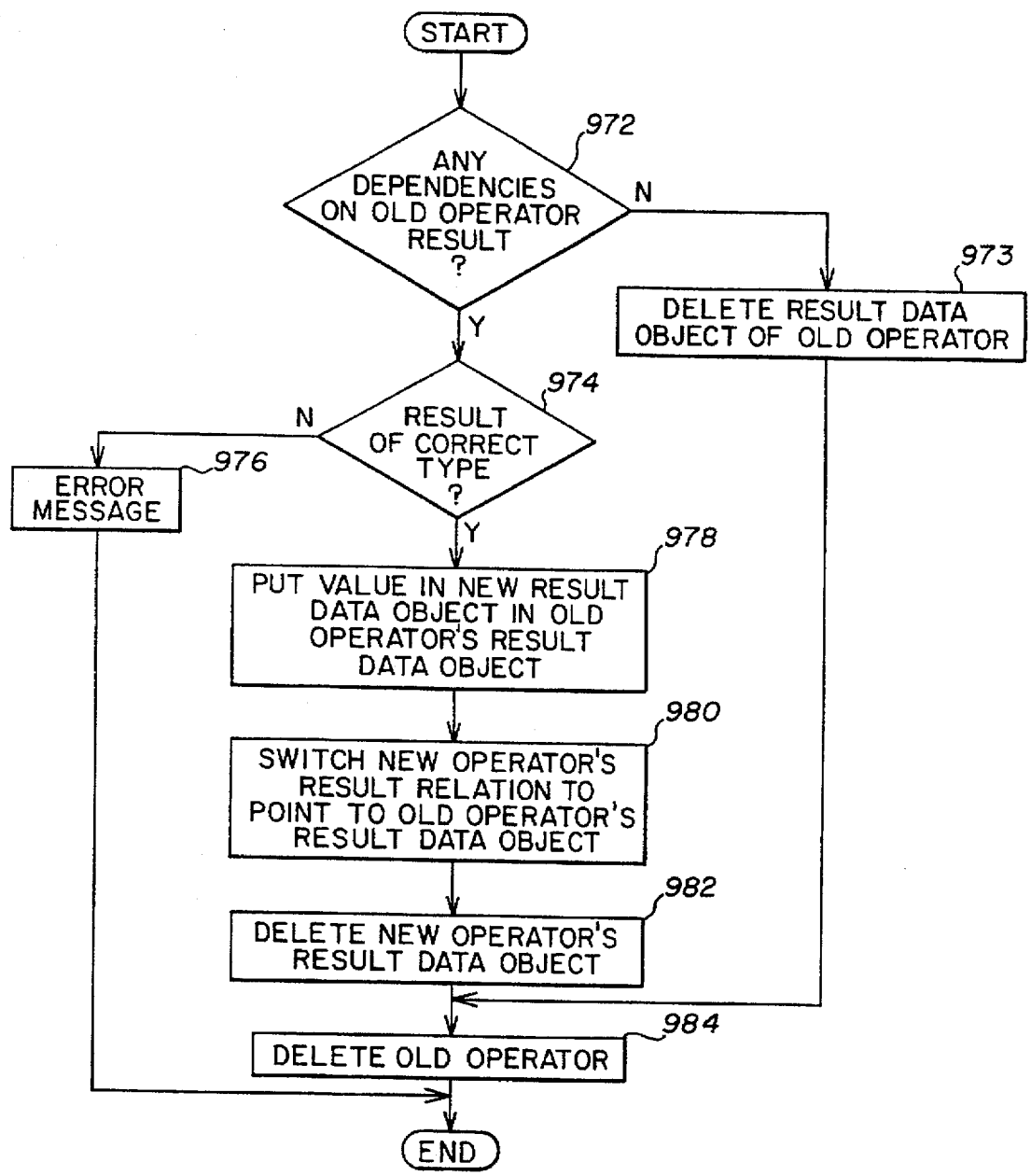
FIG. 23 is a flowchart illustrating the steps of a replace operator routine of the present invention.

The redefine input routine is represented by the flowchart of FIG. 22, which performs a number of steps that are similar to steps performed by the interpreter routine of FIG. 20. Initially, in step 946, the routine clears a stack that is similar to the interpreter stack discussed above. The stack is cleared initially for the same reasons that the interpreter stack is initially cleared in step 901 of the interpreter routine. Next, in step 948, the routine selects an edited argument for processing. Thereafter, the routine proceeds through steps 949–968, which are virtually identical to steps 906–926 in the interpreter routine described above in connection with FIG. 20. Through the execution of these steps, the redefine input routine collects all of the edited argument values for an AAPI, as well as its other argument values, and then calls the AAPI with its ordered list of argument values in step 968 to take the design action requested by the user's edits. Thereafter, in step 970, the routine calls the replace operator routine of FIG. 23 discussed below, and then terminates.

The replace operator routine that is called by both the editing routine of FIG. 21, and the redefine input routine of FIG. 22, is represented by the flowchart shown in FIG. 23. Prior to the replace operator routine being called, either a new AAPI will have been executed as a result of a call to the interpreter routine in step 938 of the editing routine (FIG. 21), or an existing AAPI will be re-executed with new data in step 968 of the redefine input routine (FIG. 22). As a result of the execution of the AAPI in either of these instances, additional graph elements will be created, including a new operator, relations for its inputs, a relation for its output, and a new result data object. The purpose of the replace operator routine is to clean up the dependency graph so that it accurately reflects the user's edits to the design.

Initially, in step 972, a determination is made as to whether any graph elements are dependent upon the result data object of the old operator that is to be replaced. When it is determined that nothing in the dependency graph depends on the result of the old operator, the method proceeds to step 973, wherein the result data object of the old operator is deleted from the dependency graph, and then to step 984 wherein the old operator is also deleted. In this manner, the dependency graph is updated to reflect the edits made by the user.

When it is determined at step 972 that some graph elements depend upon the result of the old operator, the method proceeds to step 974, wherein a determination is made as to whether the result produced by the new operator is of the correct type expected by each of the graph elements that depended upon the result of the old operator. When it is determined that the result is not of the correct type, the method proceeds to step 976, wherein an error message is generated to the user indicating that the new operator cannot replace the old operator in the design, and the method terminates.

When the result is of the correct type, the method proceeds to step 978, wherein the value stored in the result data object for the new operator is placed into the result data object for the old operator. This is achieved by simply updating the pointer in the result data object for the old operator to point to the memory location that stores the result value for the new operator. The method then proceeds to step 980, wherein the result relation for the new operator is switched to be connected to the result data object for the old operator, again by simply updating the pointer in the result relation for the new operator. Thereafter, the method proceeds to step 982, wherein the result data object for the new operator is deleted. Finally, in step 984, the method deletes the old operator, and then terminates.

As should be appreciated from the foregoing, the replace operator routine of FIG. 23 replaces the old operator with the newly executed operator and makes all the necessary connections in the dependency graph to affect the change to the design required by the user's edits. It should be understood that this routine can alternatively be implemented in a number of different ways. For example, the result data object for the new operator can be hooked up in the dependency graph, rather than employing the result data object of the old operator and updating its value. However, the illustrative implementation shown in FIG. 23 is advantageous in that the data object for the old operator already has previously-connected relations to all of the graph elements that are dependent upon it, and therefore, these connections need not be remade.

As discussed above, through the use of a visual programming environment 50 (FIG. 3), a user of a software system having the associativity subsystem of the present invention installed thereon is provided with the capability of graphically editing the dependency graph representation of the design. The visual presentation of the dependency graph can take any number of forms. One illustrative example is shown in FIGS. 24a–24b, which shows a visual representation of the dependency graph of FIGS. 16–17.

The dependency graph is visually presented on a visual environment canvas 990, such as a display screen for the software system. Also displayed is a toolbox of AAPIs 990, which comprises a list of associative APIs that are available for the user to select in creating and editing the dependency graph. A representative list of AAPIs is included in the toolbox 992 of FIGS. 24a–24b. The AAPIs in the toolbox 992 may be represented by icons or other symbols that can be activated to add corresponding graph entities to the design.

Figure 24A:
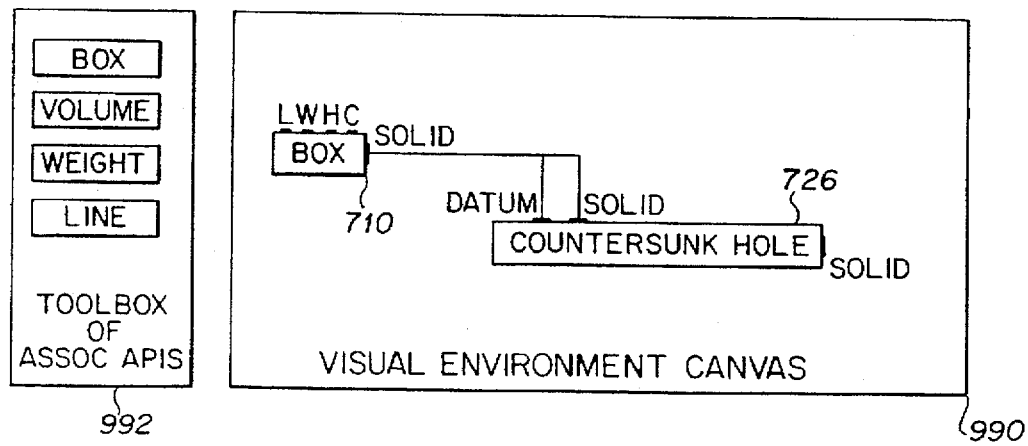
FIGS. 24a–24b illustrate an exemplary visual representation of a dependency graph according to the present invention.
Figure 24B:
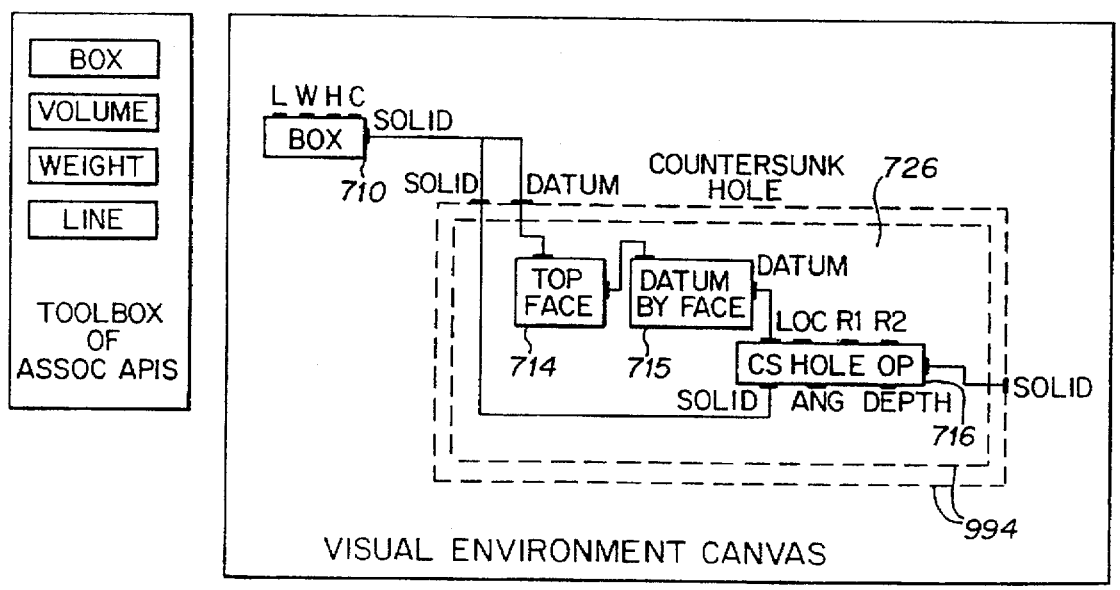

In FIG. 24a, the hierarchical countersunk hole operator 726 is displayed, along with its connections to the box operator 710. The hierarchical nature of the operator 726 is indicated by double lines defining its boundaries. The data objects in the graph are represented as ports on the operators. The ports may be color coded, with different colors depicting the data type expected or generated by the ports. When adding or modifying an input relation to one of the operator ports, the system may highlight other valid ports in the dependency graph that can be connected thereto.

As stated above, the capability may be provided to the user to open up hierarchical operators. FIG. 24b represents the dependency graph of FIG. 24a, but with the hierarchical operator 726 opened up to show the internal operators 714–716 that comprise it. In this representation, the boundary of the hierarchical operator is still identified by a pair of double dotted lines 994.

It should be understood that while the user is selecting icons or other symbols that represent the AAPIs from the toolbox and connecting them up in the visual environment canvas, the actual graph entities that form the dependency graph are not being formed. However, when the user instructs the system to process the visual presentation, the interpreter 52 (FIG. 3) receives the expressions from the visual programming environment 50 that represent the visual presentation, and calls the corresponding AAPIs that actually construct the graph entities to create the dependency graph in the manner discussed above.

As discussed above, in the embodiment of the present invention wherein hierarchical operators are provided, the user is provided with the ability to copy a hierarchical operator for use in other instances in the design. The visual programming environment of the present invention supports this capability. When a hierarchical operator is copied, its IO_OP and its IO ports are maintained. Therefore, the copying of a hierarchical operator is no different from inserting a single operator from the toolbox of AAPIs into the visual environment canvas. The hierarchical operator is treated just like other operators, and has a defined set of inputs and outputs. Once the hierarchical operator is copied and placed into the visual environment canvas, the user need only hook up its IO ports to the desired connections in the graph. When a hierarchical operator is copied, the values for its internal data objects are also copied so that the user need only define the manner in which the IO ports of the hierarchical operator are to be connected.

XIII. Computer Program Generation

Once a user has completed an interactive design session with the software system, the present invention will have created a dependency graph, such as the illustrative example shown in FIG. 2, that represents the structural dependency of the resulting design. The present invention further provides a program generation tool that operates on the dependency graph to generate a computer program in a standard language, such as C++, which when executed will generate the dependency graph and the design that it represents. As discussed above, the computer program can be edited by the user and passed back into the system to generate a modified design.

A flowchart describing the program generation tool is shown in FIGS. 13a–13e. Initially, in step 101, each of the leaf data objects in the dependency graph is marked as being out of synch. The leaf data objects are those in the graph that are not fed by an operator, i.e., a leaf data object is not the result of an operator. Once the leaf objects have been so marked, the method proceeds to step 103, wherein the symbolic pass routine of FIG. 8 is called. Each of the leaf objects is marked as out of synch so that all will be processed by the symbolic pass. As discussed above, the symbolic pass routine interrogates the graph to form a list of operators to be evaluated, as well as the order in which the list should be evaluated. The operators in the list include directed operators, or constraint sets of non-directed operators. As discussed above in connection with FIG. 8, the list of operators is stored on the graph manager stack in the order in which the operators are to be executed. Thus, by calling the symbolic pass and then processing operators in the order specified on the graph manager stack, the program generation code generates a program that calls the corresponding AAPIs in the same order.

When the symbolic pass returns, the method proceeds to step 105 wherein the next operator in the evaluation order stored on the graph manager stack is selected for processing, which will be the first operator during the first pass through step 105. Thereafter, the method proceeds to step 107, wherein a determination is made as to whether the selected operator is a constraint set, and when it is, the method proceeds to step 109 wherein a single non-directed operator from the constraint set is selected for processing.

Figure 13A:
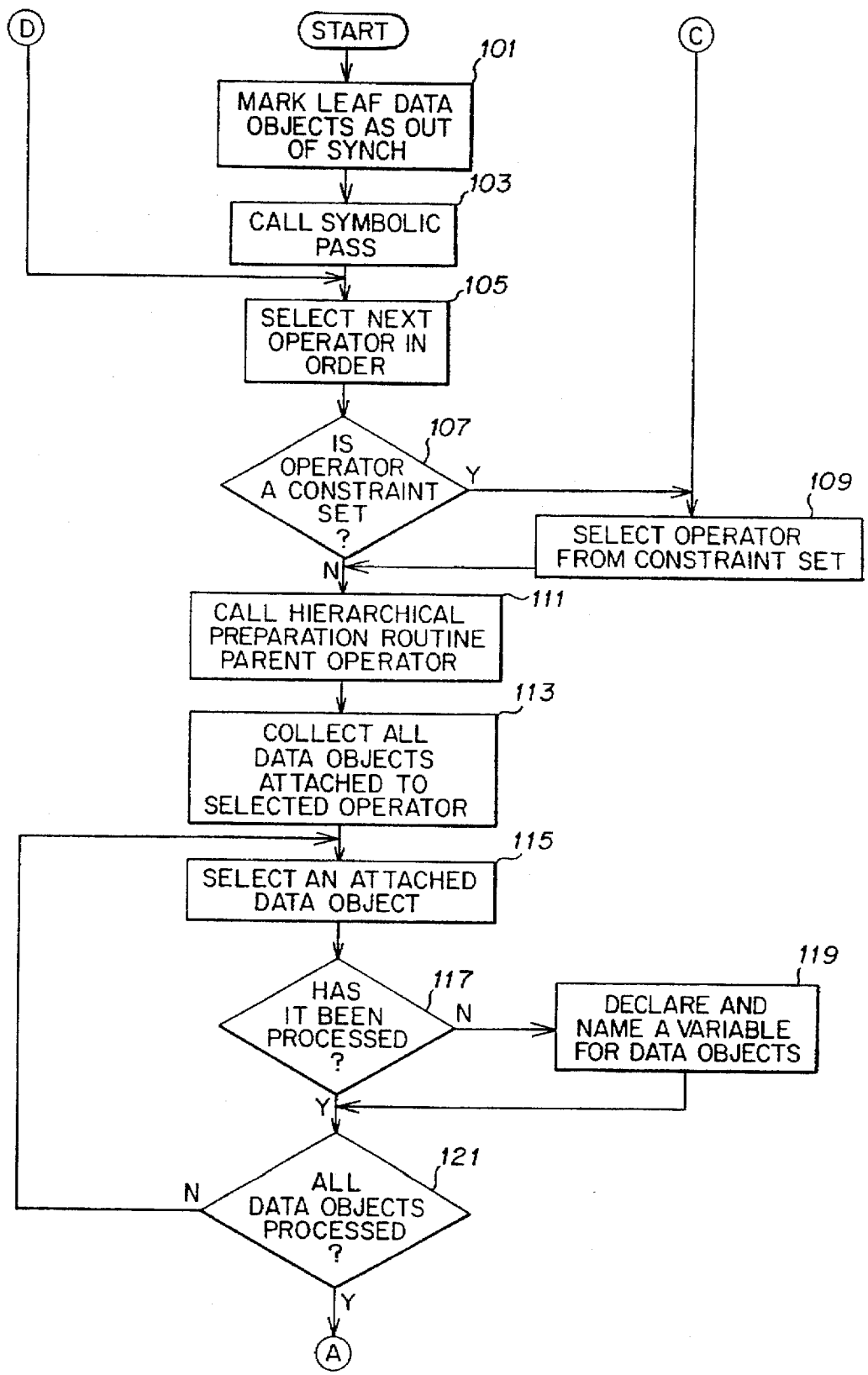
FIGS. 13a–e are flowcharts representing the steps of the program generation method and supporting routines of the present invention.
Figure 13B:
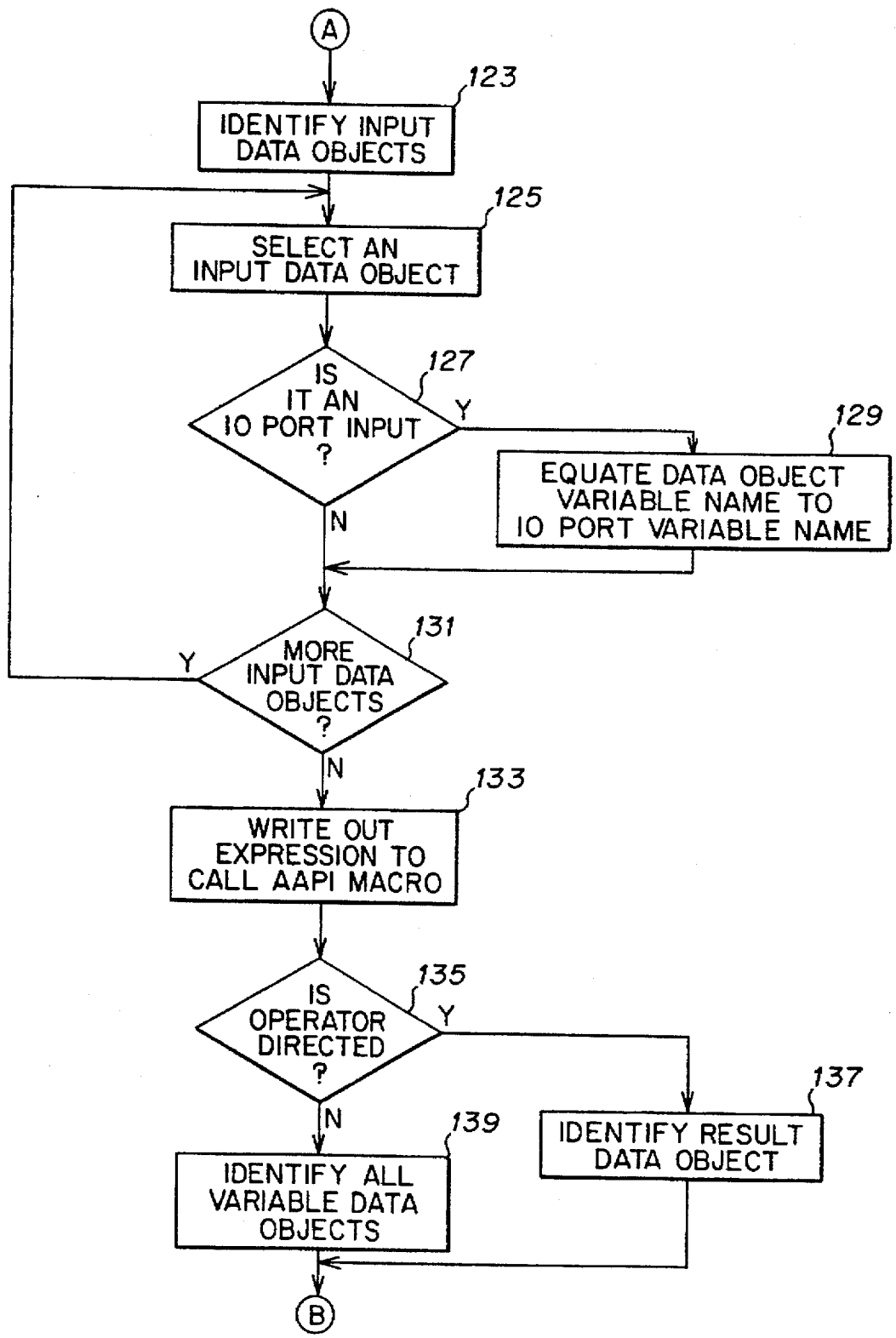
Figure 13C:
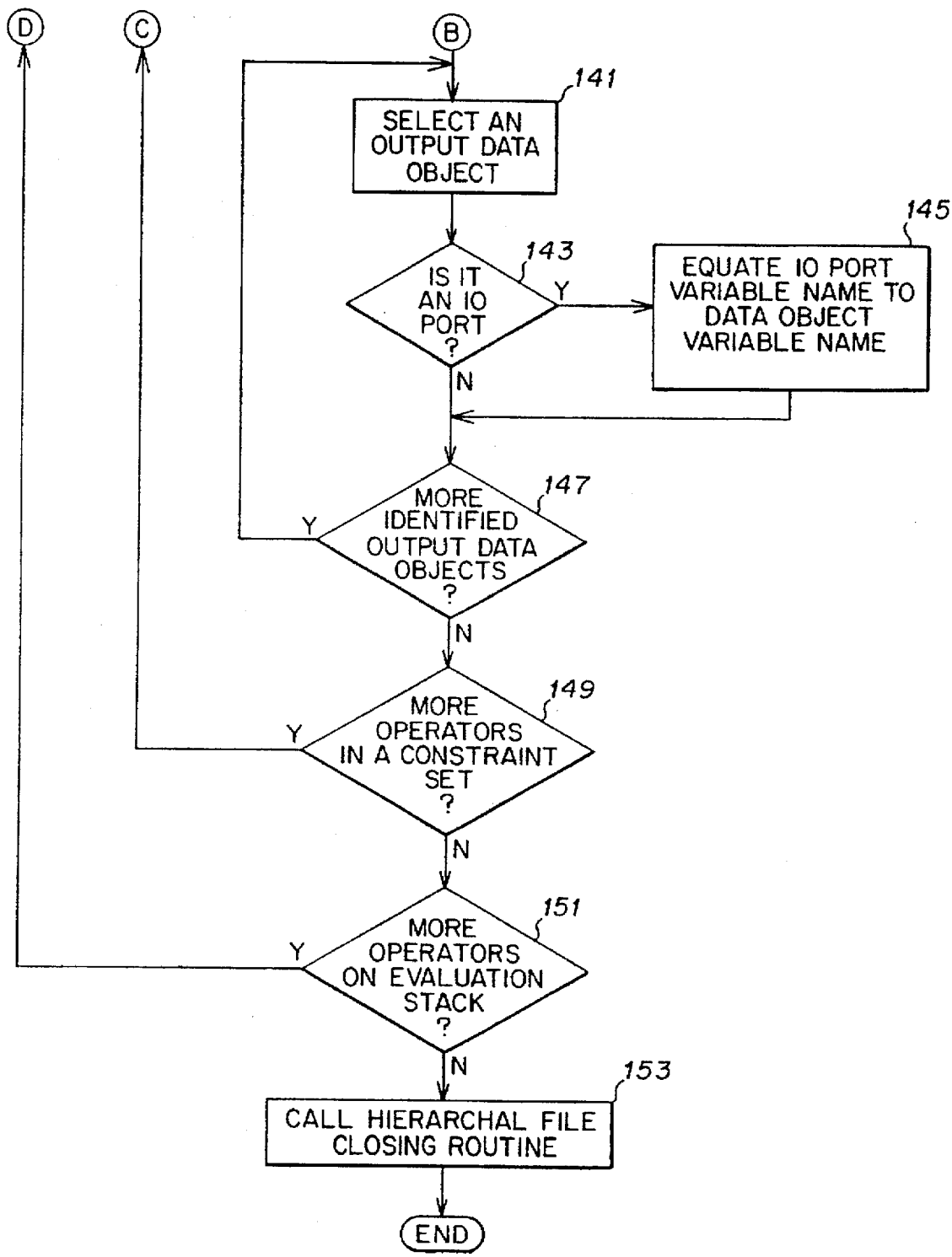
Figure 13D:
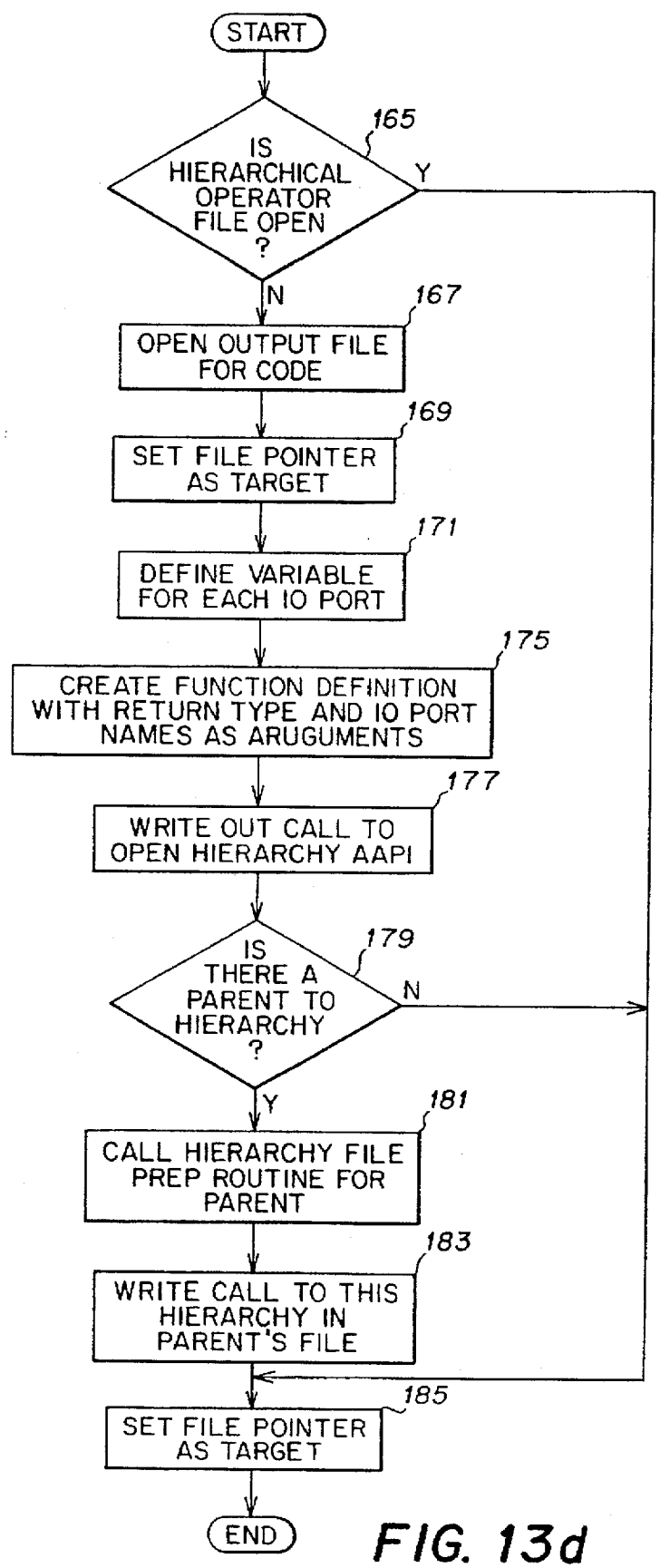

After selecting a non-directed operator in step 109, or when it is determined at step 107 that the operator selected in step 105 is a single directed operator, the method proceeds to step 111, wherein the hierarchical file preparation routine of FIG. 13d is called in connection with the hierarchical operator that is the parent to the directed operator selected for processing in step 105, or the non-directed operator selected in step 109. As stated above, each operator in the dependency graph belongs to at least one parent hierarchical operator, with the highest hierarchical operator defining the root for the design. The parent hierarchy for each operator is stored in a pointer in the graph entity that defines the operator, and therefore, can be determined by the program generation method simply by querying this graph entity.

When the hierarchical file preparation routine is called for a hierarchical operator, it initially determines at step 165 whether a file has been opened for the hierarchical operator. Hierarchical operators are represented in the code generated by the program generation method of the present invention by separate functions, with each function being defined in a separate file. When it is determined that a file has not yet been opened, the method proceeds to step 167, wherein an output file is opened for the code that defines the hierarchical operator function.

Once an output file is opened for the hierarchical operator being processed, the method proceeds to step 169, wherein the pointer for this file is selected as the target, indicating that code subsequently generated is to be placed in this file. Thereafter, in step 171, a variable is defined for each IO port of the hierarchical operator. The IO ports are identified by querying the IO_OP list maintained by the graph entity that represents the hierarchical operator. Next, in step 175, the routine creates the definition for the function that represents the hierarchical operator. The function definition includes the name of the function, its return type, and the names and types of its arguments. The routine uses the variable names created for the IO ports in step 171 as the arguments for the functions.

After the function is defined, the method proceeds to step 177, wherein the expression to call the open hierarchy AAPI is written out in the file, so that when the code is generated, a hierarchy will be created for the hierarchical operator being processed. Thereafter, the method proceeds to step 179, wherein a determination is made as to whether a parent hierarchy exists for the hierarchical operator being processed, and when no such parent hierarchy exists, the method proceeds to step 185, wherein the file pointer for the hierarchical operator is again set as the target for reasons discussed below, and the routine terminates.

When it is determined at step 179 that the hierarchical operator being processed has a parent hierarchy, the hierarchical file preparation routine is called for the parent hierarchy. In this manner, the file preparation routine is recursively called to process all of the hierarchical operators that include the operator initially selected for processing from the evaluator stack during step 105 of the program generation method (FIG. 13a). When the file preparation routine returns from processing the parent hierarchical operator, the method proceeds to step 183, wherein a call to the hierarchical operator being processed is written into the file for its parent hierarchy. In this manner, the function that defines the parent hierarchical operator will call the function that defines the hierarchical operator included within it.

Finally, after the call to the hierarchical operator function is written into the file for its parent hierarchical operator in step 183, or when it is determined at step 179 that the hierarchical operator being processed does not include a parent, or when it is determined at step 165 that a file for the hierarchical operator was opened prior to calling the hierarchical file preparation routine, the routine proceeds to step 185, wherein the file pointer for the hierarchical operator being processed is again set as the target. Step 185 is included in the file preparation routine because of the recursive manner in which it is executed. Specifically, when the hierarchical operator for which the routine is initially called has at least one parent hierarchical operator, the target pointer will be set to that parent hierarchical operator in step 169 of a recursive call to the routine that processes the parent hierarchical operator. Before returning to step 113 of the program generation method (FIG. 13a), the hierarchical file preparation routine again sets the target pointer to the hierarchical operator for which it was initially called, so that additional code generated during the program generation method is written to this file.

After the hierarchical preparation routine returns, the method proceeds to step 113, wherein all of the data objects attached to the operator selected for processing in step 105 or step 109 are collected. As discussed above, each operator includes a pointer to its relations, which in turn each includes a pointer to its corresponding data object. By querying the graph entity that represents the operator, the program generation method can collect a list of all the data objects attached thereto. In step 115, the method selects for processing one of the data objects attached to the operator being processed. In step 117, the method determines whether the selected data object has been previously processed, and when it has not, the method proceeds to step 119, wherein a variable is declared and named for the selected data object.

After a variable is declared for the selected data object in step 119, or when it is determined at step 117 that the selected data object was previously processed, the method proceeds to step 121, wherein a determination is made as to whether all of the data objects in the list of attached data objects formed in step 115 have been processed, and when they have not, the method returns to step 115. In this manner, the method proceeds through steps 115–121 to ensure that a variable name is declared for each data object attached to the operator being processed.

After a variable name has been declared for each of the data objects attached to the operator being processed, the method proceeds to step 123 (FIG. 13b), wherein all of the input data objects included in the list formed in step 115 are identified. For the purpose of identification as an input in step 123, the program generation method identifies not only inputs to directed operators, but also every data object attached to a non-directed operator.

After the input data objects are identified, the method proceeds to step 125, wherein one of the input data objects is selected for processing. In step 127, a determination is made as to whether the selected input data object is an IO input port for the hierarchical operator that is the parent to the operator being processed. When it is determined that the input data object is an IO port, the method proceeds to step 129, wherein the variable name declared for the selected data object in step 119 (FIG. 13a) is equated to the variable name declared for the IO port during step 171 of the hierarchical file preparation routine of FIG. 13d. In this manner, the value for the selected data object is scoped into the function created for the parent hierarchy of the operator being processed.

After the variable names are equated in step 129, or when it is determined in step 127 that the data object is not an IO port for a hierarchy, the method proceeds to step 131, wherein a determination is made as to whether any of the input data objects identified for the operator in step 123 remain to be processed, and when at least one remains for processing, the method returns to step 125. In this manner, the method proceeds through steps 125–131 to equate the variable names of each of the processed operator's input data objects that form an IO port of the parent hierarchy to the variable name for its corresponding IO port.

After all of the input data objects have been processed, the method proceeds to step 133, wherein the expression to call the AAPI macro that corresponds to the operator being processed is written out, along with its corresponding variable names. Thereafter, the method proceeds to step 135, wherein a determination is made as to whether the operator being processed is directed, and when it is, the method proceeds to step 137, wherein the single result data object for the directed operator is identified. Conversely, when it is determined at step 135 that the operator being processed is non-directed, the method proceeds to step 139 to identify as an output all of the data objects attached to the non-directed operators that are variable, i.e., not fixed.

After the output data objects for the operator being processed are identified in either step 137 or 139, the method proceeds to step 141 (FIG. 13c), wherein one of the output data objects is selected for processing. Thereafter, the method proceeds to step 143, wherein a determination is made as to whether the selected output data object is an IO port for the hierarchical operator that is the parent to the operator being processed. This determination is analogous to the one described above in connection with step 127, and can be made by querying the IO_OP list of IO ports for the parent hierarchical operator. When it is determined that the data object selected in step 141 is an IO port for the parent hierarchical operator, the method proceeds to step 145, wherein the variable name for the IO port is equated to the variable name declared for the data object in step 119 (FIG. 13a). This step is analogous to step 129 (FIG. 13b) described above, and ensures that the value in the output data object is ported, through a corresponding IO port, out of the function created for the parent hierarchical operator so that it can be accessed by the function at the next hierarchical level.

After the variables are equated in step 145, or when it is determined at step 143 that the selected output data object is not an IO port of the parent hierarchy, the method proceeds to step 147, wherein a determination is made as to whether any of the output data objects identified in step 139 (FIG. 13b) remains for processing, and when at least one remains to be processed, the method returns to step 141. In this manner, the method proceeds to process each of the output data objects for the selected operator to equate each that is an IO port of its parent hierarchy to a corresponding IO port variable name.

When it is determined at step 147 that no output data objects for the selected operator remain to be processed, the method proceeds to step 149, wherein a determination is made as to whether the operator belongs to a constraint set, and when it does, whether any additional operators within that set remain to be processed. When it is determined at step 149 that additional operators within the same constraint set remain to be processed, the method returns to step 109 (FIG. 13a), wherein a next operator from the constraint set is selected for processing. In this manner, the method proceeds through steps 109–149 to process each of the operators in a constraint set.

When it is determined at step 149 that the operator being processed does not belong to a constraint set, or that each of the operators in the constraint set have already been processed, the method proceeds to step 151, wherein a determination is made as to whether any operators remain on the evaluation stack for processing. When it is determined that at least one operator remains to be processed, the method returns to step 105 (FIG. 13a), wherein the next operator on the stack is selected for processing. In this manner, the method proceeds through steps 105–151 to process each of the operators placed on the evaluation stack resulting from the call to the symbolic pass in step 103. When it is determined that no operators remain for processing, the method proceeds to step 153, wherein the hierarchical closing routine is called, and the method then terminates.

Figure 13E:
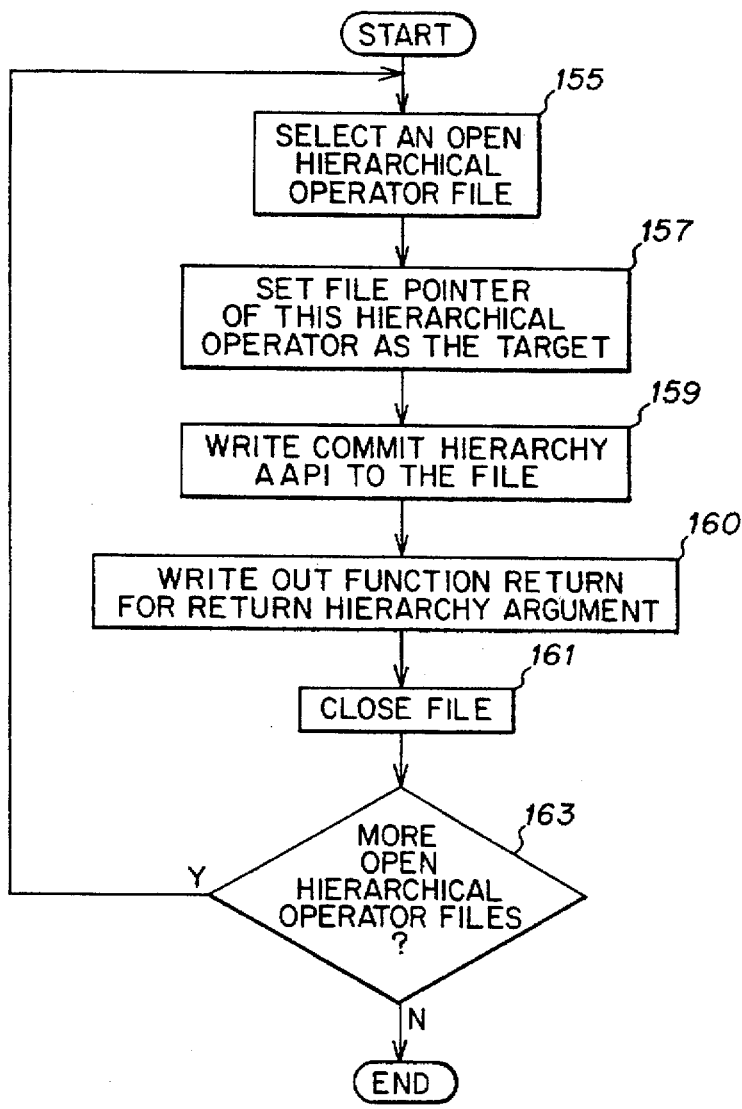

The hierarchical file closing routine is shown in FIG. 13e. Initially, in step 155, one of the hierarchical operator files opened in step 167 of the hierarchical file preparation routine (FIG. 13d) is selected for processing. Thereafter, the file pointer of the selected hierarchical operator file is set as the target in step 157, so that subsequently generated code is written to this file.

After the file pointer of the selected hierarchical operator is set as the target, the method proceeds to step 159, wherein the expression to call the commit hierarchy AAPI is written to its file. The routine then proceeds to step 160, wherein the function return for the hierarchical operator is written out, including the argument to be returned by the hierarchical operator function. The routine then proceeds to step 161, wherein the hierarchical operator file selected in step 155 is closed. Finally, the routine proceeds to step 163, wherein a determination is made as to whether any more hierarchical operator files remain for processing, and when at least one remains to be processed, the routine returns to step 155. In this manner, the routine proceeds to process each of the open hierarchical operator files until it is determined at step 163 that no more open files remain, and then the routine terminates.

XIV. Illustrative Hardware System

Figure 14:
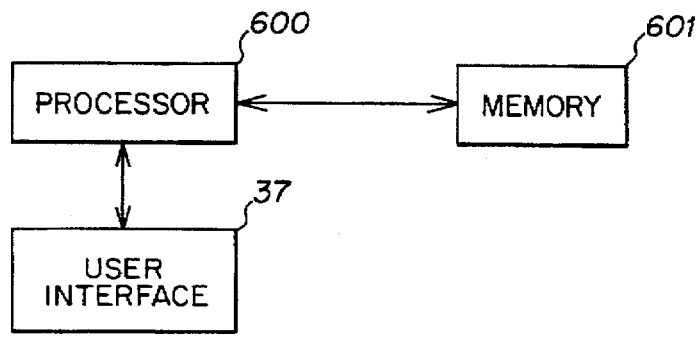
FIG. 14 is a block diagram of a hardware system on which the present invention can be operated.

FIG. 14 is a block diagram of a hardware system on which the present invention can be operated. The system includes the user interface 37 discussed above, as well as a processor 600 and an associated memory 601. As discussed above, the present invention can be operated on any software system made up of functions. Thus, the processor 600 can be any of various types of processors that is capable of executing software functions. The software tools, routines and methods of the present invention described herein can each be stored in the memory 601 and executed on the processor 600 to implement the present invention.

XV. Illustrative Method Of Design Iteration

Figure 25:
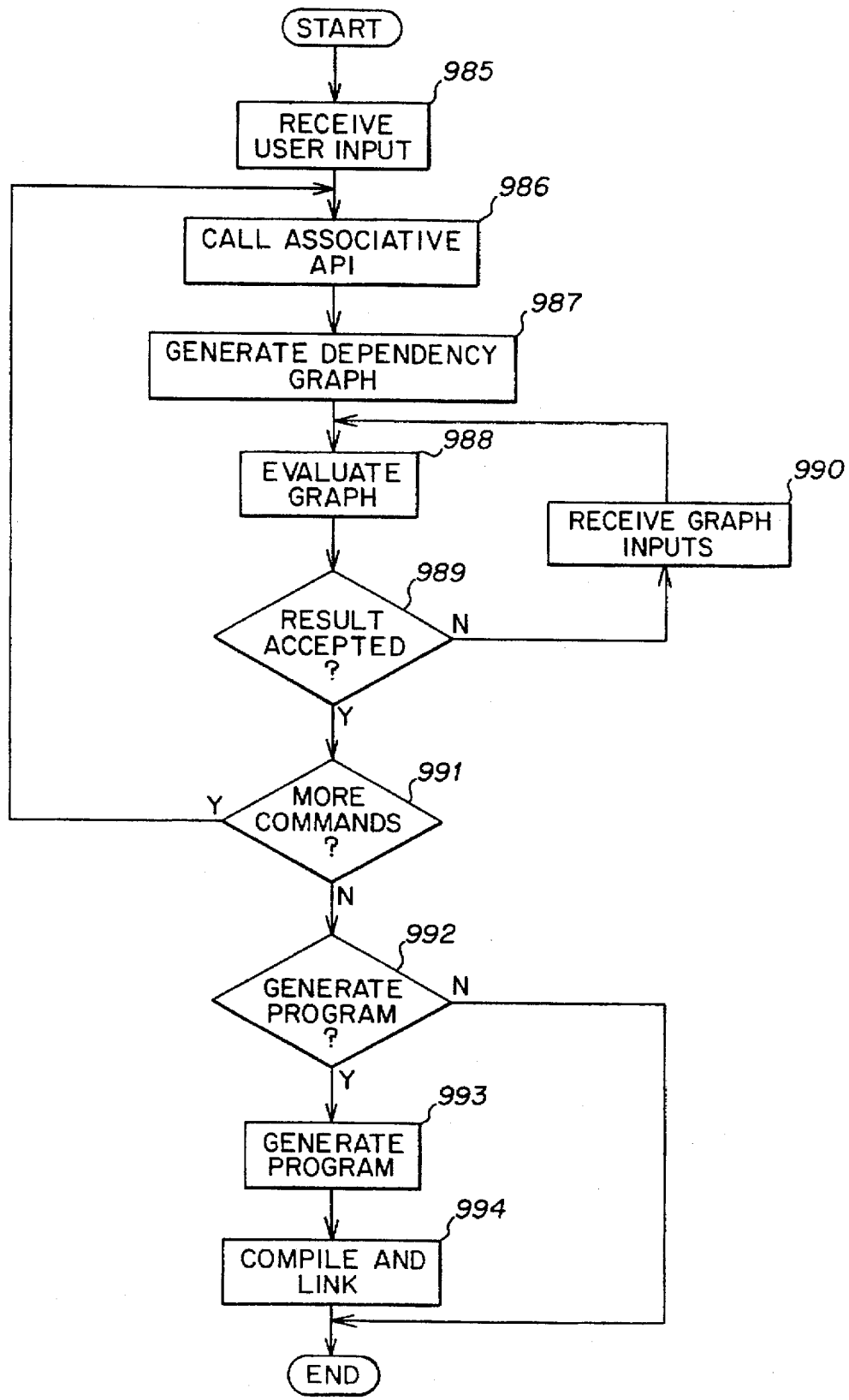
FIG. 25 is a high level flowchart representing the steps of a method in accordance with the present invention.

As should be appreciated from the foregoing, the various capabilities of the present invention provide the user with tremendous flexibility in generating a design, representing it in a dependency graph that can be modified graphically, and then generating a computer program in a standard language that represents the structural dependency of the design, and can be executed on the system to generate the design at some point in the future. Thus, the high level steps performed by a software system on which the associativity subsystem of the present invention has been installed are shown in the flowchart of FIG. 25.

In step 985, the method receives an input from the user, and then proceeds to step 986 to call the corresponding AAPI to implement the design action requested by the user. In step 987, the dependency graph entities for the AAPI are generated, and then the method proceeds to step 988 wherein the graph is evaluated. The user may then use the visual programming environment to view the dependency graph and determine whether the resulting design is acceptable. When it is determined at step 989 that the result has not been accepted by the user, the method proceeds to step 990, wherein commands can be received from the visual programming environment to edit the graph. The method then proceeds to step 988, wherein the modified graph is evaluated. In this manner, the method proceeds through steps 988–990 until the user indicates that the resulting design is accepted.

Once the result is accepted, the method proceeds to step 991 wherein a determination is made as to whether any additional commands are to be received by the user. If more commands are received, the method returns to step 986 wherein those commands are processed.

When no more commands are received from the user, the method proceeds to step 992, wherein a determination is made as to whether the user desires the generation of the standard language computer program that represents the structural dependency of the design. When the user does not wish to have the computer program generated, the method simply terminates. However, when it is determined that the program should be generated, the method proceeds to step 993, wherein the program is generated in the manner discussed above, and then to step 994 wherein the program is compiled and linked to the software system.

XVI. Conclusion

Having thus described various illustrative embodiments of the invention, various alterations, modifications and improvements will readily occur to those skilled in the art. Such alterations, modifications and improvements are intended to be within the spirit and scope of the invention. Accordingly, the foregoing description and the accompanying drawings are provided by way of example only, and are not intended to be limiting. The invention is limited only as defined in the following claims and the equivalence thereto.

What is claimed is:

1. A method for providing parametric capabilities to a software modeling system having a plurality of functions and a user interface that responds to receipt of each one of a plurality of commands by calling a corresponding one of the plurality of functions, the plurality of functions being executed during a modeling session to create a model, the method including steps of:

A. providing a wrapper around each of the plurality of functions in the software system to create a corresponding plurality of associative functions, each of the associative functions including a call to its corresponding function and further including a capability of creating and adding graph entities to a dependency representation of the model when its corresponding function is executed during the modeling session; and B. modifying the user interface so that in response to each received command, the associative function that corresponds to the function corresponding to the received command is called.

2. The method of claim 1, wherein at least one of the plurality of functions has no inherent parametric capabilities.

3. The method of claim 1, wherein the plurality of functions includes a first function that operates upon a first set of arguments formatted in a first format, and wherein step A includes a step of:

providing a first wrapper around the first function, the first wrapper being capable of receiving a second set of arguments formatted in a second format that is different from the first format, the first wrapper converting the second set of arguments to the first set of arguments when calling the first function.

4. The method of claim 1, wherein step A includes providing each of the wrappers in an object oriented computer programming language.

5. The method of claim 1, wherein steps A and B are implemented by a computer executing a computer program written in an object oriented language.

6. The method as recited in claim 1, further comprising a step of:

providing a tool that, when a modification is made to the model, uses the dependency representation to reevaluate only the functions used in creating the model that correspond to graph entities affected by the modification to the design.

7. The method of claim 1, further comprising a step of:

creating a hash table with a table entry for each associative function, each table entry identifying a topology of the graph entities created and added to the dependency representation when the associative function is executed.

8. The method of claim 7, wherein the step of creating a hash table includes a step of:

creating each table entry to identify a number of input data arguments required by the associative function, a result of the associative function and descriptions of each input data argument and the result.

9. The method of claim 1, wherein step A includes a step of providing each of the wrappers in a standard computer programming language.

10. The method of claim 9, wherein step A includes a step of providing each of the wrappers in an object oriented computer programming language.

11. The method of claim 1, further including a step of:
C. creating a single processor function that cooperates with each of the associative functions to create and add the graph entities to the dependency representation.

12. The method of claim 11, wherein step C includes a step of:
creating the single processor function to generate a hash table with a table entry for each associative function, each table entry identifying a topology of the graph entities created and added to the dependency representation by the single processor function when the associative function is executed.

13. The method of claim 12, wherein step C further includes a step of:
creating the single processor function to create the dependency graph by accessing an entry in the hash table, the single processor being generic and operating according to arguments passed to it when it is called by the associative function.

14. The method of claim 12, wherein step C includes a step of:
creating the single processor function to create each table entry to identify a number of input data arguments required by the associative function, an output of the associative function and descriptions of each input data argument and the output.

15. A software modeling system for creating a model during a modeling session, the model being formed from a plurality of design entities, the software modeling system comprising:
a processor having a plurality of functions that are executed thereon to create the plurality of design entities that form the model;
a user interface that responds to receipt of each one of a plurality of commands by calling a corresponding one of the plurality of functions;
a wrapper around each of the plurality of functions that creates a corresponding plurality of associative functions, each of the associative functions including a call to its corresponding function, each of the associative functions further including means for creating and adding entries to a dependency representation when its corresponding function is executed during the modeling session, the dependency representation indicating dependencies of the plurality of design entities that form the design; and
means for modifying the user interface so that in response to each received command, the associative function that corresponds to the function corresponding to the received command is called.

16. The software modeling system of claim 15, wherein the plurality of functions includes directed and non-directed operations and wherein the software modeling system further includes:
means for creating the dependency representation to include design entities created by both the directed and non-directed operations.

17. The software modeling system of claim 15, further including:
means for generating a standard programming language computer program from the dependency representation.

18. The software modeling system of claim 15, wherein the plurality of functions includes directed and non-directed operations;
wherein the creating means includes means for creating the dependency representation to include design entities created by both the directed and non-directed operations; and
wherein the software modeling system further includes means for representing at least two of the plurality of design entities in the dependency representation with a same hierarchical operator.

19. The software modeling system of claim 15, wherein the plurality of functions includes directed and non-directed operations;
the creating means includes means for creating the dependency representation to include design entities created by both directed and non-directed operations; and
wherein the software modeling system further includes means for graphically editing the dependency representation to create a modified dependency representation.

20. The software modeling system of claim 15, wherein the plurality of functions includes directed and non-directed operations;
wherein the creating means includes means for creating the dependency representation to include design entities created by both directed and non-directed operations; and
wherein the software modeling system further includes means for generating a standard programming language computer program from the dependency representation.

21. The software modeling system of claim 15, further including:
means for displaying the dependency representation; and
means for generating a standard programming language computer program from the dependency representation.

22. The software modeling system of claim 15, wherein the plurality of functions includes a first function that operates upon a first set of arguments formatted in a first format, and wherein the software modeling system further includes means for providing a first wrapper around the first function, the first wrapper being capable of receiving a second set of arguments formatted in a second format that is different from the first format, the first wrapper converting the second set of arguments into the first set of arguments when calling the first function.

23. The software modeling system as recited in claim 15, further comprising:
means for, when a modification is made to the model, using the dependency representation to reevaluate only those functions used to create the model that correspond to the design entities affected by the modification to the model.

24. The software modeling system of claim 15, wherein the plurality of functions includes directed and non-directed operations;
wherein the creating means includes means for creating the dependency representation to include design entities created by both directed and non-directed operations, and wherein the software modeling system further includes:
means for representing at least two of the plurality of design entities in the dependency representation with a same hierarchical operator;

means for graphically editing the dependency representation to create a modified dependency representation; and means for generating a standard programming language computer program from the dependency representation.

25. The software modeling system of claim 24, wherein the plurality of functions includes a first function that operates upon a set of arguments formatted in a first format, and wherein the software modeling system further includes means for providing a first wrapper around the first function, the first wrapper being capable of receiving a second set of arguments formatted in a second format that is different from the first format, the first wrapper converting the second set of arguments into the first set of arguments when calling the first function.

26. The software modeling system of claim 15, further including means for displaying the dependency representation.

27. The software modeling system of claim 26, wherein the means for displaying the dependency representation includes a visual programming environment.

28. The software modeling system of claim 26, further including:

means for representing at least two of the plurality of design entities in the dependency representation with a same hierarchical operator.

29. The software modeling system of claim 26, further including:

means for graphically editing the dependency representation to create a modified dependency representation.

30. The software modeling system of claim 29, further including:

means for generating a modified design from the modified dependency representation.

* * * * *